(12) United States Patent
Vostrikov et al.

(10) Patent No.: US 9,262,848 B2
(45) Date of Patent: Feb. 16, 2016

(54) METHOD FOR STROKING PATHS

(71) Applicant: CANON KABUSHIKI KAISHA, Tokyo (JP)

(72) Inventors: Evgeny Vostrikov, Macquarie Park (AU); Ian Robert Boreham, Gordon (AU); Mindy Xie, Chatswood (AU); Peter William Mitchell Ilbery, Dundas (AU)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 13/875,141

(22) Filed: May 1, 2013

(65) Prior Publication Data

US 2013/0293554 A1    Nov. 7, 2013

(30) Foreign Application Priority Data

May 4, 2012    (AU)    .................................    2012202651

(51) Int. Cl.
*G06T 11/20*    (2006.01)
(52) U.S. Cl.
CPC    ....................................    *G06T 11/203* (2013.01)

(58) Field of Classification Search
None
See application file for complete search history.

(56) References Cited

U.S. PATENT DOCUMENTS

| 5,325,477 A | 6/1994 | Klassen |
| 7,158,138 B1 * | 1/2007 | Bronskill et al. ............. 345/441 |
| 7,425,955 B2 | 9/2008 | Long et al. |
| 2010/0097383 A1 | 4/2010 | Nystad et al. |
| 2011/0285721 A1 * | 11/2011 | Kilgard ........................ 345/442 |

* cited by examiner

*Primary Examiner* — Stephen R Koziol
*Assistant Examiner* — Diana Hickey
(74) *Attorney, Agent, or Firm* — Canon U.S.A., Inc. IP Division

(57) ABSTRACT

A method of stroking a curved path with a fill of pre-determined thickness, where the path has line segments defined by a number of points, the method being performed by forming a number of projection lines normal to the curved path at the points, where each of the projection lines has a length based on the fill thickness, determining an intersection between a set of the projection lines, the intersection indicating the occurrence of a void in stroking the curved path, and then constructing one or more polygons filling in the void in the stroked path.

10 Claims, 44 Drawing Sheets

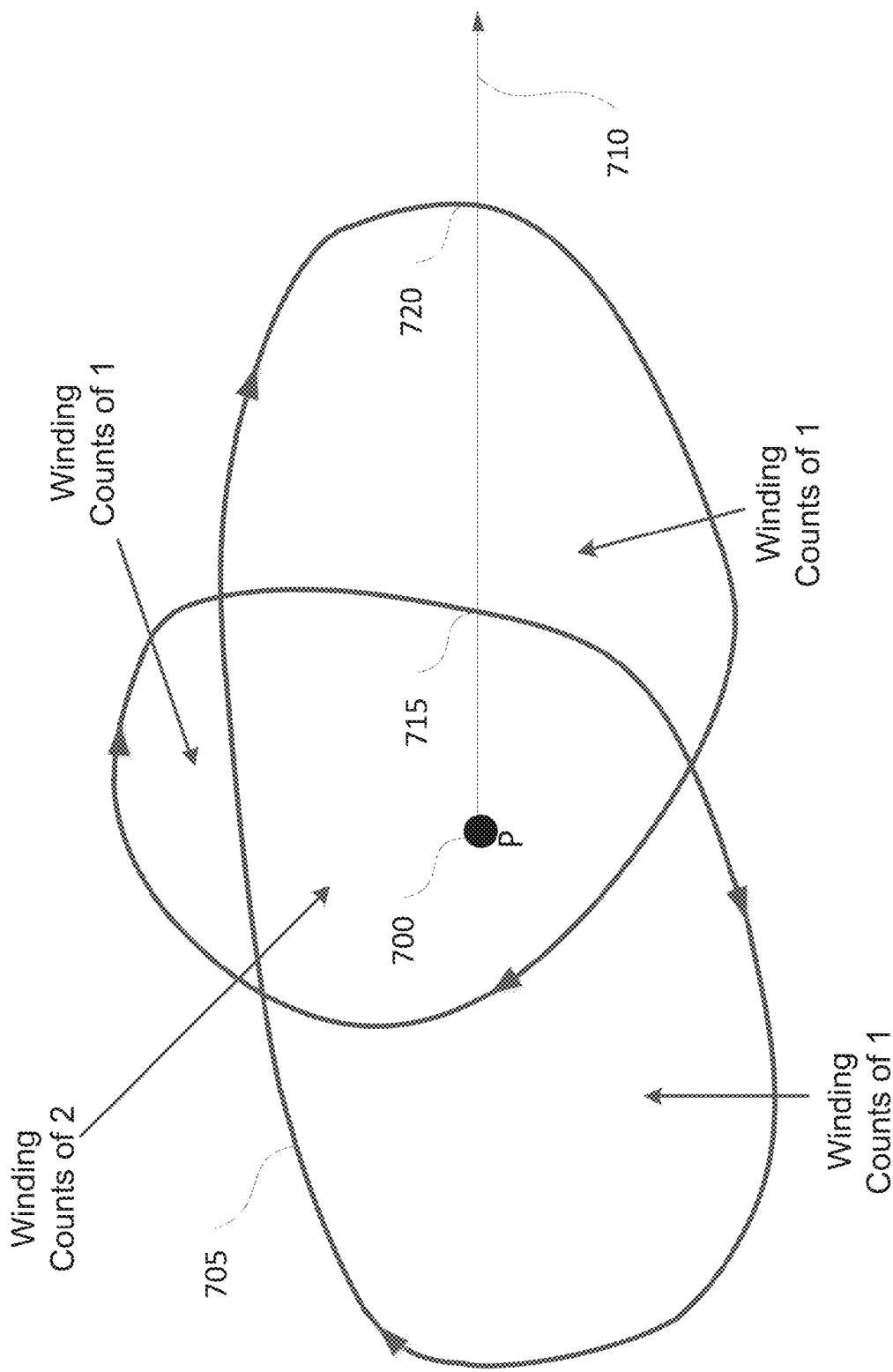

Type 1

Type 2

Type 3

Type 4

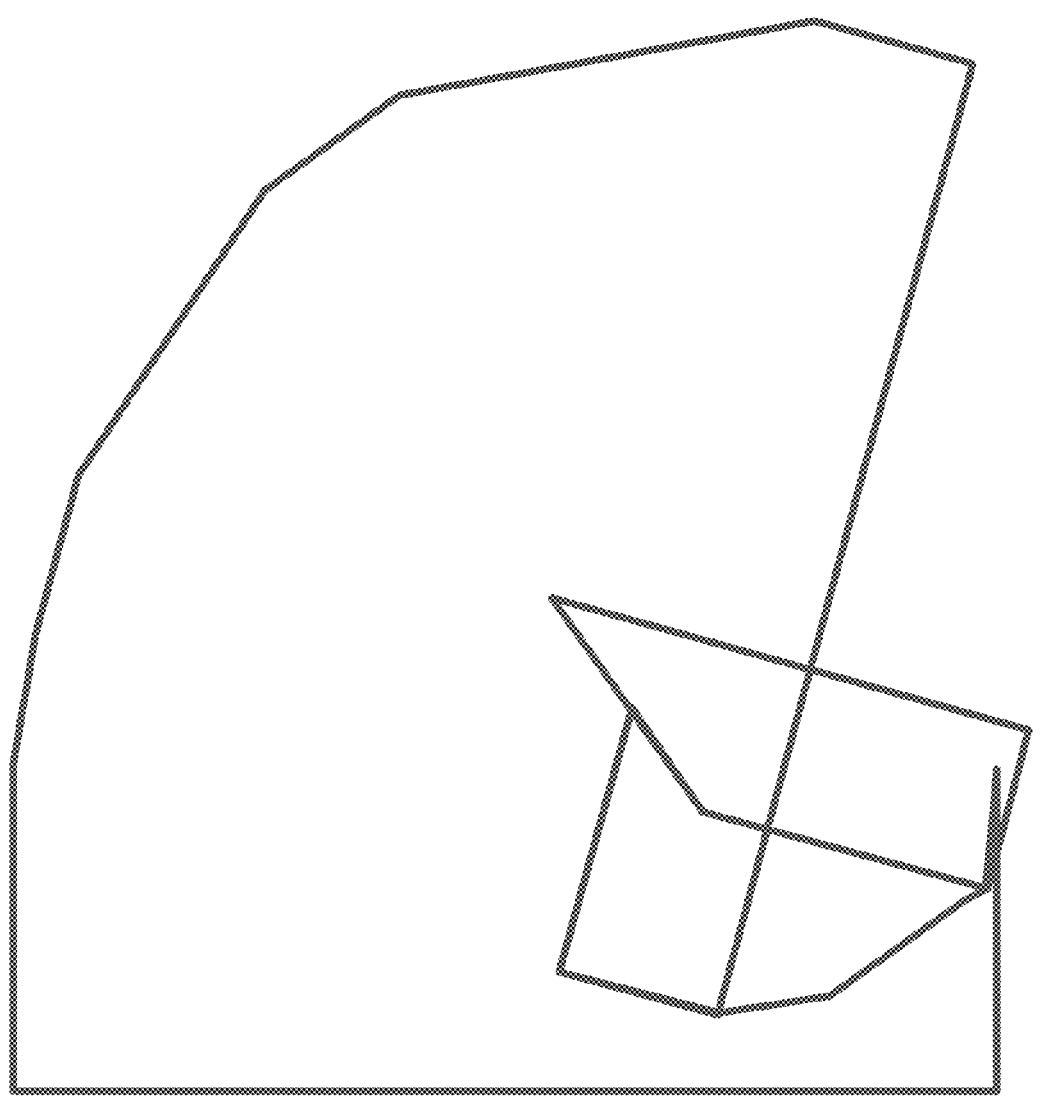

ing (VFS) arrangements, which seek to address the above problems by detecting intersections of projection lines associated with paths to be stroked, said intersections indicating the presence of voids, and generating one or more polygons to fill in the voids thereby resulting in a void free stroked line.

METHOD FOR STROKING PATHS

REFERENCE TO RELATED PATENT APPLICATION(S)

This application claims the benefit under 35 U.S.C. §119 of the filing date of Australian Patent Application No 2012202651, filed 4 May 2012, hereby incorporated by reference in its entirety as if fully set forth herein.

TECHNICAL FIELD

The current invention relates to rendering systems and in particular to rendering stroked curves.

BACKGROUND

In modern 2D computer graphics, the term "stroking" is the process of generating and painting an outline of a path to create the visual effect of dragging a pen along the path. The pen has a user-defined width, often referred to as the pre-determined stroke-width, and a colour fill.

A path can be formed by a plurality of connecting segments of two types, namely line segments and curve segments. A line segment is a straight line with a user-defined start point and a user-defined end point, and is easy to stroke, as the stroke is simply a rectangular area. On the other hand, a curve segment is a lot more complex. The curve segment defines a non-linear movement from a start point to an end point. Depending on the graphic standard, a curve segment is representable using different mathematical forms. For example, the 2D Graphic Standard OpenVG allows users to define a curve segment using a quadratic Bézier curve, a cubic Bézier curve or an elliptical arc. Several approaches have been attempted to correctly render a stroked curve segment.

One brute-force approach is to approximate the area covered by the stroke using a set of quadrilaterals. Each quadrilateral is generated based on a pair of normal lines centred on the curve segment, and added as a separate polygon. This approach produces accurate stroked output, however this is achieved at the expense of speed performance, as excessive straight-line edges are processed from all the quadrilaterals.

Another approach is to generate a left and a right offset path from the curve segment, sometimes referred to as the centre-line curve. The offset path is defined by a series of points offset from the curve segment with a distance of half of the stroke-width. This is achieved by first generating a plurality of points along the curve segment, and then projecting the points out to the left and the right from the centreline curve by half of the stroke-width. Although the exact technique used for projecting the points varies from implementation to implementation, the common method is to project along the corresponding normal line of the centreline curve.

FIG. 3 depicts an example of stroking a curve segment 380 using the offset path approach (this being referred to as the "offset stroking method"), where a final stroke polygon is represented by the solid black lines. The points on the curve 380 are generated in the order from 340 to 350 and are represented by solid black dots. Each point is projected along its corresponding normal line, which is represented by the dashed line, to generate a left offset path (301 to 314) and a right offset path (321 to 334). Lines 360 and 365 are also added as butt end caps to complete the stroke polygon. When the final stroke polygon is filled with the user-defined stroke colour, the filling is performed using the "non-zero winding rule" to cover the entire stroked area. The non-zero winding rule is described hereinafter in more detail with reference to FIG. 7.

However, the offset stroking method, which has the advantage of greater speed, has a problem in that it can produce incorrect output, due to unfilled regions. This incorrect output occurs when stroking certain curves with high curvature and large stroke width.

SUMMARY

It is an object of the present invention to substantially overcome, or at least ameliorate, one or more disadvantages of existing arrangements.

Disclosed are arrangements, referred to as Void Free Stroking (VFS) arrangements, which seek to address the above problems by detecting intersections of projection lines associated with paths to be stroked, said intersections indicating the presence of voids, and generating one or more polygons to fill in the voids thereby resulting in a void free stroked line.

According to a first aspect of the present invention, there is provided a method of stroking a curved path with a fill of pre-determined thickness, said path having line segments defined by a plurality of points, said method comprising the steps of:

forming a plurality of projection lines normal to the curved path at the plurality of points, each of the projection lines having a length based on the pre-determined fill thickness;

determining an intersection between a set of the plurality of projection lines, said intersection indicating an occurrence of a void in stroking the curved path; and in response to detecting said intersection of the set of projection lines, constructing at least one polygon filling in the void in the stroked path.

According to another aspect of the present invention, there is provided a method of rendering a stroked curved path having a fill thickness, the method comprising:

forming a plurality of projection lines projecting from each side of the curved path, each of the projection lines having a length based on the fill thickness;

determining intersection points for a plurality of intersecting consecutive projection lines located on a concave side of the curve;

forming at least one extension polygon based on the intersection points and end points of the plurality of consecutive projection lines;

forming a main polygon based on end points of the plurality of projection lines, and the intersection points, excluding at least one of the end points of a non-end cap projection line of the consecutive projection lines; and rendering the curved path using the at least one extension polygon and the main polygon.

According to another aspect of the present invention, there is provided a method of stroking a path comprising two straight adjacent segments, said path having a fill thickness and each of the segments having a start point and an end point, said method comprising the steps of:

forming a normal projection line to the straight segments at each start and end point of the segments, each of the normal projection lines having a length based on the fill thickness;

detecting a presence of an intersection point of a first of the normal projection lines passing through the start point of a first of the segments and a second of the normal projection lines passing through the start point of a second of the segments;

in response to said detecting step, constructing a polygon comprising an area bounded by the intersection point and at least two of the normal vectors, said area located on the same side of the vector path as the intersection point in an event that the intersection point is detected; and stroking the path using the constructed polygon.

According to another aspect of the present invention, there is provided an apparatus for performing any of the above-noted methods.

According to another aspect of the present invention, there is provided a computer readable non-transitory storage medium storing a program for directing a processor to perform any of the above-noted methods.

Other aspects of the invention are also disclosed.

BRIEF DESCRIPTION OF THE DRAWINGS

One or more embodiments of the invention will now be described with reference to the following drawings, in which:

FIG. 7 illustrates the concept of and calculation of non-zero winding counts.

FIGS. 20a, 20b, 20c and 20d illustrate an example of stroking a curve segment 2050 in accordance with another implementation of the two polygon embodiment of the present invention;

DETAILED DESCRIPTION INCLUDING BEST MODE

Figure 1A:
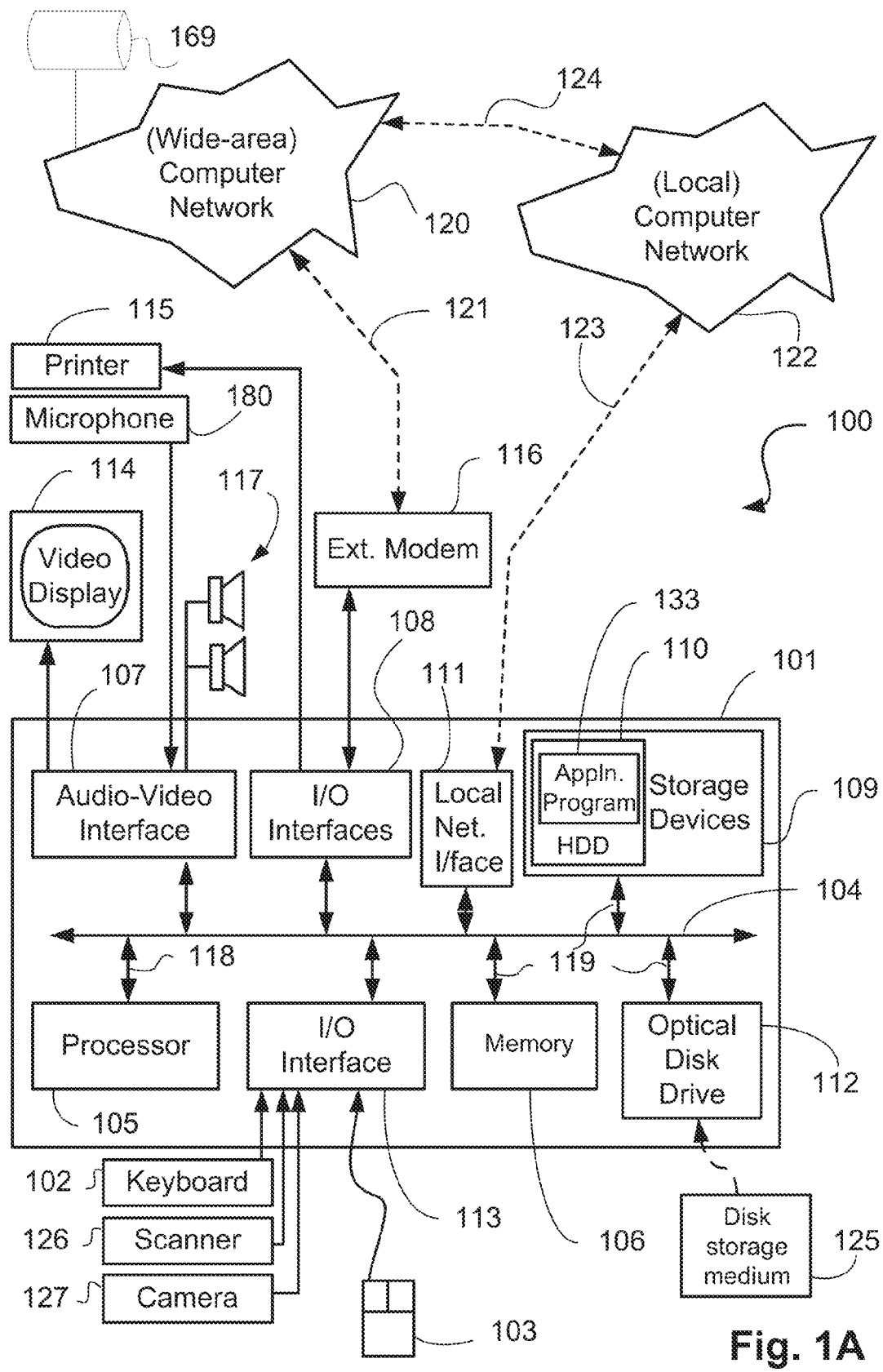
FIGS. 1A and 1B collectively form a schematic block diagram of a data processing architecture useful in the arrangements to be described.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which may form public knowledge through their use. Such discussions should not be interpreted as a representation by the present inventor(s) or the patent applicant that such documents or devices in any way form part of the common general knowledge in the art.

Figure 1B:
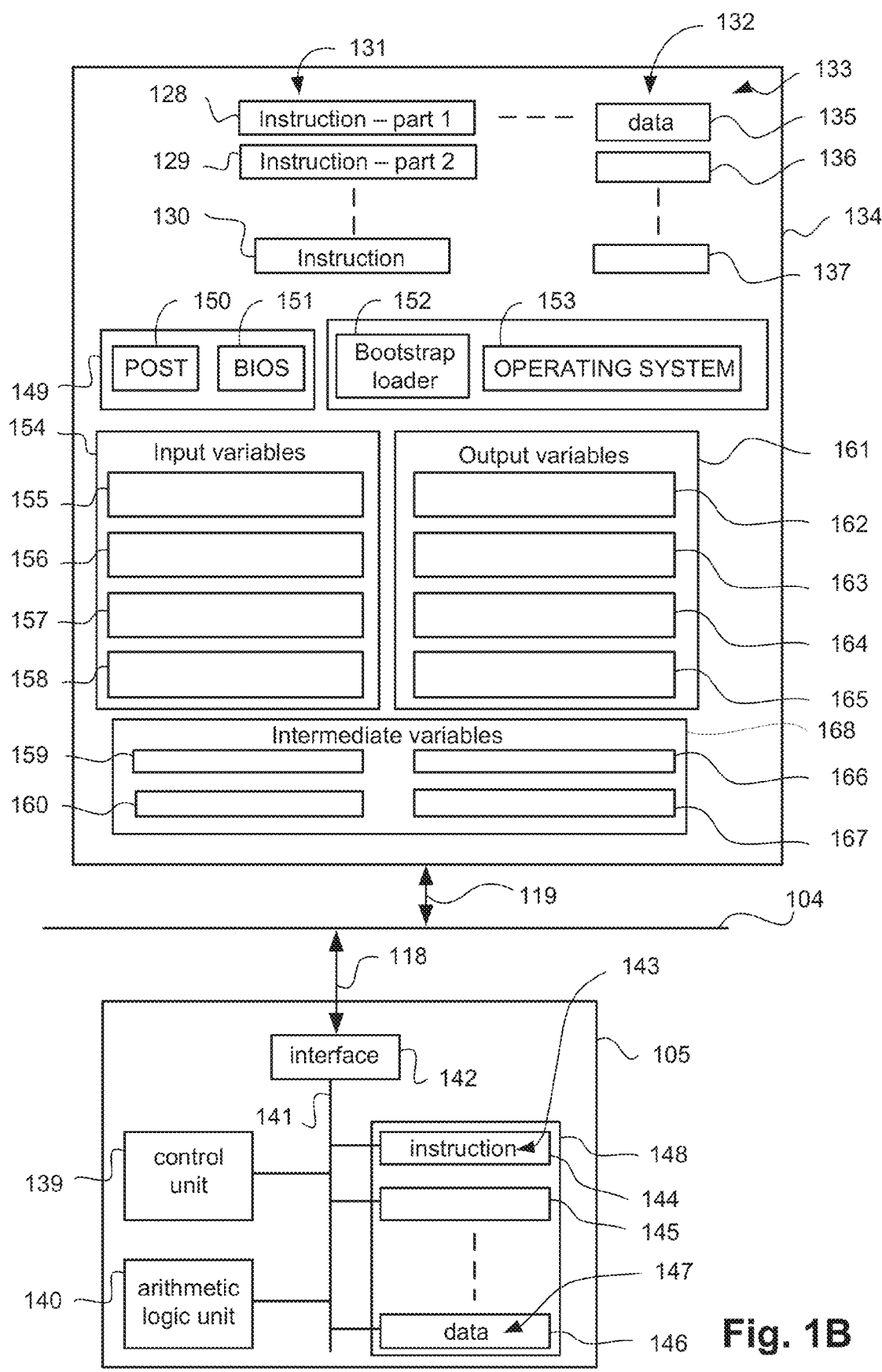

FIGS. 1A and 1B collectively form a schematic block diagram of a general purpose computer system apparatus 100, upon which the various curve stroking arrangements described may be practiced.

As seen in FIG. 1A, the computer system 100 is formed by a computer module 101, input devices such as a keyboard 102, a mouse pointer device 103, a scanner 126, a camera 127, and a microphone 180, and output devices including the printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and semiconductor read only memory (ROM). The module 101 also includes an number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet circuit card, a Bluetooth® wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements may be practised include IBM-PC's and compatibles, Sun Sparcstations, Apple Mac™ or alike computer systems evolved therefrom.

The curve stroking may be implemented using the computer system 100 wherein the processes of FIGS. 11-18b, and 22 to 23, to be described, may be implemented as one or more software application programs 133 executable within the computer system 100. In particular, the steps of the curve stroking are effected by instructions 131 in the software 133 that are carried out within the computer system 100. The software instructions 131 may be formed as one or more code modules, each for performing one or more particular tasks. The software may also be divided into two separate parts, in which a first part and the corresponding code modules perform the curve stroking and a second part and the corresponding code modules manage a user interface between the first part and the user.

The software 133 is generally loaded into the computer system 100 from a computer readable medium, and is then typically stored in the HDD 110, as illustrated in FIG. 1A, or the memory 106, after which the software 133 can be executed by the computer system 100. In some instances, the printing application programs 133 may be supplied to the user encoded on one or more CD-ROM 125 and read via the corresponding drive 112 prior to storage in the memory 110 or 106. Alternatively the curve stroking software 133 may be read by the computer system 100 from the networks 120 or 122 or loaded into the computer system 100 from other computer readable media. Computer readable storage media refers to any non-transitory storage medium that participates in providing instructions and/or data to the computer system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the printing application programs 133 and the corresponding code modules mentioned above may be executed to implement one or more graphical user interfaces (GUIs) to be rendered or otherwise represented upon the display 114, for example. Through manipulation of typically the keyboard 102 and the mouse 103, a user of the computer system 100 and the curve stroking application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 100 should be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The printing application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The disclosed curve stroking arrangements may use input variables: the Bezier curve control points, the flatness tolerance and stroking width as retrieved in step 1210 of method 1200. Input variables are stored in the memory 134 in corresponding memory locations 155-158. Examples of input variables 154 that may be used in the disclosed curve stroking arrangements include:
  Control points;
  Flatness tolerance;
  Stroking width The curve stroking arrangements produce output variables 161 that are stored in the memory 134 in corresponding memory locations 162-165. Examples of output variables 161 that may be used in the disclosed curve stroking arrangements include:
  Stroking polygon path Intermediate variables 168 may be stored in memory locations 159, 160, 166 and 167. Examples of intermediate variables 168 that may be used in the disclosed curve vectorisation arrangements include:
  curve function parameter values
  loop counters
  flatness tolerances
  points
  path arrays
  memory pointers The register section 144-146, the arithmetic logic unit (ALU) 140, and the control unit 139 of the processor 105 work together to perform sequences of micro-operations needed to perform "fetch, decode, and execute" cycles for every instruction in the instruction set making up the curve stroking program 133. Each fetch, decode, and execute cycle comprises:
  (a) a fetch operation, which fetches or reads an instruction 131 from a memory location 128;
  (b) a decode operation in which the control unit 139 determines which instruction has been fetched; and
  (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 11-18b, and 22 to 23 is associated with one or more segments of the curve stroking program 133, and is performed by the register section 144-147, the ALU 140, and the control unit 139 in the processor 105 working together to perform the fetch, decode, and execute cycles for every instruction in the instruction set for the noted segments of the program 133.

The curve stroking method may alternatively be implemented in dedicated hardware such as one or more gate arrays and/or integrated circuits performing the curve stroking functions or sub functions. Such dedicated hardware may also include graphic processors, digital signal processors, or one or more microprocessors and associated memories. If gate arrays are used, the process flow charts in FIGS. 11-18b, and 22 to 23 may be converted to Hardware Description Language (HDL) form. This HDL description may be converted to a device level netlist which is used by a Place and Route (P&R) tool to produce a file which is downloaded to the gate array to program it with the design specified in the HDL description.

Although the curve stroking arrangement in FIGS. 11-18b, and 22 to 23 shows the curve stroking process being effected in the free standing computer 101, the curve stroking arrangement may also be implemented in the printer 115 itself or elsewhere in a networked system. The curve stroking arrangement may also be implemented using other arrangements of functional modules.

Figure 11:
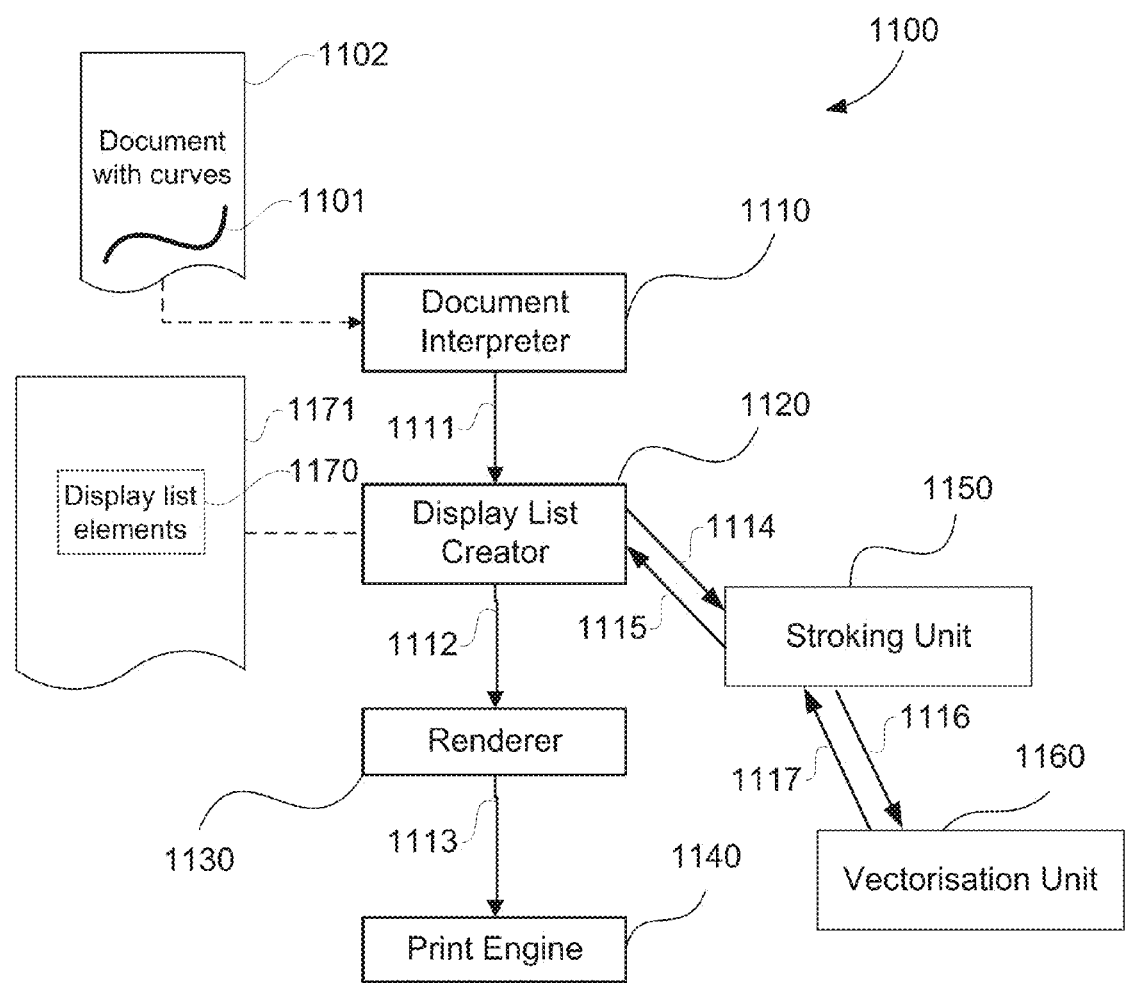
FIG. 11 is a schematic block diagram of a printing arrangement according to the present disclosure.

FIG. 11 is a functional block diagram of a printing arrangement 1100. The printing arrangement 1100 may be implemented at least in part by the printing application program 133 referred to above and may be invoked when a printing function is selected by another application (not shown) executing on the computer system 100. That other application may be any source of printable data containing a curve such as a word processing application, a browser, a graphics drawing package, and so forth.

The printing arrangement 1100 operates on a page description of a document that is to be printed. The document 1102 to be printed may comprise a curve 1101. In this regard, the printing arrangement 1100 may in part execute within the computer module 101 to interpret and render the page description of the curve 1101 into line (linear) segments for reproduction on the printer 115. Alternatively the printing arrangement 1100 may execute within the printer 115 that receives a page description from the computer module 101 and, in this implementation, the printer 115 performs the document interpreting and rendering as part of a print reproduction process.

In the printing arrangement 1100 illustrated as performed by the general purpose computer system 100, the document 1102 comprising the input curve 1101 that is submitted for printing is received by the processor 105 in the computer module 101 from the memory 106 and interpreted by a document interpreter 1110 that is implemented as one or more software modules in the application program 133 running on the processor 105. The document interpreter 1110 generates drawing commands that are sent, as depicted by an arrow 1111, to a display list creator 1120 that is implemented as one or more software modules in the application program 133 running on the processor 105. The display list creator 1120 translates the drawing commands into a display list 1171 made up of display list elements 1170. A display list (or display file) is a series of graphics commands that define an output image. The image is created (rendered) by executing the commands. When the display list 1171 for a single page of the document 1102 is completed, the display list 1171 is sent, as depicted by an arrow 1112 to a renderer 1130 for rendering, the renderer being implemented as one or more software modules in the application program 133 running on the processor 105 or alternately as one or more software modules in an application program (not shown) running on a processor (not shown) in the printer 115. The display list 1171 is in a format that can be easily processed by the renderer 1130. The renderer 1130 processes the display list and generates pixel data which is sent, as depicted by an arrow 1113 to a print engine 1140 in the printer 115 for printing the pixel data onto a hard copy medium, such as paper or film. As noted, the document interpreter 1110, the display list creator 1120 and the renderer 1130 may implemented as software modules in the software application 133 executable on the computer module 101, or as a separate purpose-designed hardware (or hybrid hardware/software) module configured and operable within the printer 115.

The Display List Creator 1120 stores the display list elements 1170 in the memory 106 as the display list is built. When the display list 1171 is completed, the display list 1171 may be stored in the memory 106 or 110 and is sent, as depicted by the arrow 1112, to the renderer 1130. The renderer 1130 reads the display list elements 1170 from the memory 106. The renderer 1130 in the presently described implementations is configured to render straight lines, and as such all the curve drawing commands passed from the document interpreter 1110 must be converted by the display list creator 1120 into straight lines. This conversion is done by a stroking unit 1150. The display list creator 1120 passes the necessary data describing the curve, as depicted by the arrow 1114, into the Stroking unit 1150 that is implemented as one or more software modules in the application program 133 running on the processor 105. The stroking unit 1150 passes the necessary data describing the curve, as depicted by the arrow 1116, into a Vectorisation unit 1160 that is implemented as one or more software modules in the application program 133 running on the processor 105. The Vectorisation Unit converts the curve into a series of straight line, linear, segments, collectively known as a "vectorized curve path", or "centre line path", and returns an array of points describing the vectorisation and the actual number of points within the array as depicted by the line 1117, to the Stroking Unit 1150. The Stroking Unit 1150 strokes the vectorized curve path, and returns data describing the stroking polygon path as depicted by the line 1115, to the display list creator 1120 for inclusion into the display list elements 1170. The "stroked vectorized curve path" may also be known as the "stroked path", or the "stroking polygon". The process of stroking a vectorized curve is described hereinafter in more detail with reference to FIGS. 1a, 1b, 2, 4a, 4b, 6a, 6c, and 7-24d.

Within the arrangements described with reference to FIGS. 1a, 1b, 2, 4a, 4b, 6a, 6c, and 7-24d, the document 1102 only contains cubic Bezier curves. As a result, the stroking unit 1150 only supports the stroking of cubic Bezier curves. The vectorisation unit 1160 can vectorise both cubic Bezier curves and circular arcs. The arrangements to be described however are not limited to operation upon Bezier curves, and can apply to any splines or curves with calculable vectorisation. "Vectorisation means the process of breaking down a curve into short straight segments, which closely approximate the original curve, with an acceptable tolerance. The tolerance is such that there is no visual difference between the curve and the collection of segments". This can include, for example, elliptical curves.

The non-zero winding rule for filling a shape means that all points whose winding counts with respect to the shape are not zero are coloured with the fill colour. "Winding count" is a means of determining whether a given point falls within an enclosed path. It can be calculated as follows: For a given path C and a given point P, construct a ray (a straight line) heading out from P in any direction towards infinity. Find all the intersections of C with this ray. Score up the winding number as follows: set the score to zero, then for every clockwise intersection (the path passing through the ray from left to right, as viewed from P) add 1 to the score; for every counter-clockwise intersection (path passing from right to left, as viewed from P) subtract 1 from the score. The resultant score is the winding count of P with respect to C.

An example of winding counts is shown in FIG. 7. This figure depicts a point 700 and a path 705. A ray 710 is extended out from the point 700, and crossings are checked. There are 2 crossings. At 715 the curve crosses the ray from left to right as viewed from point P 700, and at 720 the curve also crosses the ray from left to right as viewed from point P 700. This gives a winding count of '2' for the point P. Note that it does not matter which ray is chosen for the calculation. The values of winding counts can be calculated for all points inside the path 705.

Visually, the offset path stroking approach can be considered as being similar to an approximation of left and right sides of the pen as it is dragged along the curve segment. Although this approach has better speed than the brute-force approach, since fewer edges are processed, it produces incorrect output for some instances of curve segments, as illustrated in FIG. 5a.

Figure 5A:
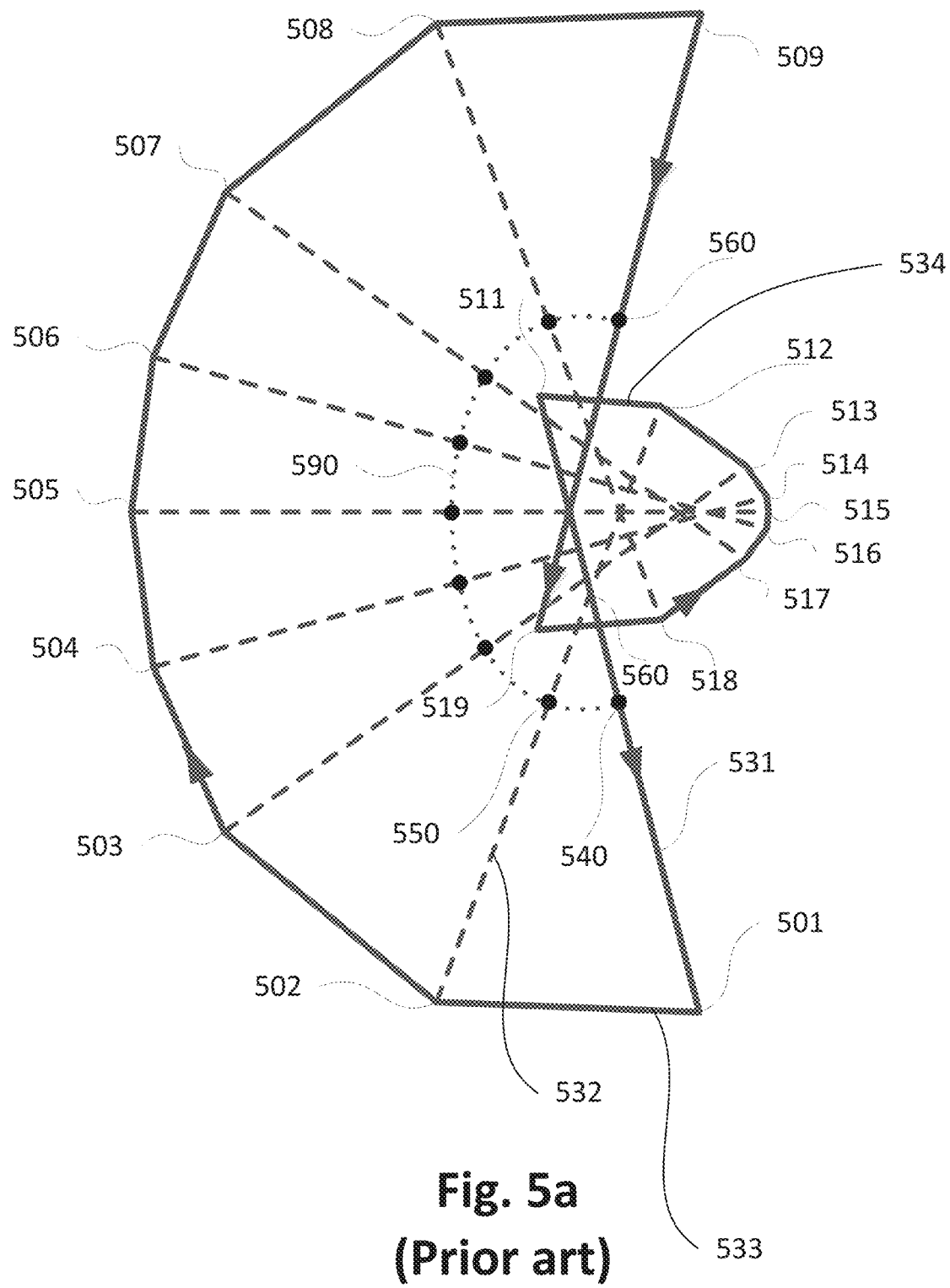
FIGS. 5a, 5b and 5c give an example demonstrating an exemplary problem arising from stroking a curve in accordance with an implementation of the offset curve approach.
Figure 5B:
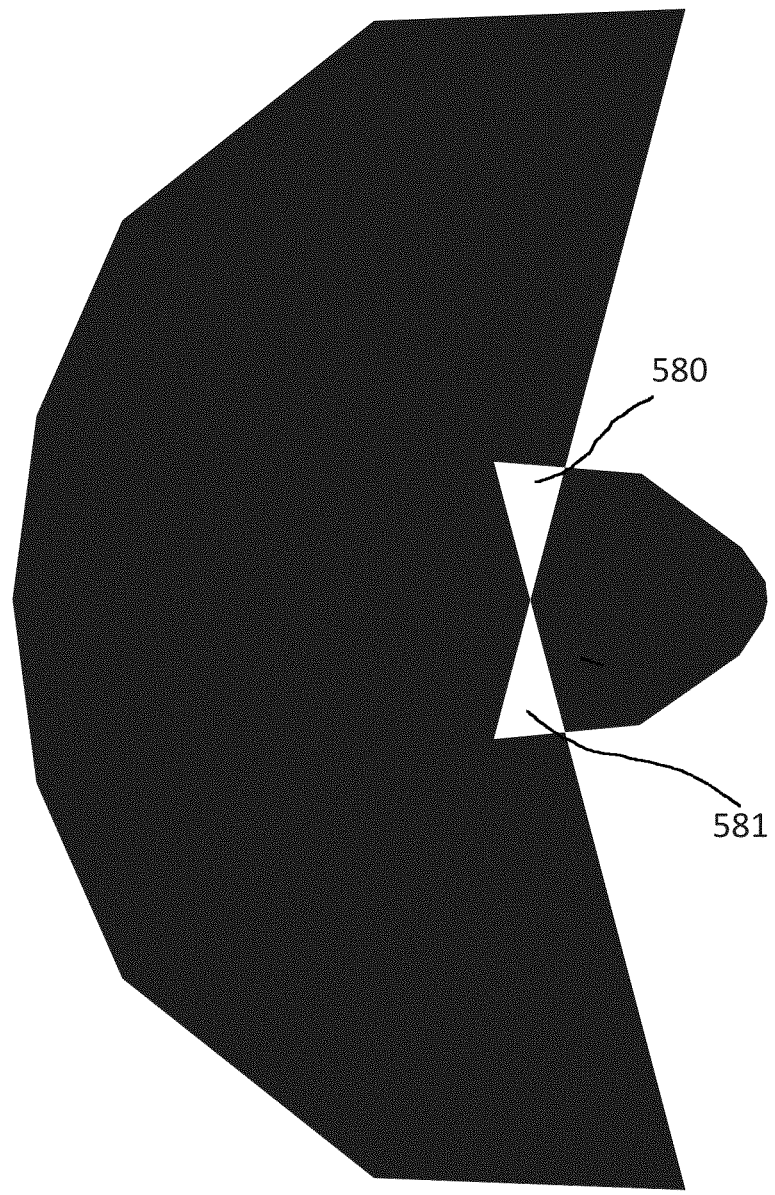
Figure 5C:
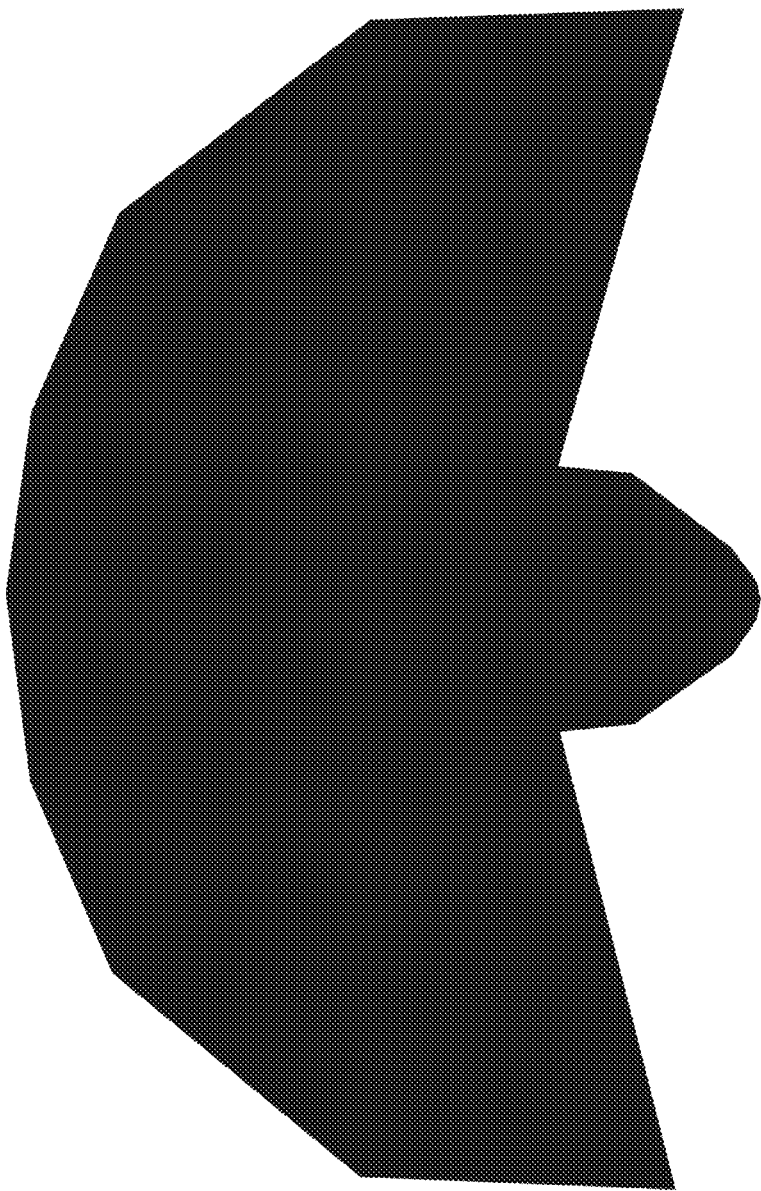

In FIG. 5a, a curve 590 is stroked using the offset curve approach. Points are generated along the curve in the order from 540 to 560. Each point is projected based on its corresponding normal line to form a left offset path (501 to 509) and a right offset path (511 to 519). The final stroke polygon is represented using solid black lines. FIG. 5b shows output of the stroking, after the final stroke polygon has been filled. The middle regions 580 and 581 depict occurrence of voids of the stroke and these are not filled as they have a winding count of zero. For comparison, FIG. 5c illustrates the desired output if the same curve segment 590 depicted in FIG. 5a is stroked correctly according to a VFS arrangement.

One Polygon Embodiment

The drawing space is a coordinate space in which stroking is performed. Points, curves, lines and segments are expressed in the drawing space. The stroking polygon path returned by the stroking unit 1150 (see FIG. 11) is expressed in the drawing space and is eventually transformed to the pixel space by the display list creator 1120.

The vectorisation of a curve results in a series of straight line segments, referred to as a "vectorisation curve", forming a path which approximates the curve. The flatness tolerance defines the maximum permitted distance between the input curve and its vectorisation curve.

The stroke width is the thickness, typically pre-determined, of a stroking operation. The stroke width is expressed in the drawing space.

From a notation perspective, the coordinates of points specified in the drawing space are referred to as "x" and "y". These coordinates are represented by concatenating symbols ".x" and ".y" to the values of the points. Thus for example for a point A, A.x denotes the x-coordinate and A.y denotes the y-coordinate.

"The notation "[A,B]" is used to denote a segment from the point A to the point B. Thus, for example, with reference to FIG. 8, the notation [Ao,Bo] denotes the segment 825 between the point Ao 821, and Bo 822.

The term "Left offset point" and "right offset point" will now be defined.

In order to define left or right offset point it is first necessary to define the left and right sides of a segment.

A left side of a segment [A, B] is a side that is to the left hand side from the perspective of an observer located at the point A and who is looking towards the point B, the other side being the right side. Accordingly, an arrow 826 points to an area on the left side of the segment [A, B] and an arrow 827 points to an area on the right side of the segment [A, B].

The "Left offset point for point A of segment [A,B]" is a point that is located at the end of a vector which has a length of half the stroking width, is perpendicular to the segment [A,B], is on the left side of segment [A,B] and originates from point A.

Similarly, The "Right offset point for point A of segment [A,B]" is the point that is located at the end of a vector which has a length of half the stroking width, is perpendicular to the segment [A,B], is on the right side of segment [A,B] and originates from point A.

Figure 8:
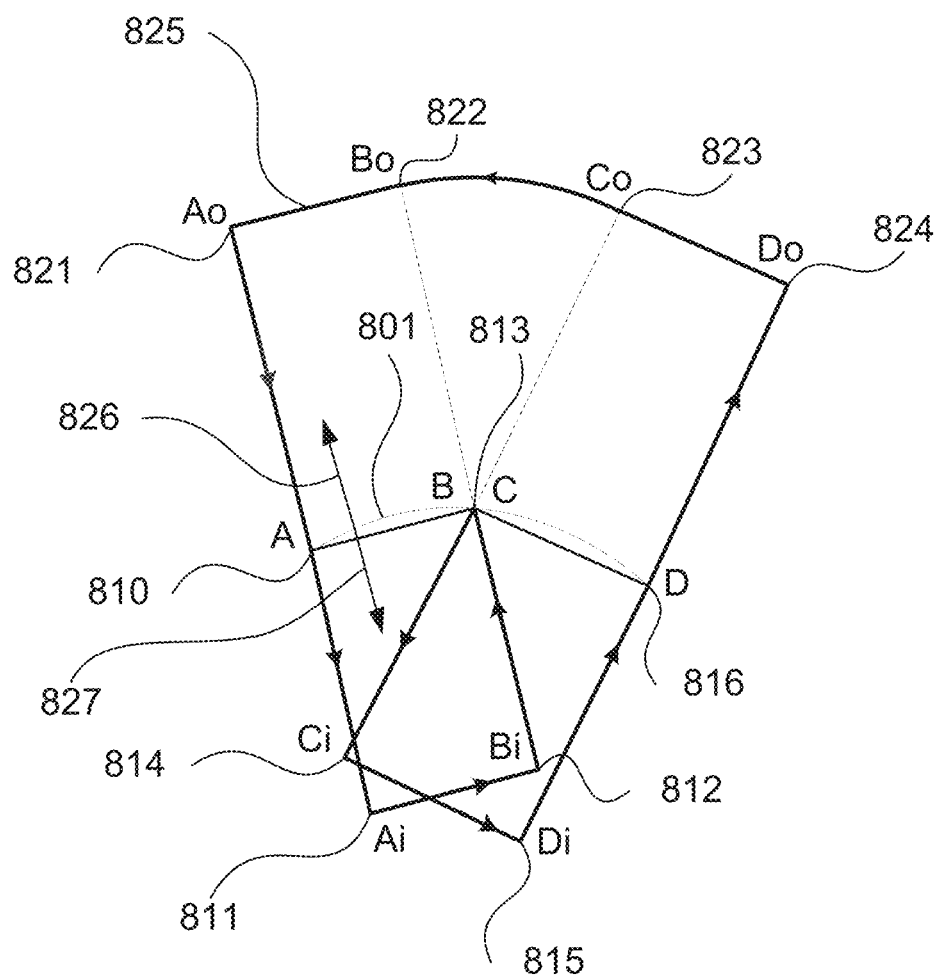
FIG. 8 is an example of stroking two adjacent consecutive segments of join "Type 2"

For example, with the reference to FIG. 8, the left offset point for point A of segment [A,B] is Ao, 821 and the right offset point for point B of segment [A,B] is Bi, 812.

It is to be noted that in FIG. 8 the stroking width is the distance between the point Ao, 821 and Ai, 811.

Several intermediate variables are used in methods 1300, 1400, 1500, 1600 and 1620, described hereinafter with reference to respective FIGS. 13, 14, 15, 16A and 16B. In particular, intermediate variables are used to store points, arrays of points and memory references.

Intermediate variables used to store "Point" type variables hold 2 floating-point or fixed point values representing their x and y coordinates. A point type variable has a name, such as for example 'A' and may be referred to as simply "Point A" or "intermediate variable A".

Intermediate variables used to store arrays of points hold a variable number of "Point" type variables. A point array type variable has a name, such as for example 'LeftArr' and may be referred to as simply "array LeftArr" or "intermediate variable array LeftArr".

Intermediate variables used to store memory references hold a value that is an address in the memory 106. A memory reference type variable has a name, such as for example 'pOutsideArr' and may be referred to as simply "array pOutsideArr".

The following operations on intermediate variables will be now defined.

"Point A is set to point B" refers to the process of copying the value of point B into point A (i.e. A.x=B.x; A.y=B.y).

"Point A is added to array LeftArr", where LeftArr is a point array type variable, refers to the process of adding a new point at the end of array LeftArr and setting the value for the new point to be the values of the intermediate variable A.

Figure 14:
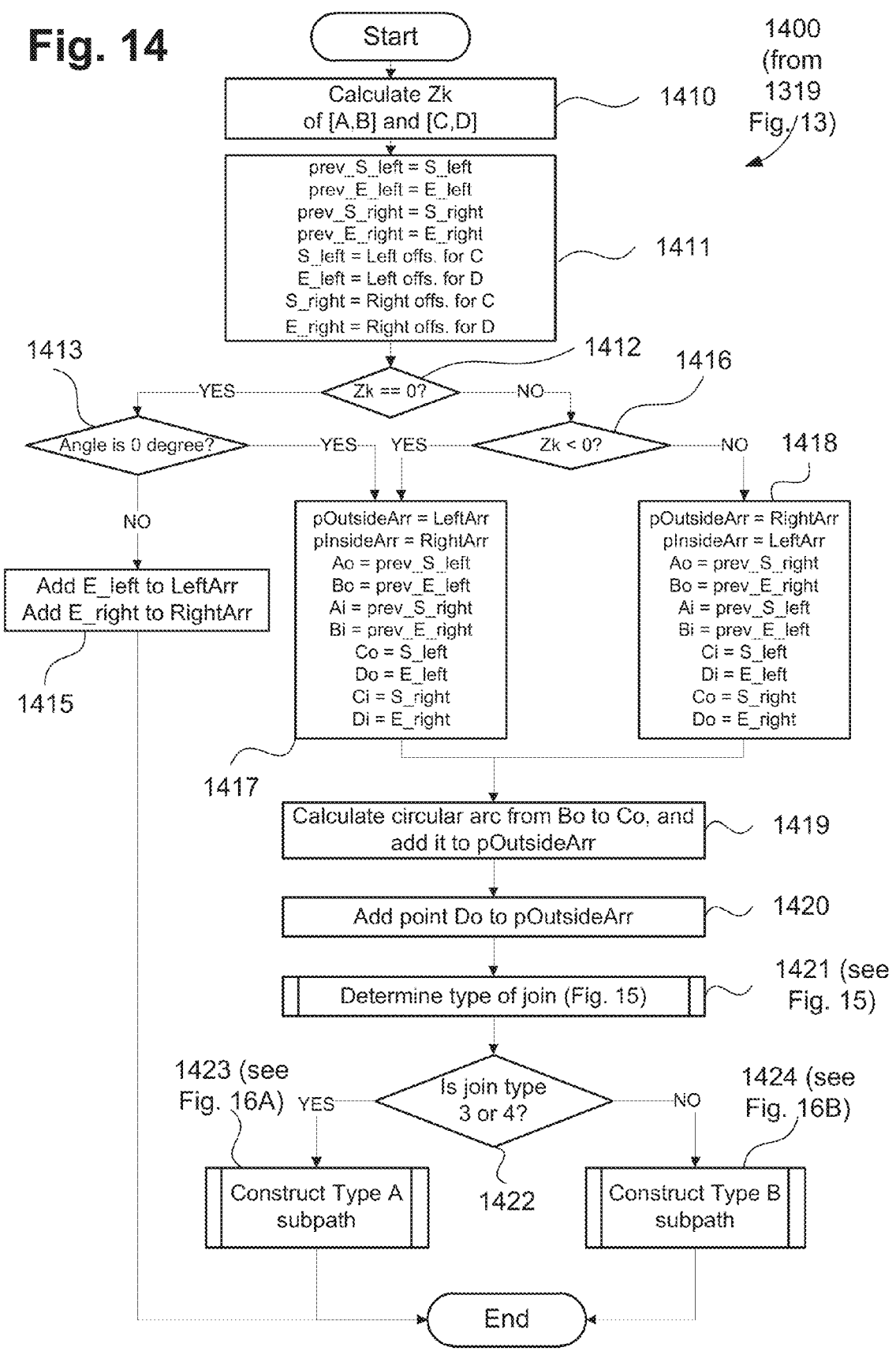
FIG. 14 is a detailed flow diagram of the processing method for joining of two consecutive segments in a process of stroking a vectorized curve path.
Figure 15:
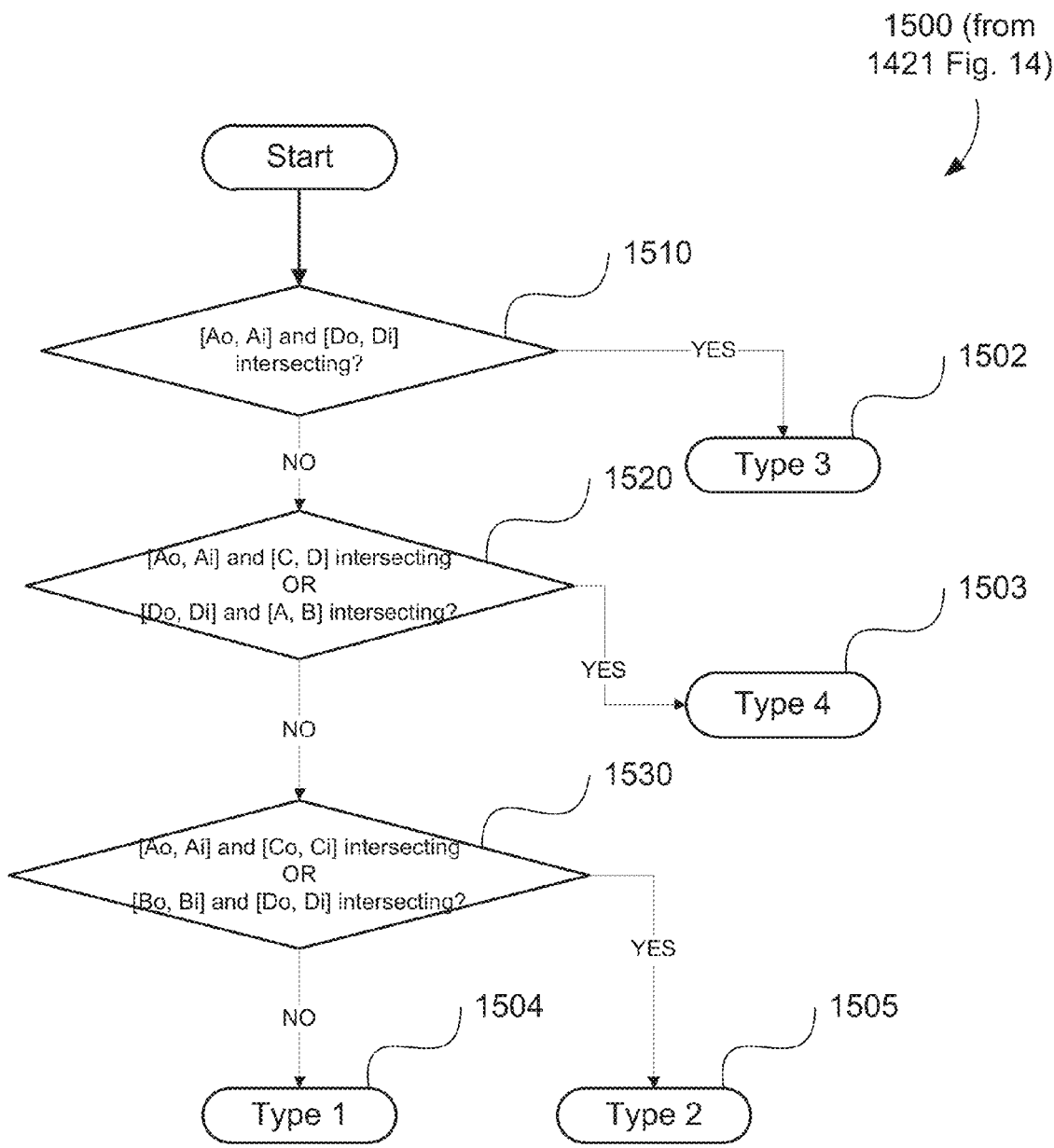
FIG. 15 is a schematic flow diagram illustrating a method of determination of a join type.

FIG. 15 is a detailed flow diagram of the processing method 1500. The processing method 1500, called by the step 1421 in FIG. 14 and effected by the processor 105 executing the software program 133, determines a join type of the two adjacent consecutive segments [A, B] and [C, D]. The process 1500 uses the same intermediate variables A, B, C, D, Ao, Bo, Co, Do, Ai, Bi, Ci, Di which are also used in the processing methods 1300 and 1400.

In the processing method 1500 several tests are made to see whether two segments are intersecting. Within this process, the evaluation of segment intersection is made by determining if an intersection point of these segments exists. If two segments have an intersection point, then the segments intersect. Finding an intersection point of two segments is well known in the art technique and is not described in this description.

The processes 1500 begins with a step 1510.

At the step 1510 a test is made by the processor 105 executing the program 133 to check whether the segments [Ao, Ai] and [Do, Di] intersect. If the test step 1510 returns YES, the process 1500 proceeds to a step 1502. The process 1500 finishes at the step 1502 and returns, by the processor 105 executing the program 133, a value of "Type 3" join type to the caller process 1421 in FIG. 14. If the test 1510 returns NO, the process 1500 proceeds to a step 1520.

At the step 1520 a test is made by the processor 105 executing the program 133 to check whether the segments [Ao, Ai] and [C, D] intersect or whether segments [Do, Di] and [A, B] intersect. If the test 1520 returns YES, the process 1500 proceeds to a step 1503. The process 1500 finishes at step 1503 and returns a value of "Type 4" join type to the caller process 1421. If test 1520 returns NO, the process 1500 proceed to step a 1530.

At the step 1530 a test is made by the processor 105 executing the program 133 to check whether the segments [Ao, Ai] and [Co, Ci] intersect or whether segments [Bo, Bi] and [Do, Di] intersect. If the test 1530 returns YES, the process 1500 proceeds to a step 1505. The process 1500 finishes at step 1505 and returns a value of "Type 2" join type to the caller process 1421. If the test 1530 returns NO, the process 1500 proceeds to step a 1504. The process 1500 finishes at the step 1504 and returns a value of "Type 1" join type to the caller process 1421.

FIGS. 9A, 9B, 9C and 9D illustrates the various join types: "Type 1" in FIG. 9A, "Type 2" in FIG. 9B, "Type 3" in FIG. 9C, and "Type 4" in FIG. 9D.

Figure 9A:
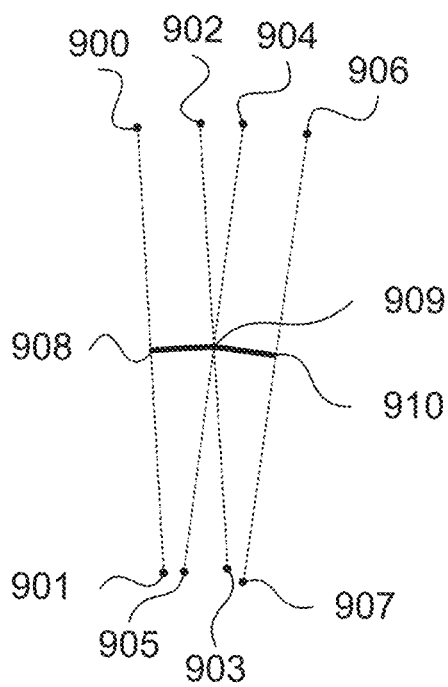
FIG. 9A illustrates an example of join "Type 1"

FIG. 9A represents an example of a join type "Type 1", wherein points perpendicular to the segments [A, B] and [C, D] created during the stroking process are as follows: A-908, B-909, C-909, D-910, Ao-900, Bo-902, Co-904, Do-906, Ai-901, Bi-903, Ci-905, Di-907.

Figure 9B:
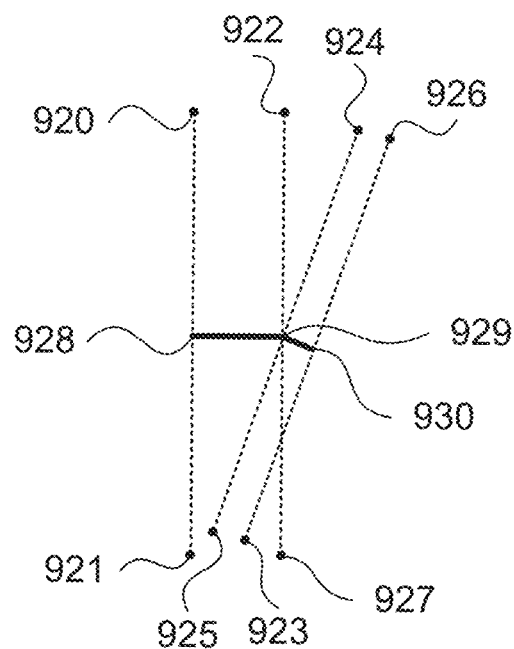
FIG. 9B illustrates an example of join "Type 2"

FIG. 9B represents an example of a join type "Type 2", wherein points perpendicular to the segments [A, B] and [C, D] created during the stroking process are as follows: A-928, B-929, C-929, D-930, Ao-920, Bo-922, Co-924, Do-926, Ai-921, Bi-927, Ci-925, Di-923. As seen on FIG. 9B, segment [Bo, Bi] intersects with [Do, Di], and this is the feature that distinguishes "Type 2" join from other types of joins.

Figure 9C:
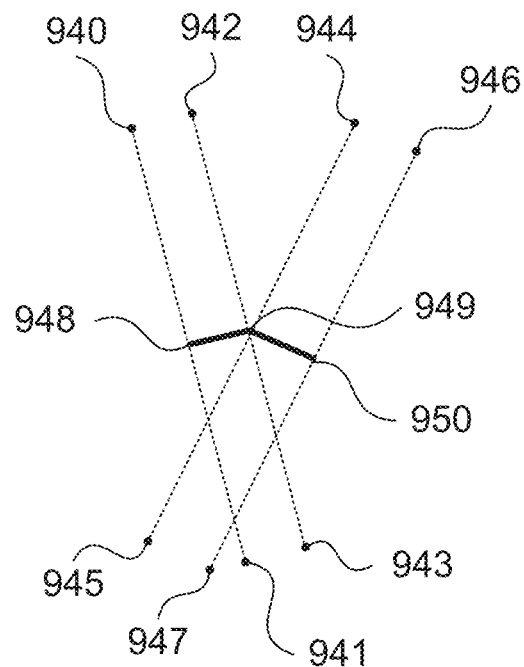
FIG. 9C illustrates an example of join "Type 3"

FIG. 9C represents an example of a join type "Type 3", wherein points perpendicular to the segments [A, B] and [C, D] created during the stroking process are as follows: A-948, B-949, C-949, D-950, Ao-940, Bo-942, Co-944, Do-946, Ai-941, Bi-943, Ci-945, Di-947. As seen on FIG. 9C, segment [Ao, Ai] intersects with [Do, Di], and this is the feature that distinguishes "Type 3" join from other types of joins.

Figure 9D:
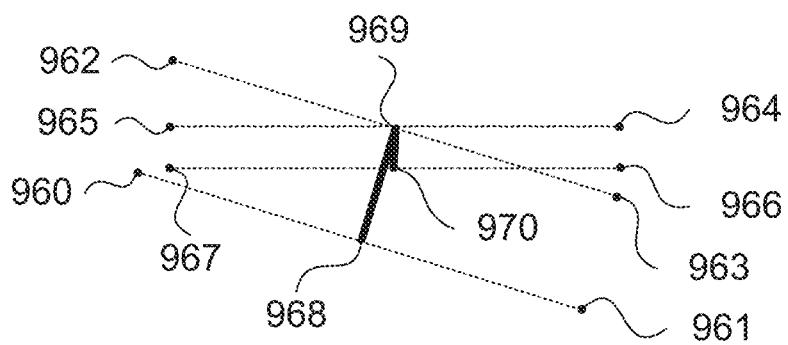
FIG. 9D illustrates an example of join "Type 4"

FIG. 9D represents an example of a join type "Type 4", wherein points perpendicular to the segments [A, B] and [C, D] created during the stroking process are as follows: A-968, B-969, C-969, D-970, Ao-960, Bo-962, Co-964, Do-966, Ai-961, Bi-963, Ci-965, Di-967. As seen on FIG. 9D, segment [Do, Di] intersects with segment [A, B], and this is the feature that distinguishes "Type 4" join from other types of joins.

After the type of the join between the two segments [A, B] and [C, D] is determined, the process proceeds to construct the offset curve depending on the type of the join.

Figure 12:
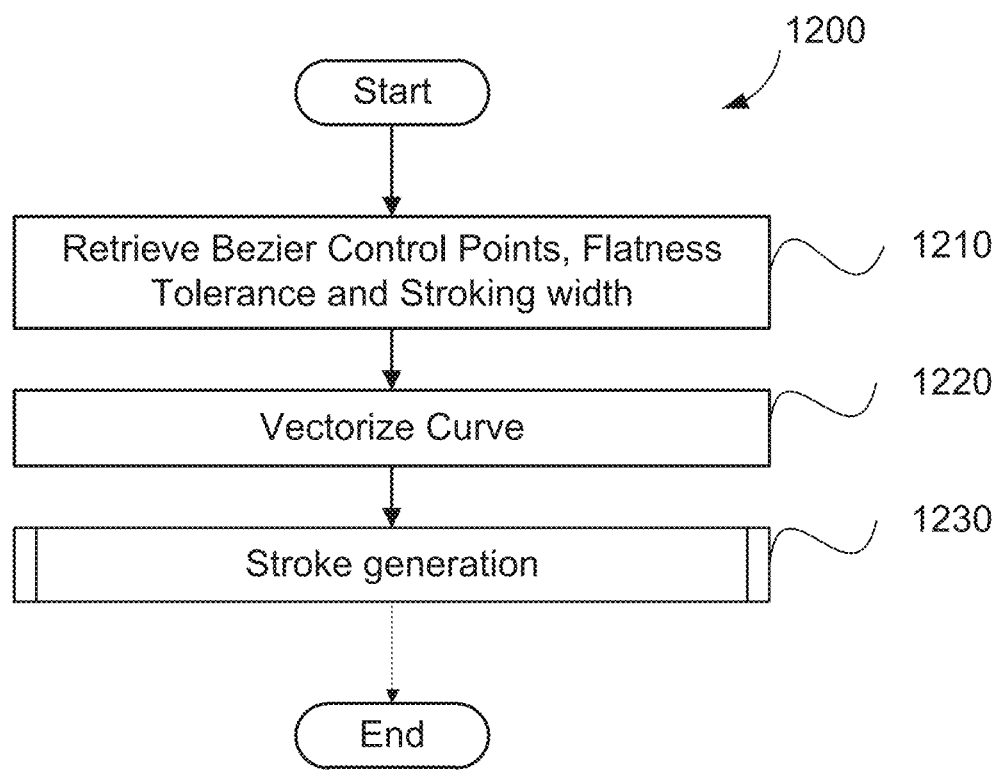
FIG. 12 is a schematic block diagram illustrating a typical process of stroking a curve, not specific to this invention.

A schematic block flow diagram of the exemplary implementation of the VFS arrangement is shown in FIG. 12. This process 1200 is implemented on a computer system defined by 100. The method 1200 is invoked by the stroking unit when a cubic Bezier curve needs to be stroked after the type of the join is determined using the method explained with reference to FIG. 15 previously. A first step 1210 involves accessing, by the processor 105 executing the program 133, the Bezier control points, the flatness tolerance and the stroking width within the memory unit 106. A step 1220 then follows by using the processor unit 105 to vectorise the Bezier curve such that the flatness tolerance is satisfied.

Several techniques to vectorise cubic Bezier curves are well known in the art. Within this arrangement, the vectorisation as at step 1220 is performed using Bezier curve vectorisation. The output of the step 1220 is an array of points describing the vectorisation and the actual number of points within the array. The points in the array are ordered such that each neighbouring pair of points are grouped together to form adjacent line segments.

Figure 2:
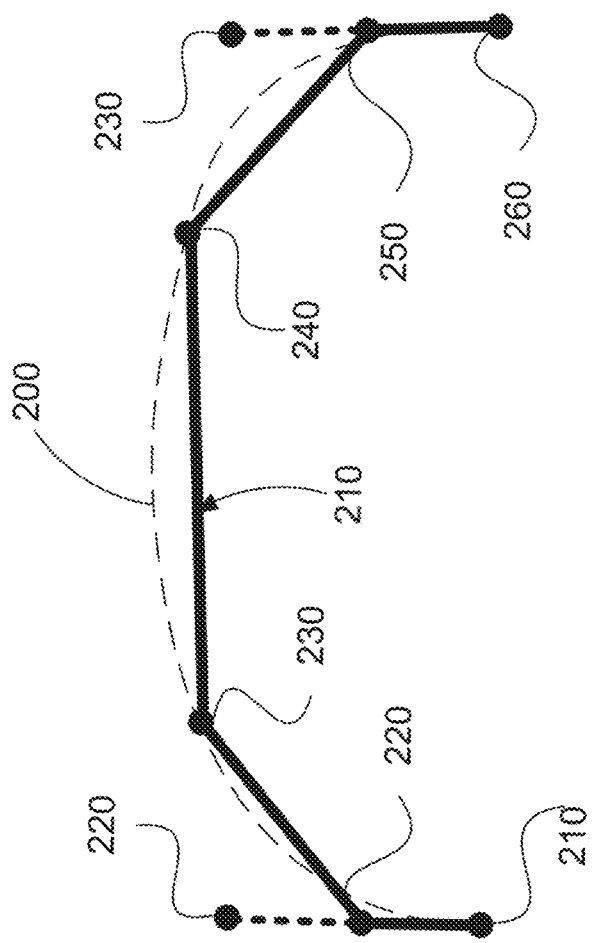
FIG. 2 is an example of a vectorised curve.
Figure 3:
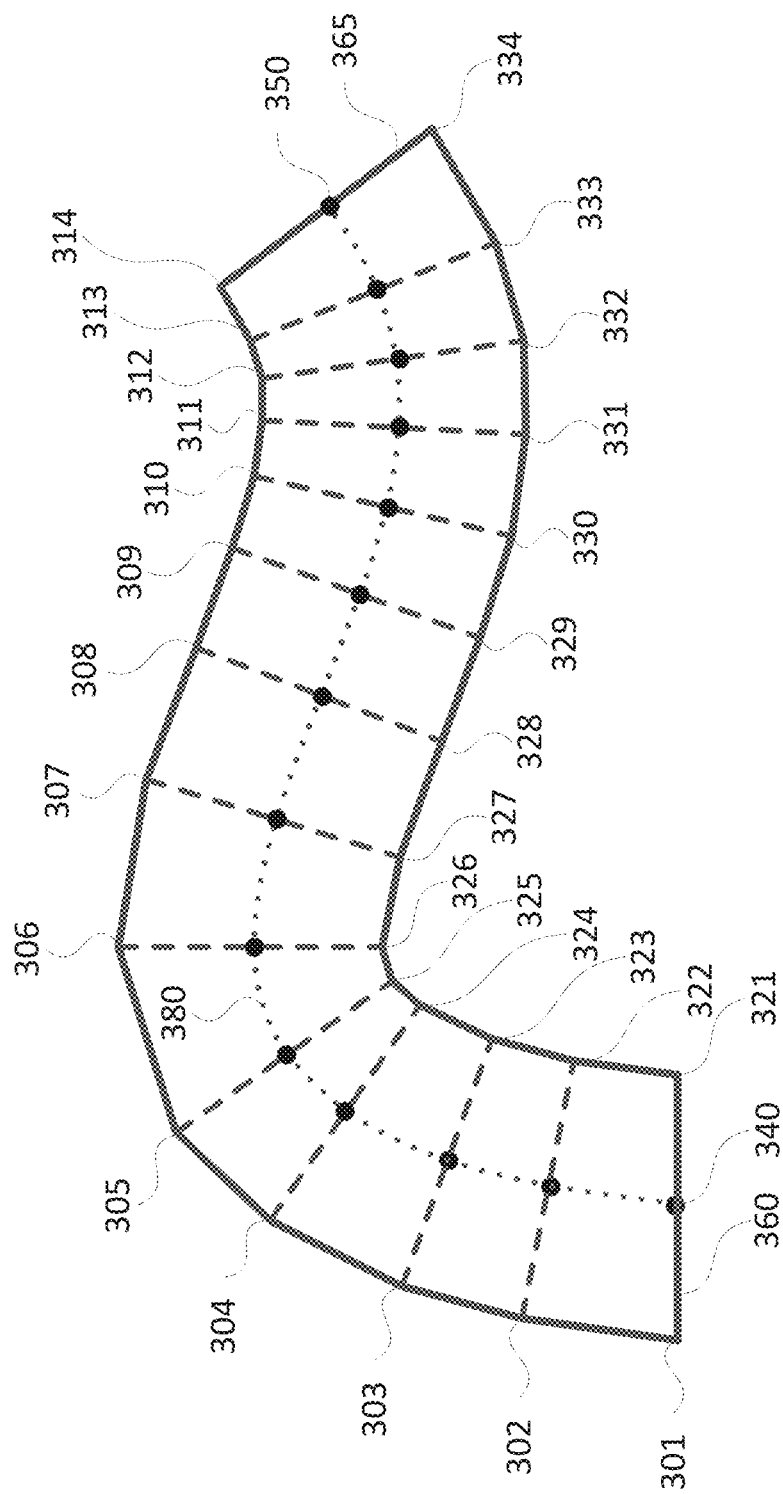
FIG. 3 is an example of stroking a curve segment in accordance with an implementation of the offset curve approach.

FIG. 2 illustrates an example output of the vectorisation unit 1160 when input with the Bezier curve 200. A Bezier curve 200 is defined by four points. The four points consist of two endpoints 210 and 260, and two control points 220 and 230. As seen in FIG. 2, an output path 210 consists of the six points 210, 220, 230, 240, 250 and 260.

In practice, a large number of closely spaced points are generated, however for the purpose of illustration only a small number of points are shown in the examples given. This means the final stroke polygons may appear jagged, however, the resolution of points may be increased to afford a smooth final output. The present VFS arrangement is compatible with any suitable vectorisation technique.

After the step 1220 the process 1200 moves to a step 1230, at which a stroking polygon path is generated for the Bezier curve. The stroking polygon path is a point array type variable which is returned to the caller of the method 1200. The sub-process 1230 is described hereinafter in more detail in regard to FIGS. 13, 14, 15 and 16.

After the step 1230, the process 1200 finishes.

Note, processing methods 1300, 1400, 1500, 1600 use and share the following intermediate variables which are stored in the memory 168:

A, Ao, Ai, B, Bo, Bi, C, Co, Ci, D, Do, Di, S_left, S_right, E_left, E_right, LeftArr, RightArr, pInsideArr, pOutsideArr, wherein:
Intermediate variables A, Ao, Ai, B, Bo, Bi, C, Co, Ci, D, Do, Di, S_left, S_right, E_left and E_right are "Point" type variables;
Intermediate variables LeftArr and RightArr are "Array of points" type variables;
Intermediate variables pInsideArr and pOutsideArr are "Memory pointers" type variables that hold a memory address pointing to an array of points.

Figure 13:
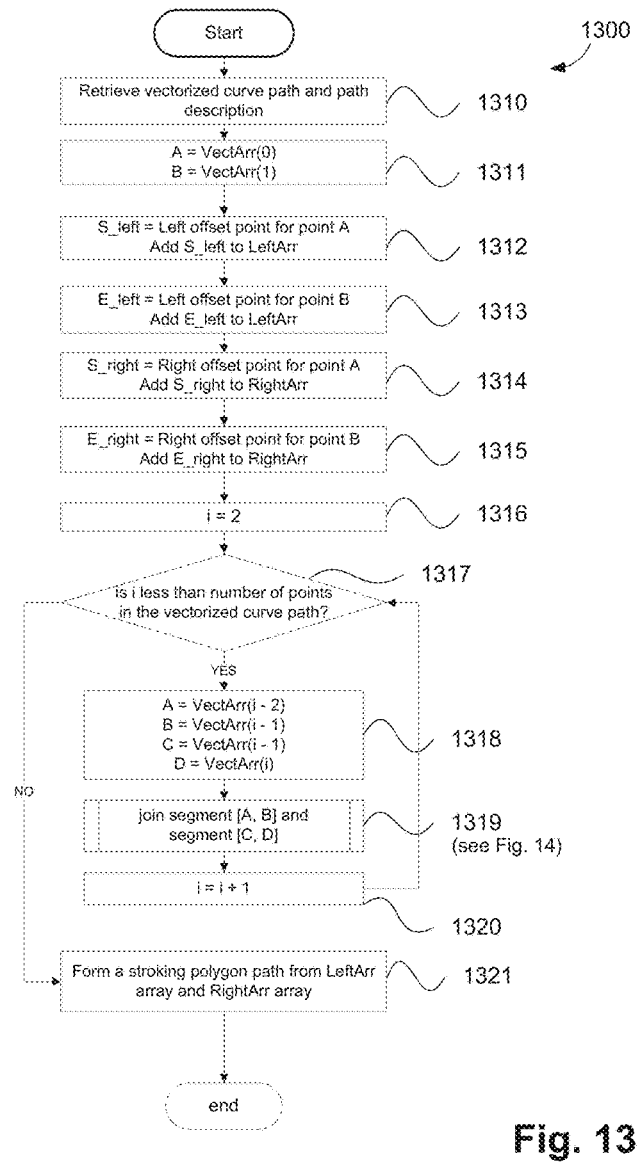
FIG. 13 is a schematic flow diagram illustrating the processing method of stroking a vectorized curve.

FIG. 13 is a schematic flow diagram illustrating the processing method 1300 of stroking a vectorized curve path.

In an entry step 1310, the stroking process, effected by the processor 105 executing the software program 133, commences by retrieving the array of points describing the vectorisation and the actual number of points within the array which was generated by the vectorisation unit at the step 1220 of the method 1200. Within this arrangement description, the array of points that represents the vectorized curve path will be referred as to "VectArr" for convenience. Furthermore, the following notation as "VectArr(n)" will be used to address a point that is located at the index (n) of the vectorized curve path array "VectArr", wherein (n) is an integer number. For example, with reference to FIG. 2, VectArr (0) addresses the point 210, VectArr (1) addresses to the point 220 in the vectorized curve path array that contains points 210, 220, 230, 240, 250, 260. Also, at the step 1310 arrays LeftArr, RightArr are initialised to empty arrays with 0 elements. After completion of the step 1310, the process 1300 proceeds to a step 1311.

In step 1311, effected by the processor 105 executing the software program 133, a point A is set to VectArr(0), and a point B is set to VectArr(1). After completion of the step 1311, the process 1300 proceeds to a step 1312.

In the step 1312, S_left is set to a point which is the left offset point for the point A of segment [A,B], and then the point S_left is added to the array LeftArr. The process 1300 proceeds to a step 1313.

In the step 1313, effected by the processor 105 executing the software program 133, E_left is set to the point which is the left offset point for point B of segment [A,B]. Then, the point E_left is added to the array LeftArr. The process 1300 then proceeds to a step 1314.

In the step 1314, effected by the processor 105 executing the software program 133, S_right is set to the point which is the right offset point for point A of segment [A,B]. Then, the point S_right is added to the array RightArr. The process 1300 then proceeds to a step 1315.

In the step 1315, effected by the processor 105 executing the software program 133, E_right is set to the point which is the right offset point for point B of segment [A,B]. Then point E_right is added to the array RightArr. The process 1300 then proceeds to step 1316.

As can be seen, the steps from 1311 to 1315 define how the first segment of the vectorized curve path is processed.

At a following step 1316, effected by the processor 105 executing the software program 133, array index i is set to the value of 2, and the process 1300 proceeds to a next step 1317.

Steps 1317 to 1319 form a loop that processes the remaining points of the vectorisation. The step 1317, effected by the processor 105 executing the software program 133, is a decision step where the processor 105 checks if the array index i is less than the number of points in the vectorized curve path array. If the step 1317 evaluates to YES, the process 1300 proceeds to a step 1318.

In the step 1318, effected by the processor 105 executing the software program 133, intermediate variables A, B, C, D are set as follows:
Intermediate variable A is set to value of VectArr (i−2);
Intermediate variable B is set to value of VectArr (i−1);
Intermediate variable C is set to value of VectArr (i−1);
Intermediate variable D is set to value of VectArr (i).

Note that although point B and point C refer to the same point on the 2D surface, they are given different names to aid in understanding.

After the step 1318 the process 1300 proceeds to step a 1319, effected by the processor 105 executing the software program 133, where segments [A,B] and [C,D] are processed. This step is described hereinafter in more detail in regard to FIG. 14.

Once segments [A,B] and [C,D] have been processed, the intermediate variable i is increased by one at a following step 1320, and the process 1300 continues back to the step 1317.

If the test made at step 1317 shows that the array index (i) is greater than or equal to the number of points in the vectorized curve path array, the process 1300 proceeds according to a NO arrow to a step 1321.

At the step 1321, effected by the processor 105 executing the software program 133, a new point array type variable named StrokingPolygonPath is created and initialised to an empty array with 0 element. The elements of the array LeftArr are added to the array StrokingPolygonPath in the same order as the elements ordered in the array LeftArr. Then the elements of the array RightArr are added to the array StrokingPolygonPath in the reversed order as the elements ordered in the array RightArr. The array StrokingPolygonPath is the stroking polygon which is returned to the caller of method 1300.

After the step 1321, the process 1300 finishes.

FIG. 14 is a detailed flow diagram of the processing method 1400 for joining of two consecutive segments in the process of stroking. The processing method 1400, called by the step 1319 in FIG. 13 and effected by the processor 105 executing the software program 133, uses intermediate variables prev_S_left, prev_S_right, prev_E_left, prev_E_right that are "Point" type variables.

The process 1400 commences with an entry step 1410, at which the intermediate variable Zk is calculated. The intermediate variable Zk is determined as follows:

$$Zk=(C.y-D.y)*(A.x-B.x)-(A.y-B.y)*(C.x-D.x) \qquad \text{Eqn.1}$$

Wherein,

A.x, B.x, C.x, D.x are the x-coordinates of points A, B, C, D respectively;

A.y, B.y, C.y, D.y are the y-coordinates of points A, B, C, D respectively.

The value of Zk is related to the cross product of two vectors in a 3 dimensional orthogonal space wherein the first 2 dimensions are the dimensions of the drawing context. The value of Zk allows determining which is the concave and which is the convex side of the path formed by the 2 consecutive segments [A, B] and [C, D]. If Zk is negative, then the convex side is on the left side of the two segments [A, B] and [C, D]. If Zk is positive, then the convex side is on the right side of the two segments [A, B] and [C, D] as illustrated in FIG. 8. In case of Zk equals zero, the angle formed by segments [A, B] and [C, D] in FIG. 8 is either 0 degree or 180 degrees.

At a step 1410, effected by the processor 105 executing the software program 133, the value of the intermediate variable Zk is calculated using equation 1 and is stored in the memory 168. After completion of step 1410 the process 1400 proceeds to a next step 1411.

At the step 1411, effected by the processor 105 executing the software program 133, the following intermediate variables are set in the following order:

Point prev_S_left is set to point S_left, first;
Point prev_E_left is set to point E_left, second;
Point prev_S_right is set to point S_right, third;
Point prev_E_right is set to point E_right, fourth;
Point S_left is set to the point, which is the left offset point for point C of segment [C, D], fifth;
Point E_left is set to the point, which is the left offset point for point D of segment [C, D], sixth;
Point S_right is set to the point, which is the right offset point for point C of segment [C, D], seventh;
Point E_right is set to the point, which is the right offset point for point D of segment [C, D], eighth.

After completion of the step 1411 the process 1400 proceeds to a next step 1412.

The step 1412 is a decision step where the processor 105 checks if the value of Zk is zero. If the decision of step 1412 evaluates to YES, than the process 1400 proceeds to a step 1413.

At the step 1413, effected by the processor 105 executing the software program 133, a test is made to check if the angle between the two segments [A, B] and [C, D] is zero degrees. Within this arrangement, the angle test is made by evaluating the following inequality:

$$(prev\_E\_left.x-S\_left.x)^2+(prev\_E\_left.y-S\_left.y)^2 > (sw/2)^2$$

Wherein, sw is the stroking width;

prev_E_left.x, S_left.x are the x-coordinates of points prev_E_left, S_left respectively; and prev_E_left.y, S_left.y are the y-coordinates of points prev_E_left, S_left respectively;

If the inequality is true than the angle is 0 degrees, otherwise the angle is 180 degrees. If the test 1413 returns YES, than the process 1400 proceeds to a step 1417, otherwise, the process 1400 proceeds to a step 1415.

At the step 1415, effected by the processor 105 executing the software program 133, a point E_left is added to the array LeftArr, and a point E_right is added to the array RightArr. At the step 1415, effected by the processor 105 executing the software program 133, the process 1400 finishes.

If the decision step 1412 evaluates to NO, then the process 1400 proceeds to a step 1416, effected by the processor 105 executing the software program 133, at which a test is made to see whether Zk is less than zero. If the test 1416 returns YES, then the process 1400 proceeds to a step 1417.

In the step 1417, effected by the processor 105 executing the software program 133, the following intermediate variables are set in the following order:

pOutsideArr is set to the memory address of the array LeftArr, first;
pInsideArr is set to the memory address of the array RightArr, second;
Point Ao is set to point prev_S_left, third;
Point Bo is set to point prev_E_left, fourth;
Point Ai is set to point prev_S_right, fifth;
Point Bi is set to point prev_E_right, sixth;
Point Co is set to point S_left, seventh;
Point Do is set to point E_left, eighth;
Point Ci is set to point S_right, ninth;
Point Di is set to point E_right, tenth.

After completion of step the 1417 the process 1400 proceeds to a step 1419.

If the test 1416 returns NO, than the process 1400 proceeds to a step 1418. In the step 1418, effected by the processor 105 executing the software program 133, the following intermediate variables are set in the following order:

pOutsideArr is set to the memory address of the array RightArr, first;
pInsideArr is set to the memory address of the array LeftArr, second;
Point Ao is set to point prev_S_right, third;
Point Bo is set to point prev_E_right, fourth;
Point Ai is set to point prev_S_left, fifth;
Point Bi is set to point prev_E_left, sixth;
Point Ci is set to point S_left, seventh;
Point Di is set to point E_left, eighth;
Point Co is set to point S_right, ninth;
Point Do is set to point E_right, tenth.

After completion of the step 1418 the process 1400 proceeds to a step 1419.

In the step 1419, effected by the processor 105 executing the software program 133, the vectorisation unit 1160 is called to vectorise a circular arc. A circular arc is a segment of the circumference of a circle. Within this VFS arrangement, a circular arc is specified by the centre and the radius of the associated circle, the start point and the end point of the circular arc, and the direction of the circular arc. For example, a clockwise circular arc from Ao to Co with a centre at point B refers to the circular arc that starts at the "start point" Ao, continues along the circumference of a circle in a clockwise direction towards the "end point" Bo, and ends at the "end point" Bo, where the circle's centre is the point B and the radius is equal to the length of the segment [B, Bo].

The step 1419, effected by the processor 105 executing the software program 133, determines the following information about the circular arc that needs to be vectorised:
  The centre of the circle is point B;
  The radius of the circle is the length of segment [B, Bo];
  The start point of the circular arc is equal to point Bo;
  The end point of the circular arc is equal to point Co;
  The direction for the circular arc is set clockwise if Zk is negative or zero, otherwise, if Zk is positive, the direction is set anti-clockwise.

The step 1419 passes the information about the circular arc to be vectorised to the vectorisation unit together with the flatness tolerance.

The vectorisation unit 1160 returns the vectorized circular arc in the form of an array of points. The method of vectorisation of a circle or a circular arc is well known in the art and will not be described in this description. The points from the returned array are added to the end of the array referenced by pOutsideArr in the same order as they are returned from the vectorisation unit 1160. After completion of the step 1419, the process 1400 proceeds to a step 1420.

In the step 1420, effected by the processor 105 executing the software program 133, a point Do is added to the end of the array referenced by pOutsideArr. After completion of the step 1420, the process 1400 proceeds to a step 1421.

In the step 1421, the type of join of two consecutive segments [A, B] and [C,D] is determined The join type can be one of four types: "Type 1", "Type 2", "Type 3" and "Type 4". The method of join type determination is described further in detail with reference to FIG. 15. After the join type has been determined, the join type is passed to a next step 1422, and the process 1400 proceeds to a step 1422.

At the step 1422, effected by the processor 105 executing the software program 133, a test is made to check if the join type, that is determined at the step 1421, is "Type 3" or "Type 4". If the test 1422 returns YES, than the process 1400 proceeds to a step 1423 at which "Type 3" or "Type 4" subpath is added to the end of the array referenced by pInsideArr. The sub-process 1423 will be further described in detail in regard to FIG. 16A. After the step 1423, the process 1400 finishes.

If the test 1422 returns NO, than the process 1400 proceeds to a step 1424 at which a Type B subpath is added to the end of the array referenced by pInsideArr. The sub-process 1424 will be further described in detail in FIG. 16B. After the step 1424, the process 1400 finishes.

After determining the type of the join as described with reference to FIG. 15, the process proceeds to construct the offset curve depending on the type of the join as follows.

Figure 16A:
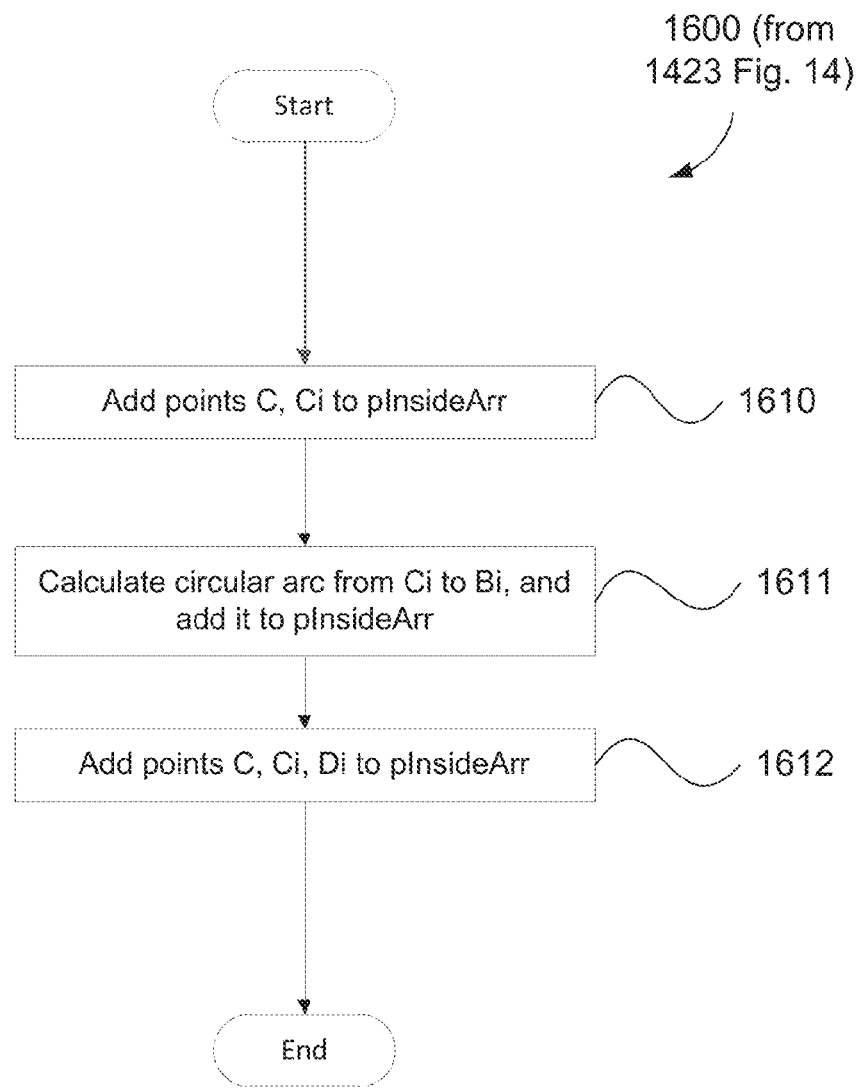
FIG. 16A is a schematic flow diagram of the processing method for construction of "Type 3" or "Type 4" offset curve on the concave side of the two consecutive segments in accordance with the one polygon embodiment of the present invention.

FIG. 16A, which corresponds to a "Type 3" or "Type 4" join, is a detailed flow diagram of the processing method 1600 for construction of "Type 3" or "Type 4" offset curve on the concave side of the two consecutive segments [A, B] and [C, D].

The process 1600, called by the step 1423 in FIG. 14 and performed by the processor 105 executing the software program 133, uses the same intermediate variables that are also used in the processing methods 1300, 1400 and 1500.

The processing method 1600, performed by the processor 105 executing the software program 133, commence with an entry step 1610, that adds points C and Ci to the end of the array referenced by pInsideArr in the following order:
  point C is added first;
  point Ci is added second.

In a following step 1611, the vectorisation unit 1160 is called to vectorise a circular arc. The step 1611 determines the following information about the circular arc that needs to be vectorised:
  The centre of the circle is point B;
  The radius of the circle is the length of segment [B, Bi];
  The start point of the circular arc is equal to point Bi;
  The end point of the circular arc is equal to point Ci;
  The direction for the circular arc is set anti-clockwise if Zk is negative or zero, otherwise, if Zk is positive, the direction is set clockwise. Zk is the intermediate variable as described previously.

The step 1611, performed by the processor 105 executing the software program 133, passes the information about the circular arc to be vectorised to the vectorisation unit together with the flatness tolerance. The points from the returned array are added to the end of the array referenced by pInsideArr in the same order as they are returned from the vectorisation unit 1160. After completion of the step 1611, the process 1600 proceeds to a step 1612.

In the step 1612, performed by the processor 105 executing the software program 133, points C, Ci, Di are added to the end of the array referenced by pInsideArr. The order in which points are added as follows:
  point C is added first;
  point Ci is added second;
  point Di is added third.

After the step 1612, the process 1600 finishes.

Figure 10:
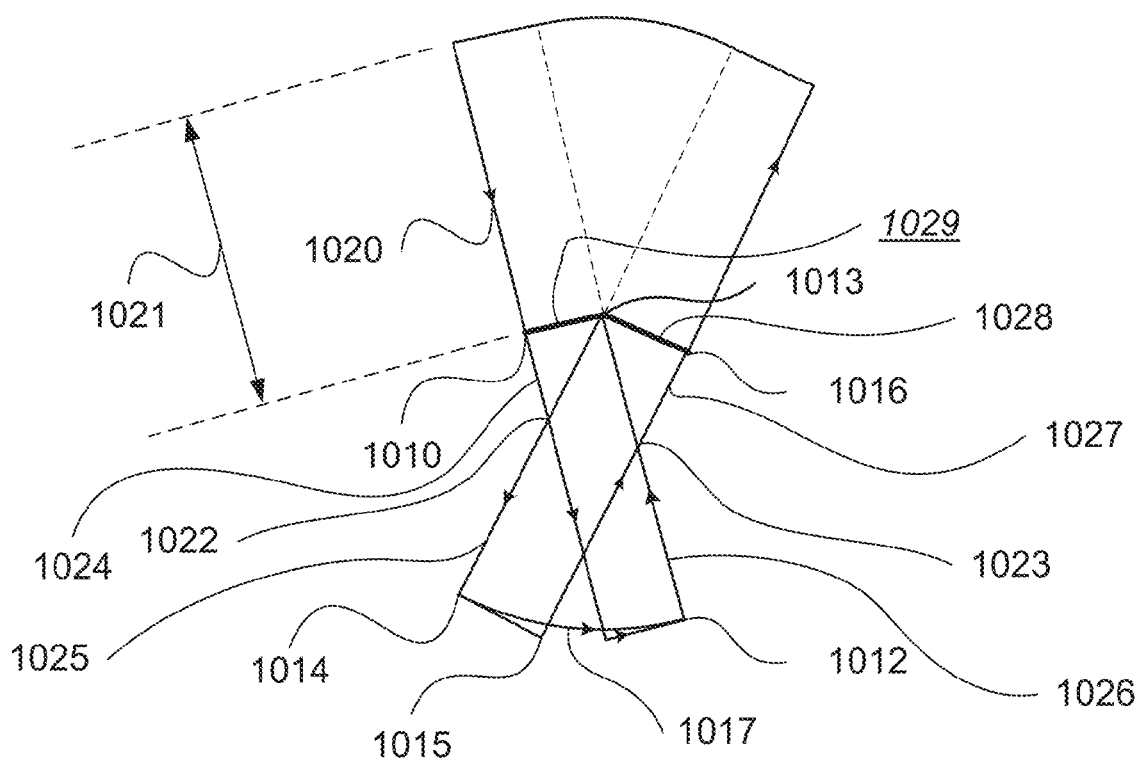
FIG. 10 illustrates an example of stroking a curve segment in accordance with the one polygon embodiment of the present invention.

With reference to FIG. 10, an example of execution of the processing method 1600 is made. In FIG. 10, point A 1010, point B 1013, point C 1013, point D 1016 form two segments [A,B] and [C,D]. An order in which points are added to the array referenced by pIsideArr is as follows:
  Point C 1013 is added first;
  Point Ci 1014 is added second;
  Vectorised circular arc 1017 from point Ci 1014 to point Bi 1012 is added third;
  Point Bi 1012 is added fourth;
  Point C 1013 is added fifth;
  Point Ci 1014 is added sixth;
  Point Di 1015 is added last.

After processing, described hereinafter with reference to FIG. 16A, the example depicted in FIG. 10 results in construction of a polygon comprising an area bounded by intersection points, normal vectors (also referred to as projection lines) and line segments, in particular being bounded by 1024, 1022, 1025, 1017, 1026, 1023, 1027, 1028 and 1029. The projection lines 1020, 1024, 1025, 1026, 1027 have lengths 1021 based on a pre-determined stroking width or fill thickness.

Figure 16B:
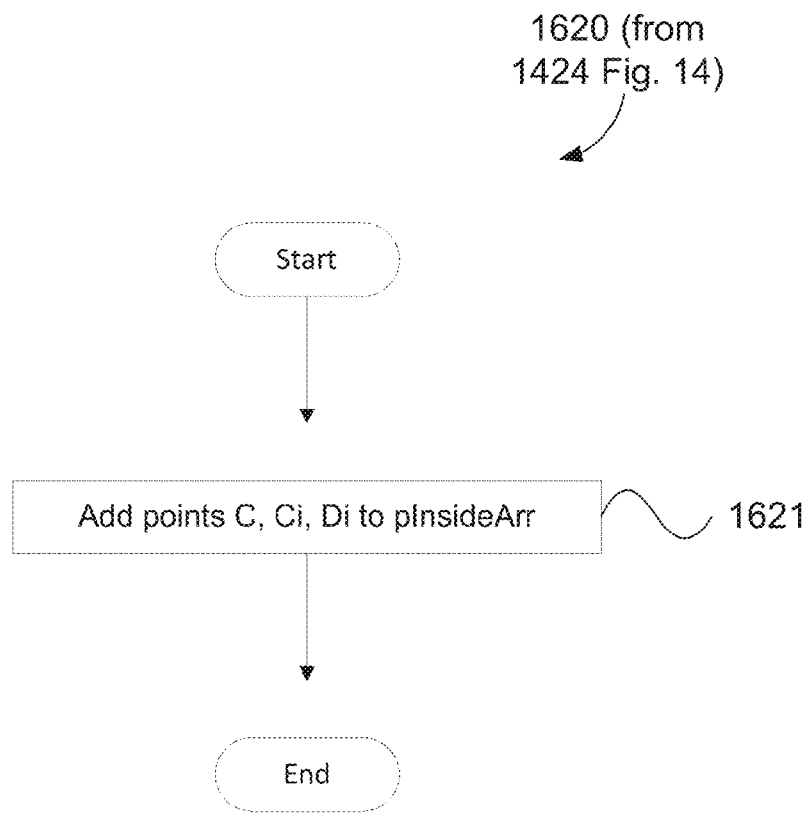
FIG. 16B is a schematic flow diagram of the processing method for construction of Type B offset curve on the concave side of the two consecutive segments.

FIG. 16B is a detailed flow diagram of the processing method for a step 1620, called by the step 1424 in FIG. 14 and performed by the processor 105 executing the software program 133, for construction of a Type B offset curve on the concave side of two consecutive segments [A, B] and [C, D]. The process 1620 uses the same intermediate variables which are also used in the processing methods 1300, 1400 and 1500.

The processing method 1620 commences with an entry step 1621. The step 1621, performed by the processor 105 executing the software program 133, adds points C, Ci and Di to the end of the array referenced by pInsideArr. The order in which points are added are as follows:
point C is added first;
point Ci is added second;
point Di is added third.

After the step 1621, the process 1620 finishes.

With reference to FIG. 8 an example of execution of the processing method 1620 is now described. In FIG. 8, the point A 810, the point B 813, the point C 813, and the point D 816 form two segments [A,B] and [C,D]. The order in which points are added to the array referenced by pInsideArr are as follows:
Point C 813 is added first;
Point Ci 814 is added second;
Point Di 815 is added third.

Figure 22:
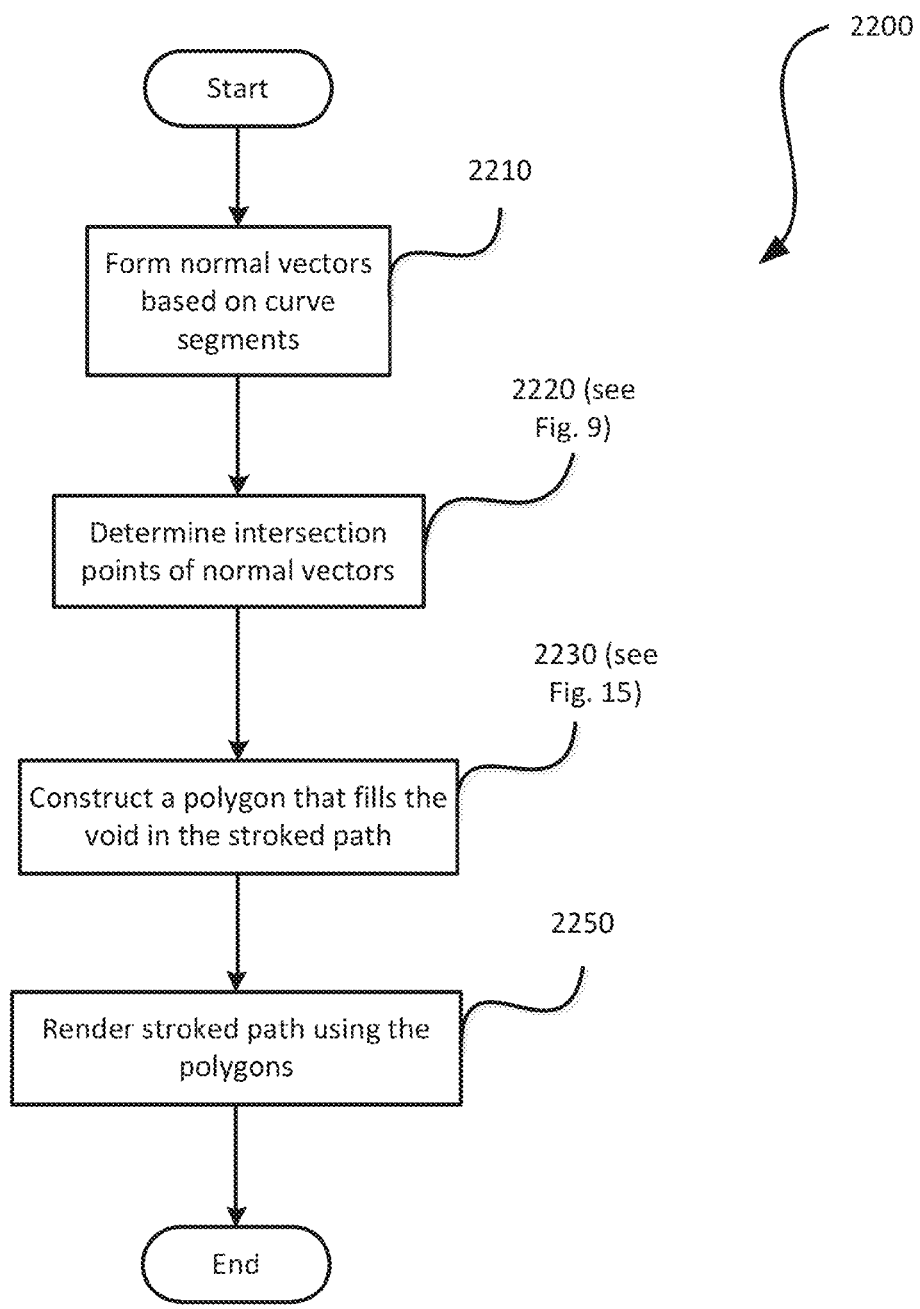
FIG. 22 shows a flowchart of the process of stroking a curve segment in accordance with the present invention.

In summary, we now refer to FIG. 22, which shows a flowchart of a process 2200, performed by the processor 105 executing the software program 133, for stroking a curve segment in accordance with the embodiment of the present VFS arrangement. In a forming step 2210 the processor 105 receives a curve segment [A, B] and [C, D], and creates normal vectors (also referred to as projection lines) to the curve segment from the intersection points of the curve segments. Then, in a detecting step 2220, performed by the processor 105 executing the software program 133, the processor 105 determines if there are any intersection points between predetermined pairs of normal vectors as described with reference to FIGS. 9A-9D. The process in FIG. 22 then proceeds to a constructing step 2230, performed by the processor 105 executing the software program 133, wherein the processor 105 constructs, in response to the determining or detecting step 2220 which detects the presence of an intersection, a polygon that fills the void in the stroked path based on the type of join as determined in the method described with reference to FIG. 15. Finally, in a step 2250, performed by the processor 105 executing the software program 133, the stroked path is rendered by the renderer 1113 using the constructed polygon by processor 105.

Two Polygon Embodiment

The first step in stroking a curve segment is to break down the segment into a plurality of short line segments, a process that is often referred to as vectorization. This is achieved by generating a number of points along the curve segment and grouping each neighbouring pair of points to form a line segment. In practice, a large number of closely spaced points are generated, however for the purpose of illustration only a small number of points are shown in the examples given. This means the final stroke polygons may appear jagged, however, the resolution of points may be increased to afford a smooth final output.

In FIG. 5a, a curve segment 590 is stroked using the offset curve approach. Points are generated along the curve segment in the order from 540 to 560. Each point is projected based on corresponding normal lines to form a left offset curve (501 to 509) and a right offset curve (511 to 519). The final stroke polygon is represented using solid black lines. FIG. 5b shows output of the stroking, after the final stroke polygon has been filled. The middle regions of the stroke are not filled as they have a winding count of zero. For comparison, FIG. 5c illustrates the expected output if the same curve segment 590 demonstrated in FIG. 5a is stroked correctly.

The root cause of the unfilled regions, as illustrated in FIG. 5a and FIG. 5b, is that the neighbouring projection lines, in this case the normal lines, of the calculated points intersect with each other. For example, in FIG. 5a normal line (501, 511) 531 intersects normal line 532 (502, 512) at the intersection point 560.

When neighbouring projection lines intersect with each other, the direction of lines of the offset curve on the concave side of the curve is changed.

Figure 4A:
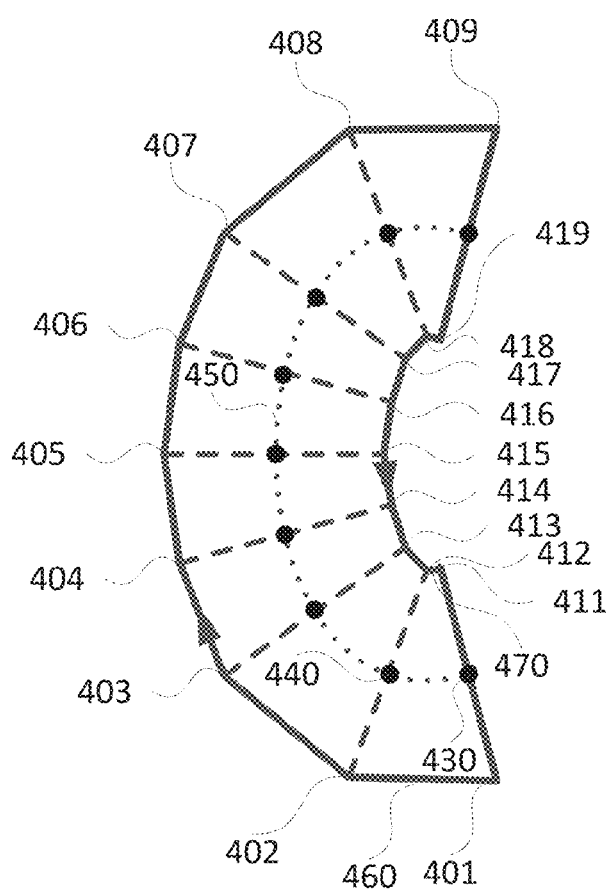
FIG. 4a is an example of stroking a curve segment in accordance with an implementation of the offset curve approach.
Figure 4B:
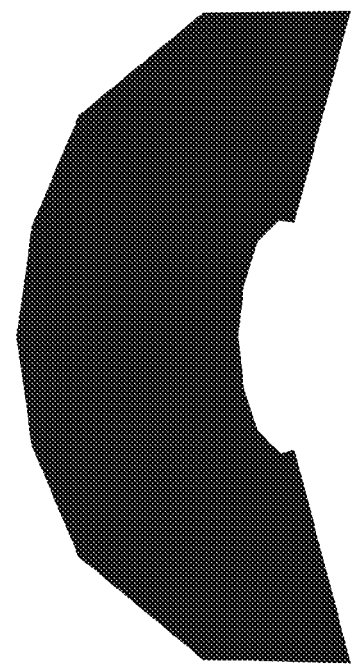
FIG. 4b is an example of stroking a curve segment in accordance with an implementation of the offset curve approach.
Figure 6A:
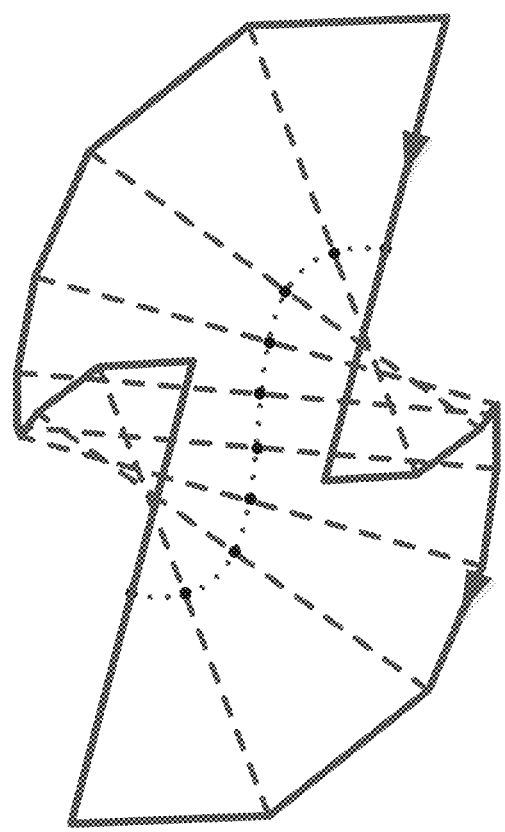
FIGS. 6a, 6b and 6c give a further example demonstrating an exemplary problem arising from stroking a curve in accordance with an implementation of the offset curve approach.
Figure 6B:
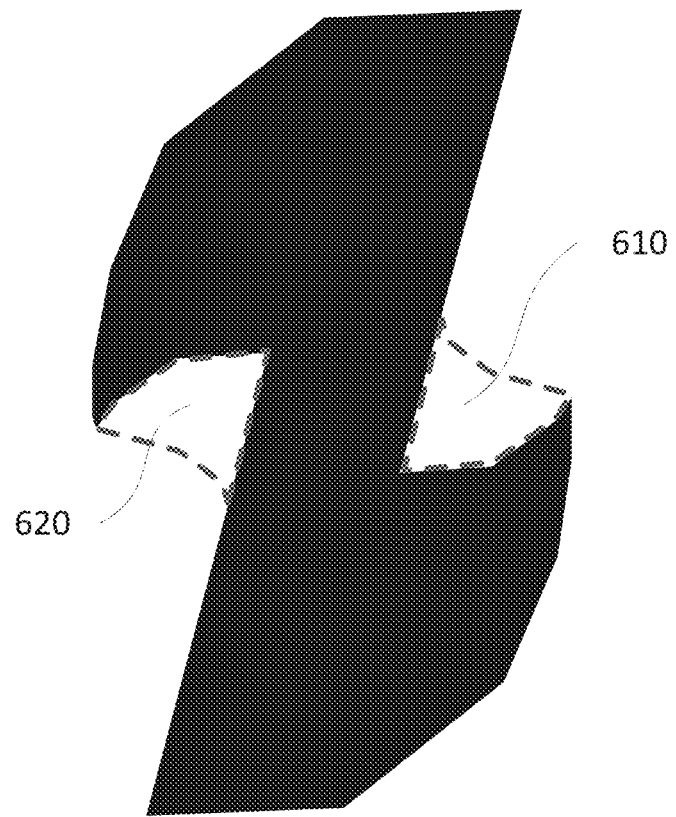
Figure 6C:
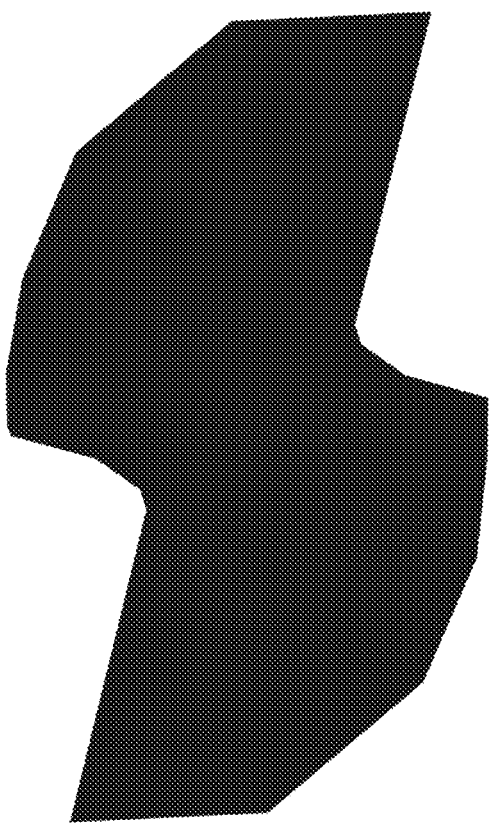

FIGS. 4a and 4b depict an example of stroking the same curve segment as showed in FIG. 5a (450 and 590 are identical curve segments) with a shorter stroke width. The final stroke polygon is correctly filled. The points generated along the curve segment are identical to the ones generated in FIG. 5a. For example, point 430 is identical to point 540, and point 440 is identical to 550. In FIG. 4a, since the stroke width is shorter, there is no intersection between any neighbouring normal lines. If the stroke polygon is created with a clockwise orientation, the direction of the line segment of convex-side offset curve 460 is from 401 to 402, and the direction of the line segment of the concave-side offset curve 470 is from 412 to 411. If the same orientation is applied to the stroke polygon in FIG. 5a, the equivalent line segment of the convex-side offset curve 533 will remain in the same direction as 460, that is from 501 to 502. The equivalent line segment of the concave-side offset curve 534 will be in the opposite direction to 470 (which goes from point 412 to point 411), that is it will be from 512 to 511. This change of direction effectively creates regions with zero winding count within the polygon, leading to 'holes' when the polygon is filled FIGS. 6a and 6b demonstrate another example of a curve segment that is incorrectly stroked by the offset curve approach. The final stroke polygon is represented by the solid black lines in FIG. 6a. FIG. 6b shows the output of the stroke when the final stroke polygon is filled. The two regions 610 and 620 are missing, as they have winding counts of zero. FIG. 6c illustrates the expected output of the curve segment in FIG. 6a is stroked correctly according to the VFS arrangement.

The present VFS arrangement provides a method that solves the problem of unfilled stroke regions, when a curve is stroked using the offset curve approach. By way of summary, the VFS method operates as follows according to two steps:
Break the curve down into a series of closely spaced points
At each point calculate a projection line, e.g. a normal line to the curve at that point. Each projection line extends on either side of the curve for half of the stroke-width
Check intersection between each neighbouring pair of projection lines
When neigbouring lines intersect, split the stroke polygon into an extension polygon and a main polygon
High Level Summary
The present VFS arrangement splits the stroke polygon into an extension polygon and a main polygon whenever neighbouring projection lines intersect. The separation between the two polygons is based on the trail of points of intersection of the projection lines.

The extension polygon is a stand-alone polygon that is constructed based on the offset curve on the concave side and the intersection points. This polygon is only generated for the parts of the curve that have intersecting neighbouring projection lines and is constructed with the appropriate direction to counter the direction change caused by the projection line intersection.

The main polygon is the main polygon generated for the entire curve segment and may exclude one or end points. When the neighbouring projection lines do not intersect, the main polygon is constructed based on the left and right offset curves. When the neighbouring projection lines do intersect, the main polygon is trimmed so that its construction is based on the intersection points and the offset curve on the convex side of the curve segment. This is to remove the parts of the polygon with reversed direction so the whole main polygon has the corrected direction. After combining the two polygons, the zero winding regions of the polygon are removed, giving the correct output.

Figure 23:
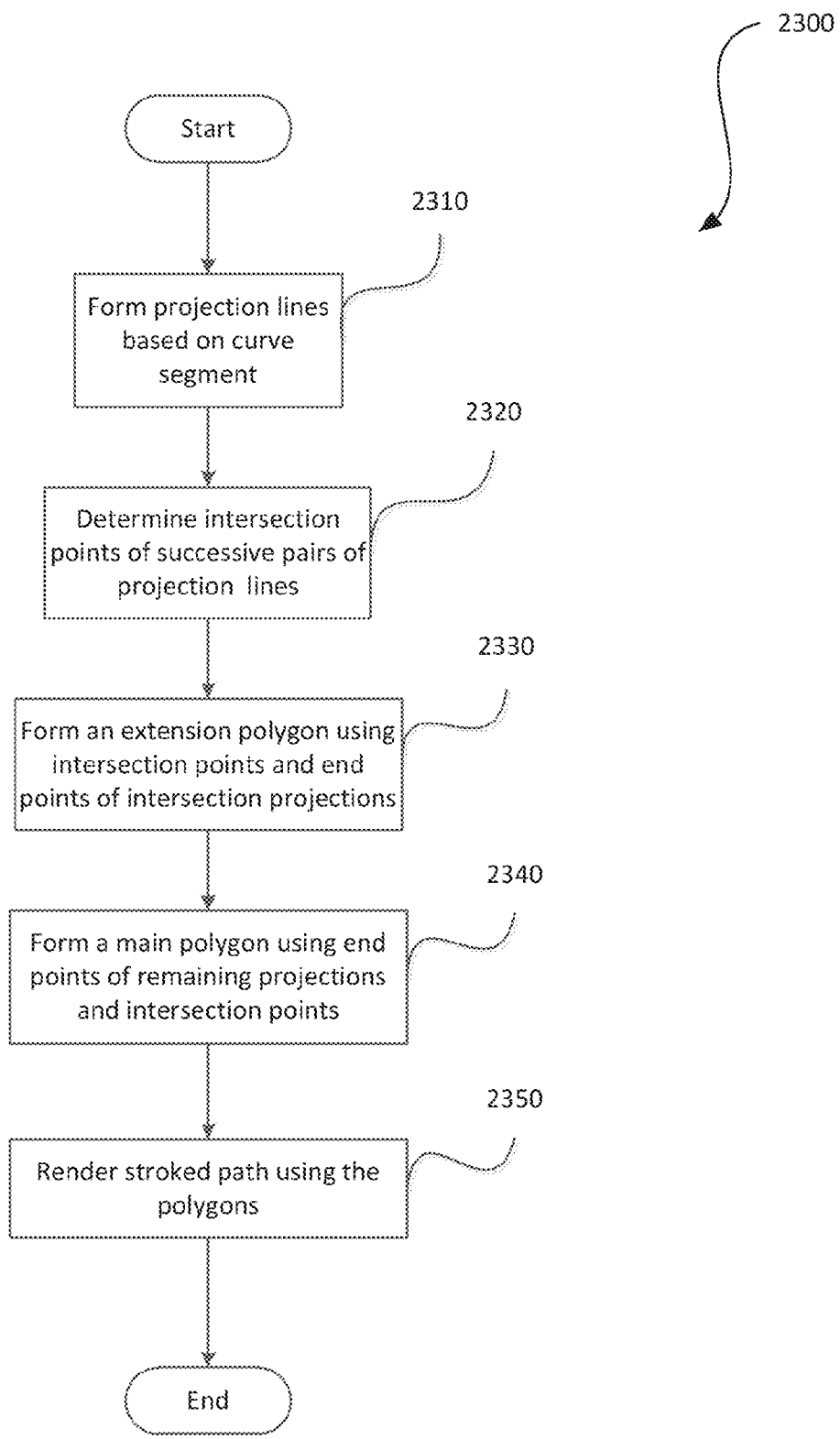
FIG. 23 shows a flowchart of the process of stroking a curve segment in accordance with the two polygon embodiment of the present invention.

FIG. 23, describes a schematic flow diagram illustrating the processing method of stroking a path. The method starts in step 2310 by forming projection lines from points on the path. Each projection line has length equal to the stroke width. In a following step 2320 the method determines intersection points of successive pairs of projection lines. For example, if points p1, p2 and p3 are points on the path. The projection line at p1, is checked for an intersection with the projection line at p2. The projection line at p2 is checked for an intersection with the projection line at p3, and so on. In a following step 2330 an extension polygon is formed using the intersection points and end points of intersection projections. In a following step 2340 a main polygon is formed using the end points of remaining projections and intersection points. Finally in a following step 2350 the stroked path is rendered using the polygons.

Figure 17:
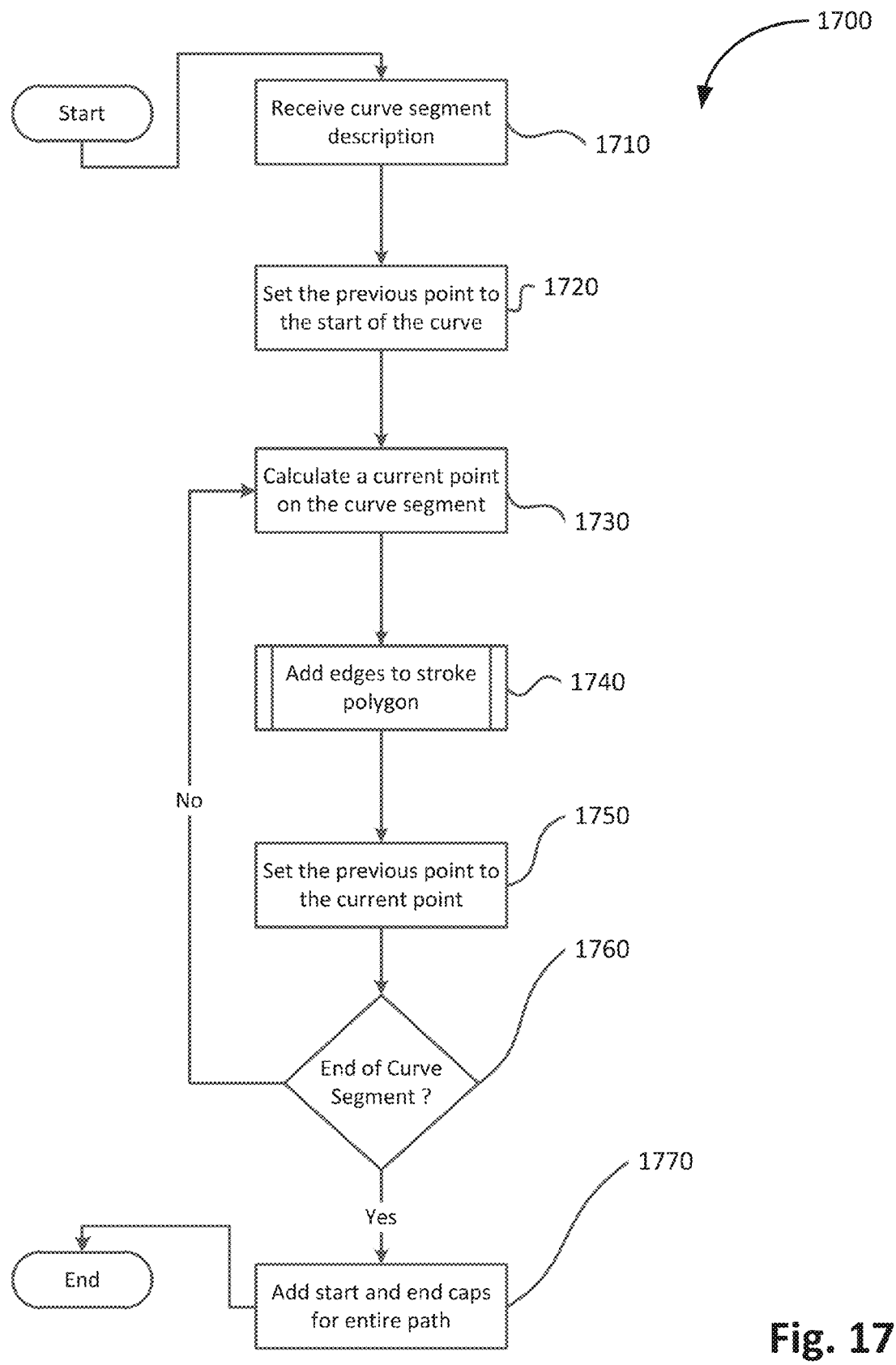
FIG. 17 is a schematic flow diagram illustrating the processing method of stroking curve segment.

FIG. 17 is a flow diagram depicting a process 1700, performed by the processor 105 executing the VFS software program 133, for stroking a curve segment belonging to a path according to the VFS arrangement. In an entry step 1710 performed by the processor 105 executing the VFS software program 133, the stroking process commences by receiving the description of a curve segment. The received description often contains a set of control points that define the visual appearance of the curve segment. For example, a cubic Bézier curve segment is represented by four control points. The first and the last control points define the start and end point of the curve, while the middle two control points define the curvature. The curve segment is broken down (vectorized) into a number of closely spaced points. These points are chosen to be close enough together that they closely approximate the original curve segment, while being limited to a reasonable number of points so that performance is not impaired.

In the following step 1720 performed by the processor 105 executing the VFS software program 133, the previous point position is set to the start of the curve. This is to initiate the process of calculating a series of points along the curve that will be used later in constructing stroke polygon(s). In a following step 1730, performed by the processor 105 executing the VFS software program 133, a loop is then started by calculating a current point along the curve segment. The determination of the position of the current point on the curve segment depends on the implementation. Usually, the current point is made close enough to the previous point so the stroke polygon will appear smooth. In a following step 1740 performed by the processor 105 executing the VFS software program 133, the stroke polygon is constructed by adding straight-line edges based on the current point calculated in the previous step. This step is described hereinafter in more detail in regard to FIGS. 18a and 18b. A straight-line is a primitive that is used to form the stroke polygon. In a following step 1750 performed by the processor 105 executing the VFS software program 133, the previous point is set to the calculated current point. In a following test step 1760 performed by the processor 105 executing the VFS software program 133, the processor 105 determines if the end of the curve segment has been reached. If the end of the curve segment has not been reached, the loop continues by following a NO arrow going back to step 1730 to continue the calculation of the points along the curve segment.

If the end of curve segment is reached, control follows a YES arrow and proceeds to step 1770 where start and end caps are added for the entire path. For the start cap, the edge added is the first projection line of the curve. The direction of the edge is from the right hand side of the curve to the left hand side of the curve, as viewed by an observer located at the first of the points referred to in step 1710 who is looking towards the second such point. For the end cap, the edge added is the last projection line of the curve. The direction of the edge is from the left hand side of the curve to the right hand side of the curve. After step 1770, the process is finished.

Figure 18A:
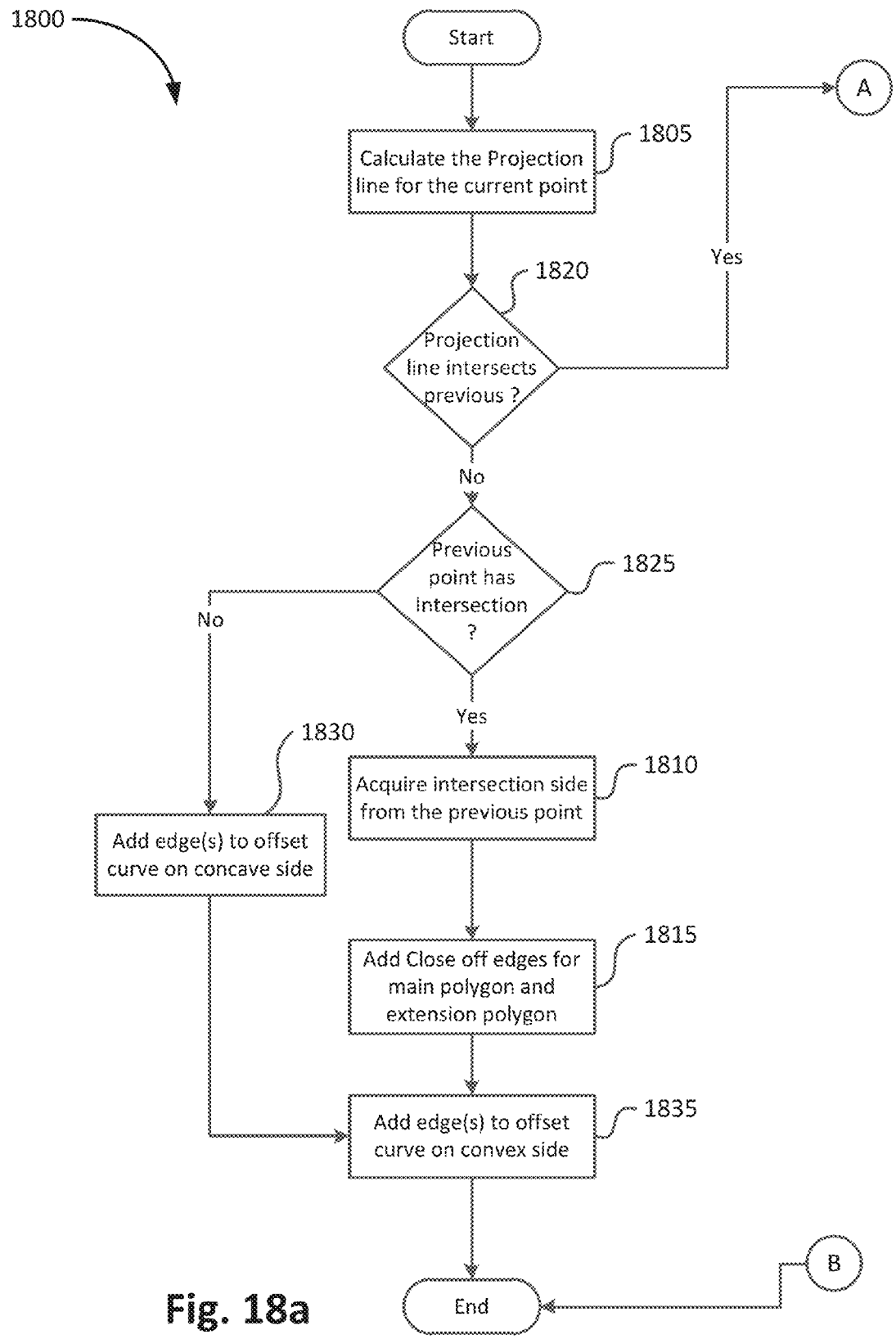
FIGS. 18a and 18b are detailed flow diagram fragments for a process for constructing an extension polygon and a main polygon in accordance with a two polygon embodiment of the present invention.
Figure 18B:
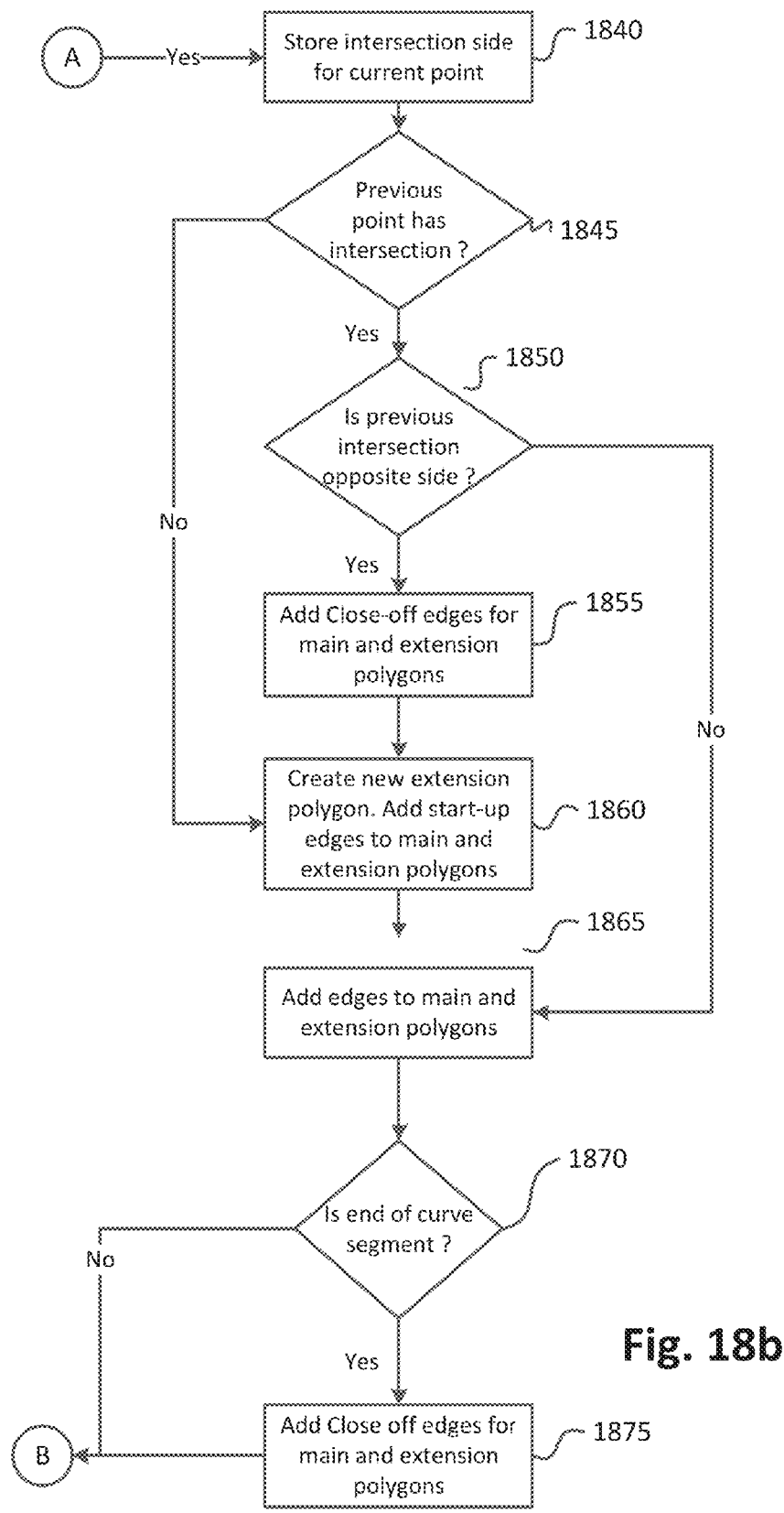

FIGS. 18a and 18b are flow chart fragments for a process 1800 for performing the step 1740 in FIG. 17 for adding edges to the stroke polygon. The processing commences in FIG. 18a with an entry step 1805, performed by the processor 105 executing the VFS software program 133, that determines a projection line based on the current point on the curve segment. The projection line has length equal to the stroke width and is bisected by the current point. It is used to create the left and the right offset curve. Depending on the implementation, the calculation of the projection line varies. In a first implementation of the two-polygon embodiment of the present VFS arrangement, the projection line is a normal line that is perpendicular to the curve at the current point.

Thereafter a first test step 1820, performed by the processor 105 executing the VFS software program 133, determines if the projection line of the current point intersects the projection of the previous point. If they do intersect, the process 1800 follows a YES arrow to a connection point "A" in FIG. 18a and thence to a corresponding connection step "A" in FIG. 18b and thence to a step 1840, performed by the processor 105 executing the VFS software program 133, in which the intersection side for the current point is determined and stored. The term "intersection side" refers to the side of the curve segment in question where the intersection takes place, eg the left side or the right side.

Following the step 1840, a test step 1845 in FIG. 18b, performed by the processor 105 executing the VFS software program 133, checks if the previous point on the curve in question has a projection line intersection. If the previous projection has no intersection, the processor 105 indicates that this is the first instance in a region of the curve segment where projection lines intersect. The term "Region" of the curve means a 'portion' or a 'part' of the curve where the given property holds (e.g. that projection lines are intersecting or projection lines are not intersecting). As a result, the process follows a NO arrow from the step 1845 to a step 1860, performed by the processor 105 executing the VFS software program 133, in which setup edges (also referred to as startup edges) are added to construct a new extension polygon, and transition edges are added to the (existing) main polygon. The transition edges added to the main polygon form a bridge from the region of non-projection line intersection to the region of continued projection lines intersection on the curve segment. The process 1800 is then directed to a following step 1865, described hereinafter in more detail. The setup edges are only added once for each region of continuous projection line intersection on the curve segment.

If however the test step 1845 returns "yes", the setup edges are not needed and the process follows a YES arrow to a step 1850.

The setup and transition edges added depend on the orientation of the curve. A curve may be described as having a clockwise or anti-clockwise orientation. If the curve has a clockwise orientation then the following edges are added:
  edge from intersection of current projection line with previous projection line to the inner (concave side) end of the previous projection line is added to both the main polygon (as a transition edge) and to the extension polygon (as a setup edge)

In the following let P(x) mean projection line through point 'x' on the curve. Let IE(1) mean the Inner End (concave side) of line '1', and OE(1) mean the Outer End (convex side) of line 1. Refer FIG. 19*a*. The curve goes from 1950, 1151, 1152 . . . 1960 (along the specified direction). P(1158) intersects P(1159) at 1907. Orientation of curve is clockwise. Edge is added from intersection (1907) to inner end of P(1158) which is point 1906. In another exemplary implementation, an edge is added from 1907 to IE(P(1158)).

If on the other hand the curve has an anti-clockwise orientation then the same edges are added but with their directions reversed. Refer FIG. 19*a*, P(1950) intersects with P(1151) at 1902. Orientation of curve is anti-clockwise. Edge is added from inner end of P(1950)=1901 to 1902.

Step 1850, performed by the processor 105 executing the VFS software program 133, determines if the intersection of the previous point is on the same side of the curve as the intersection of the current point. This is important, because, for some curve segments, it is possible for the intersection of projection lines to change to the opposite side of the curve segment while the projection lines are still intersecting. When this happens, to have correct final output, the construction work that is being done on the extension polygon and the main polygon needs to be finished, and new work is started on a new extension polygon and the main polygon. Therefore, if the step 1850 returns a "YES" then the process follows a YES arrow to a step 1855, performed by the processor 105 executing the VFS software program 133, which adds "close-off" edges to the extension polygon and the main polygon (in order to finish off the construction work being done on the extension polygon and the main polygon), and after that, the step 1860 adds setup edges to a new extension polygon and the main polygon.

Figure 19A:
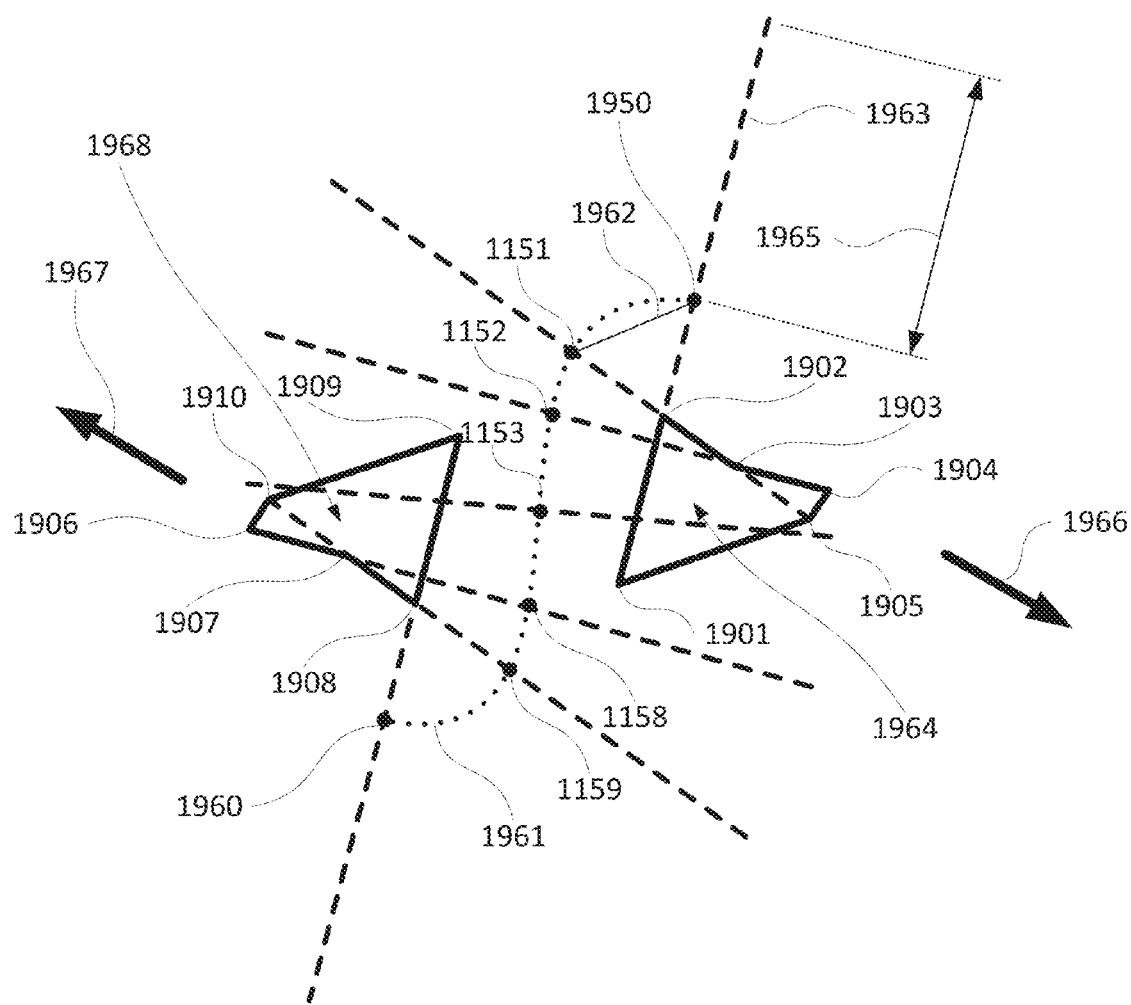
FIGS. 19a, 19b, 19c and 19d illustrate a second example of stroking a curve segment in accordance with a two polygon embodiment of the present invention.

The close-off edges are as follows:
- If the orientation of the curve is clockwise, then an edge from the inner (concave side) end of the current projection line to intersection point of this projection line and the previous projection line is added to both the extension polygon and the main polygon. This occurs if the curve switches suddenly from clockwise to anticlockwise (or vice versa) with intersection of projections.
- If the orientation of the curve is anti-clockwise, the same edges are added but their directions are reversed;

If the test 1850 step returns "no", the process follows a "NO" arrow to the step 1865, performed by the processor 105 executing the VFS software program 133, which adds edges to construct the extension polygon and the main polygon. If the orientation of the curve is clockwise the following edges are added:
- edge from inner (concave side) end of the previous projection line to inner end of the current projection line is added to the extension polygon; (eg in FIG. 19*a*: (1906, 1910) is added to the extension polygon).
- edge from outer (convex side) end of the previous projection line to the inner end of the current projection line is added to the main polygon; (eg In FIG. 19*b*: (1916,1917) is added to the main polygon).
- edge from the intersection of the current and previous projection lines to the intersection of the previous projection line and preceding projection line (the one before the previous projection line) is added to both the main polygon and extension polygon; (eg in FIG. 19*b*: (1908,

1907) is added to the main polygon (when processing point 1960). In FIG. 19*a*: (1908, 1907) is added to the extension polygon).

If on the other hand the orientation of the curve is anti-clockwise the same edges are added as described but with their directions reversed (eg (1905,1901) is added to the extension polygon. (1925,1926) is added to the main polygon. (1902,1903) is added to the extension polygon and the main polygon.)

In a following step 1870, performed by the processor 105 executing the VFS software program 133, a last test is performed to check if the end of the curve segment has been reached. If this test returns "no", the procedure follows a "NO" arrow to a connector "B" and thence to a corresponding "NO" connector in FIG. 18*a*, and thence to an END step which returns to the calling process 1740 in FIG. 17. If however the test step 1870 returns a "yes", then the process follows a "YES" arrow to a step 1875, performed by the processor 105 executing the VFS software program 133, in which the extension polygon and the main polygon are closed with the close-off. The close-off edges are as described for step 1855.

Returning to the test step 1820, if this test returns a "no", then the process follows a "NO" arrow to a step 1825, performed by the processor 105 executing the VFS software program 133, which checks whether the previous point had an intersection. If this test returns a "yes", then the process follows a "YES" arrow to a step 1810, performed by the processor 105 executing the VFS software program 133, which acquires the intersection side from the previous point, and in the following step 1815, the process adds close off edges for the first and main polygons (as described for step 1855). Control then proceeds to step 1835, performed by the processor 105 executing the VFS software program 133, which constructs an offset curve on the convex side of the curve in question. This is done by adding an edge connecting the outer end (convex side) of the previous projection line to the outer end of the current projection line. The direction of this edge depends on the curve orientation. If the curve has a clockwise orientation then the edge will be from the previous projection line to the current projection line. If the curve has an anti-clockwise orientation then the edge direction is reversed (eg step 1815 is the same as 1855, and examples have been given above. In step 1835, with reference to FIG. 19*b*, for an edge on convex side in an anticlockwise case, edge [1923, 1924) is added. On the other hand, for an edge on convex side in a clockwise case, edge [1915,1916] is added by the processor 105). After step 1835 the process 1800 ends and control returns to the calling step 1740 in FIG. 17.

If on the other hand the test step 1825 returns a "no", then the process follows a "NO" arrow to a step 1830, performed by the processor 105 executing the VFS software program 133, which constructs the offset curve on the concave side. This is done by adding an edge connecting the inner end (concave side) of the previous projection line with the inner end of the current projection line. The direction of this edge depends on the curve orientation. If the curve has a clockwise orientation then the edge will be from the current projection line to the previous projection line (In other words, in step 1830, with reference to FIG. 19*b*, an edge on concave side in an anticlockwise case, edge [1904,1915] is added. On concave side of the polygon in a clockwise case, edge [1906, 1923] is added by the processor 105). If the curve has an anti-clockwise orientation then the edge direction is reversed. Control then proceeds to the step 1835 described above

First Implementation of the Two Polygon Embodiment

Figure 24A:
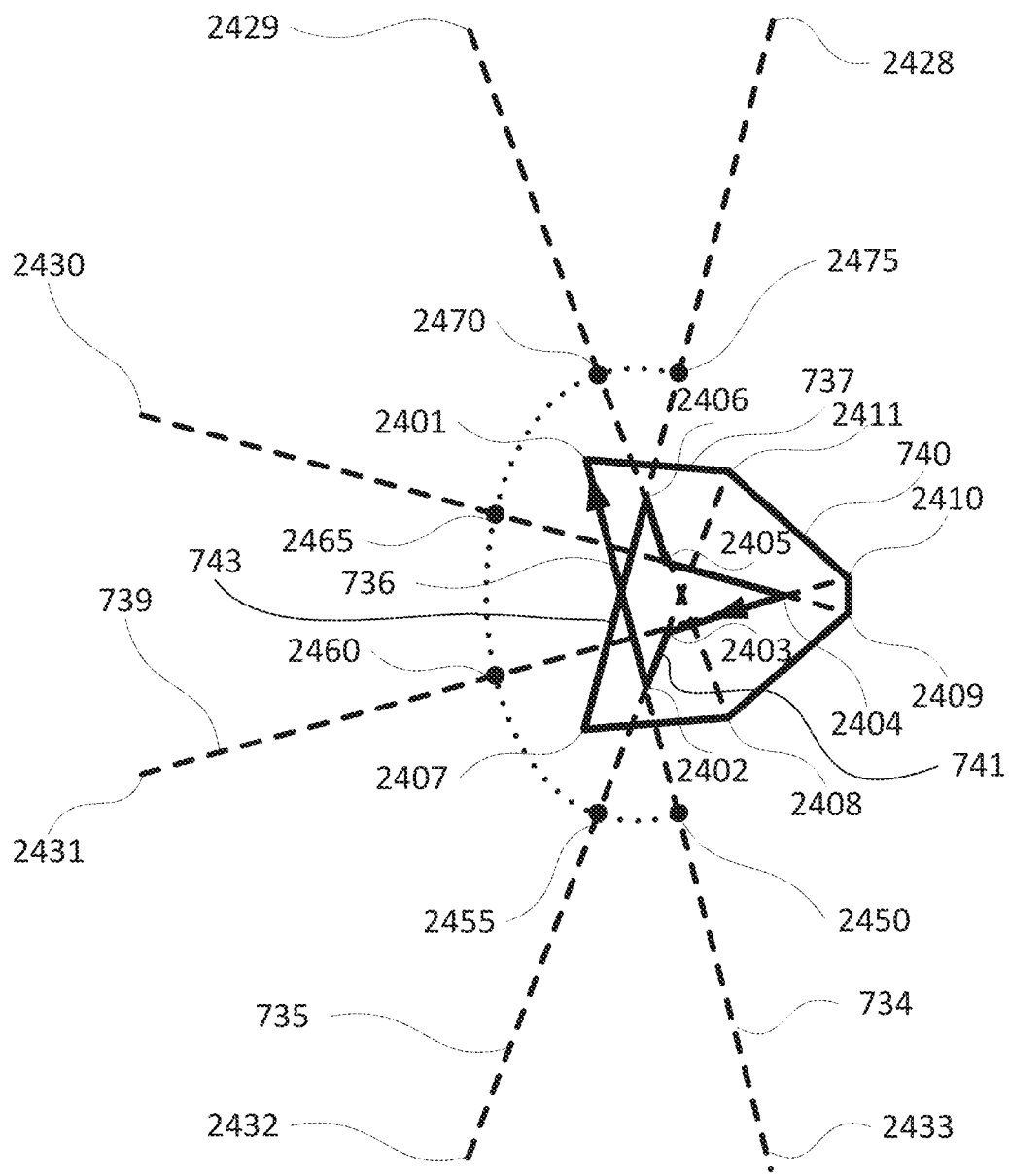
FIGS. 24a, 24b, 24c and 24d illustrate an example of stroking a curve segment in accordance with a two polygon embodiment of the present invention.
Figure 24B:
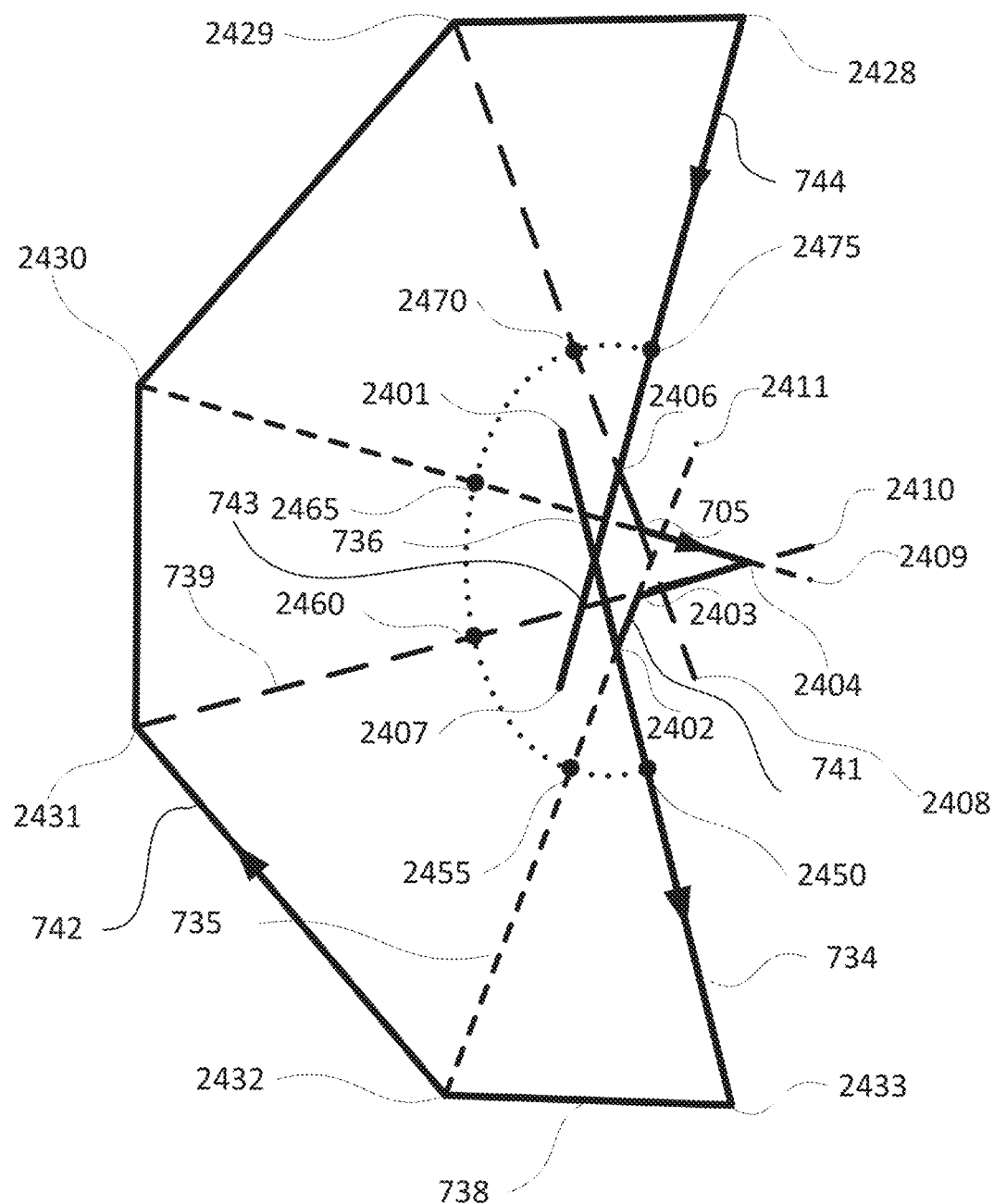

FIGS. 24a and 24b illustrate an example of stroking a curve segment in accordance with a first implementation of the two-polygon embodiment of the present VFS arrangement. FIG. 24a depicts an extension polygon associated with stroking of the curve [2450, 2475]. FIG. 24b depicts a main polygon associated with stroking of the curve [2450, 2475]. The curve segment is the same curve segment as seen in FIG. 5a, however, with fewer points generated during vectorization for the purpose of illustration. Similarly, the projection line of each point is the normal line of the curve segment. The processing of the curve is done in the order from point 2450 to point 2475. In the following description the direction of edges is important. The direction is specified by the edge's start point and end point.

Starting at a point 2450 a current normal line is 734 is calculated. At a point 2455, a new current normal line 735 is calculated. The new current normal line 735 intersects the previous normal line 734 at a point 2402. This is the first instance of a normal intersection in regard to the curve in question. Consequently, a setup edge 736 from the point 2402 to a point 2401 is added to start an extension polygon in FIG. 24a, and a setup edge 736 from the point 2402 to the point 2401 is added to a main polygon in FIG. 24b.

The construction of the polygons continues with an edge 737 from point 2401 to point 2411 added to the extension polygon and an edge 738 from point 2433 to point 2432 added to the main polygon.

At a point 2460 on the curve in question, the current normal line 739 from a point 2431 to a point 2410 intersects the previous normal line 735 from the point 2432 to point 2411 at a point 2403. An edge 740 from point 2411 to point 2410 and an edge 741 from a point 2403 to a point 2402 are added to the extension polygon, and an edge 741 from a point 2403 to a point 2402 as well as an edge 742 from a point 2432 to a point 2431 are added to the main polygon.

The process continues for the remaining points in the path (2465, 2470 and 2475) resulting in the following edges being added:

| Polygon | Start Point of Edge | End Point of Edge |
|---|---|---|
| Extension | 2410 | 2409 |
| Extension | 2404 | 2403 |
| Main | 2404 | 2403 |
| Main | 2431 | 2430 |
| Extension | 2409 | 2408 |
| Extension | 2405 | 2404 |
| Main | 2405 | 2404 |
| Main | 2430 | 2429 |
| Extension | 2408 | 2407 |
| Extension | 2406 | 2405 |
| Main | 2406 | 2405 |
| Main | 2429 | 2428 |

At the end of the curve segment, a close-off edge 743 from a point 2407 to a point 2406 is added to complete the extension polygon in FIG. 7a, and a close-off edge 743 from point 2407 to point 2406 is added to make a transition in the main polygon in FIG. 7b.

Figure 24C:
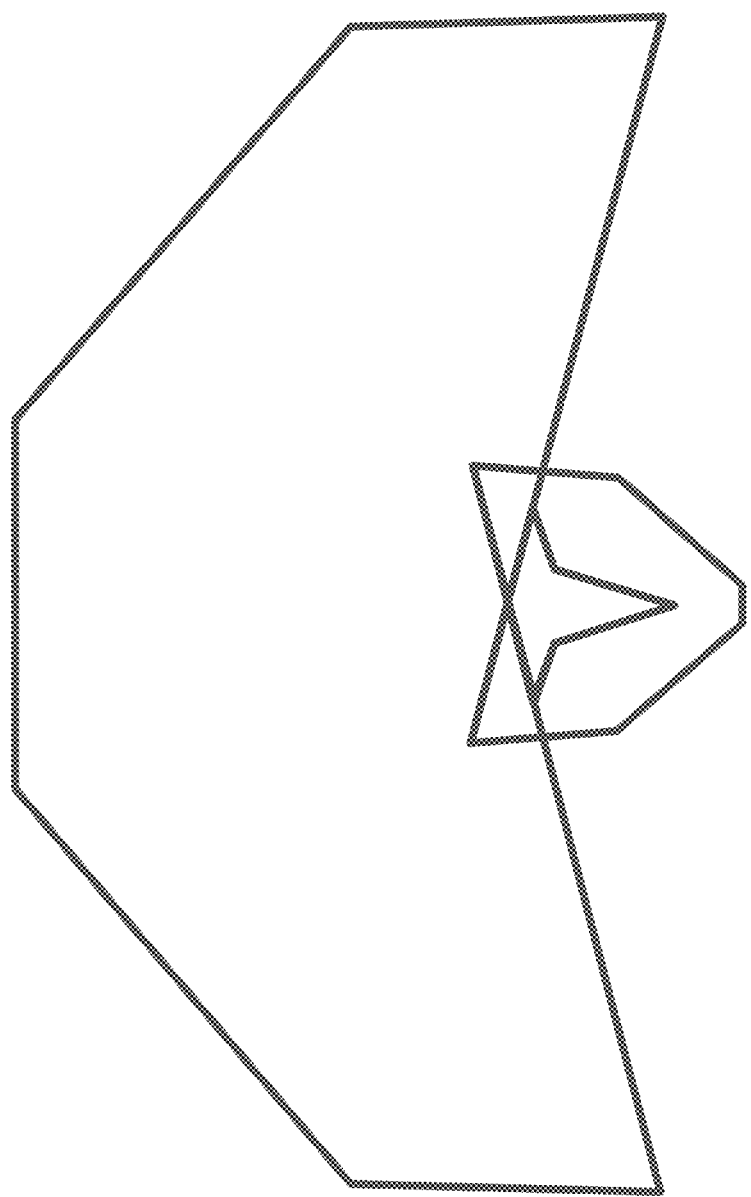
Figure 24D:
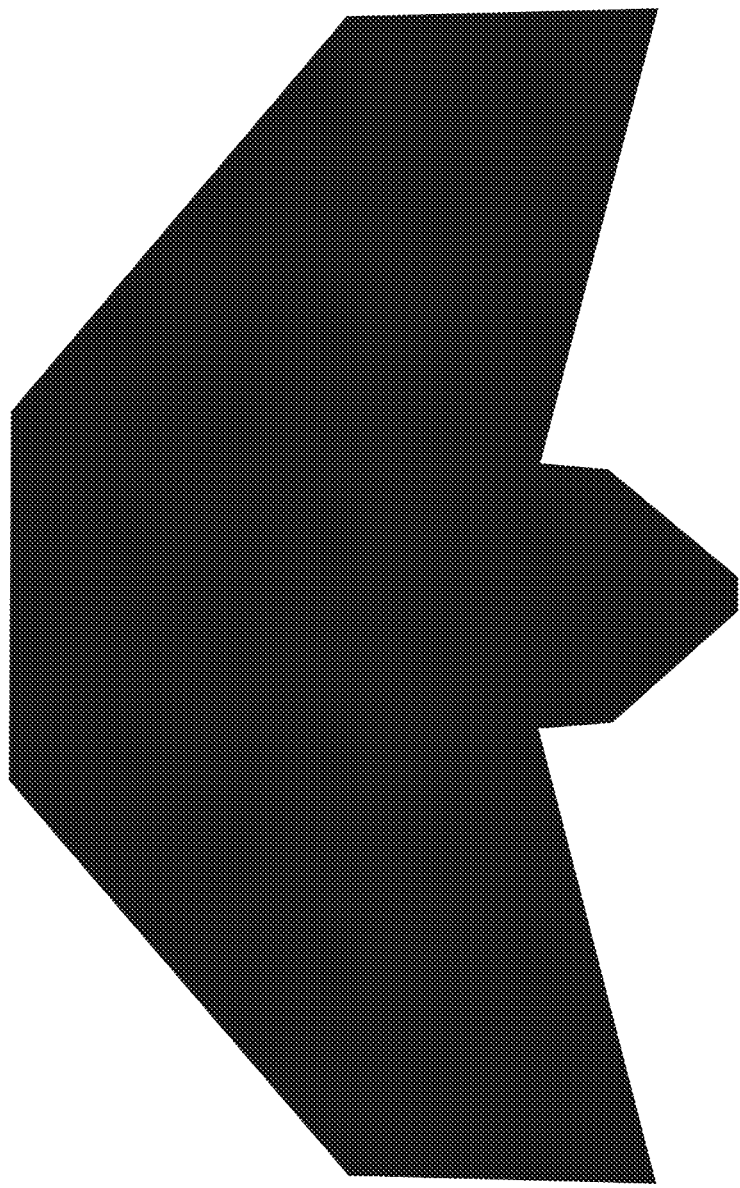

The main polygon depicted in FIG. 24b is completed with end cap edges 734 from a point 2401 to a point 2433 and end cap edges 744 from a point 2428 to a point 2407. When the extension and main polygons are combined, as illustrated in FIG. 24c, the zero winding count regions (regions 580 and 581 shown in FIG. 5b) are removed. FIG. 24d shows the correct output when the two polygons are filled.

The main polygon depicted in FIG. 24b excludes end points of non-end cap projections lines. The end point of the projection line that passed through the point 2470, shown as the point 2408 in FIGS. 24a and 24b, is not used to form part of the main polygon. Similarly the end points 2409, 2410 and 2411 of FIGS. 24a and 24b are not used as part of the main polygon. Such non-end cap, or intermediate, projections are instead rendered as part of the extension polygon.

Figure 19B:
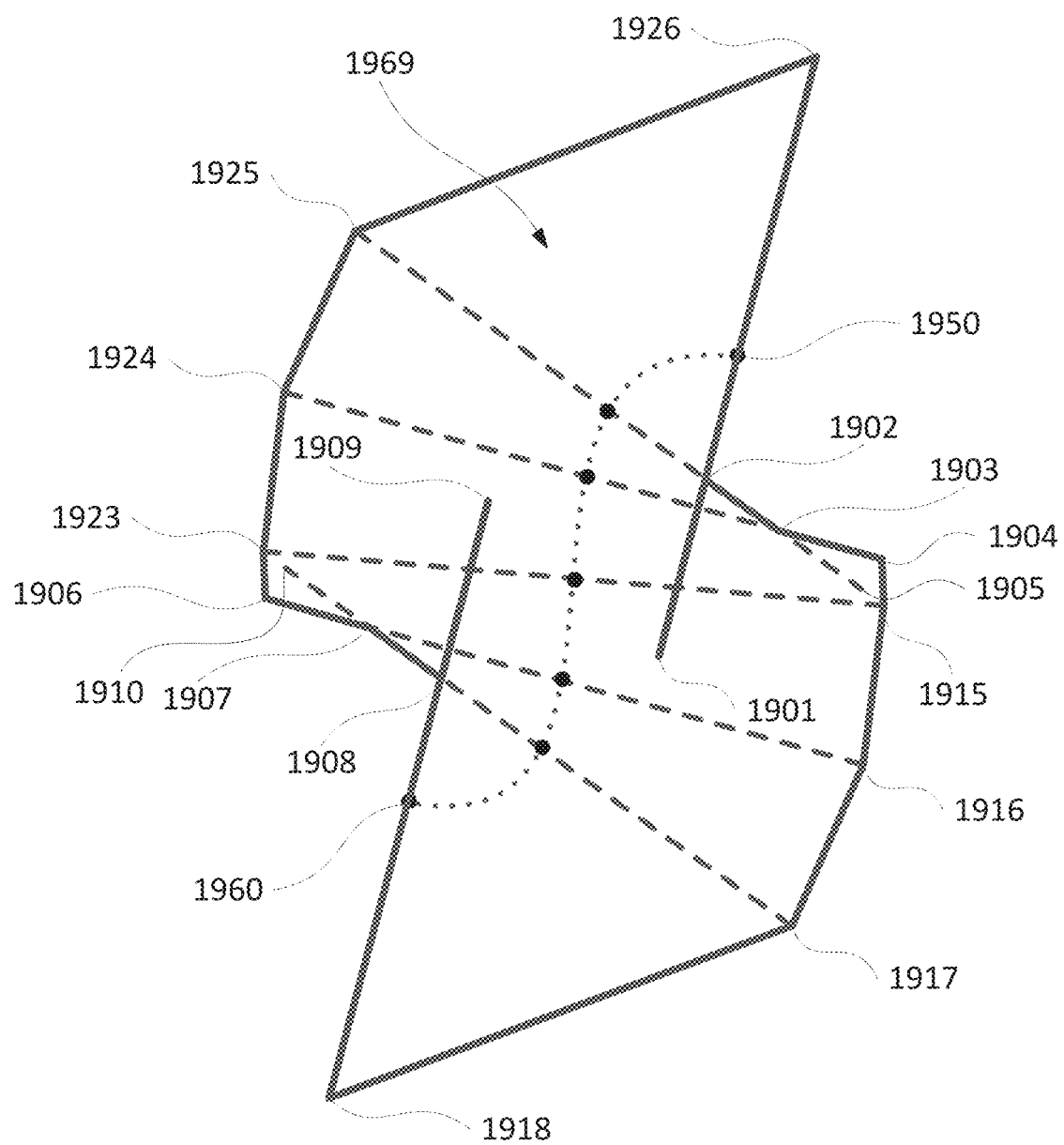
Figure 19C:
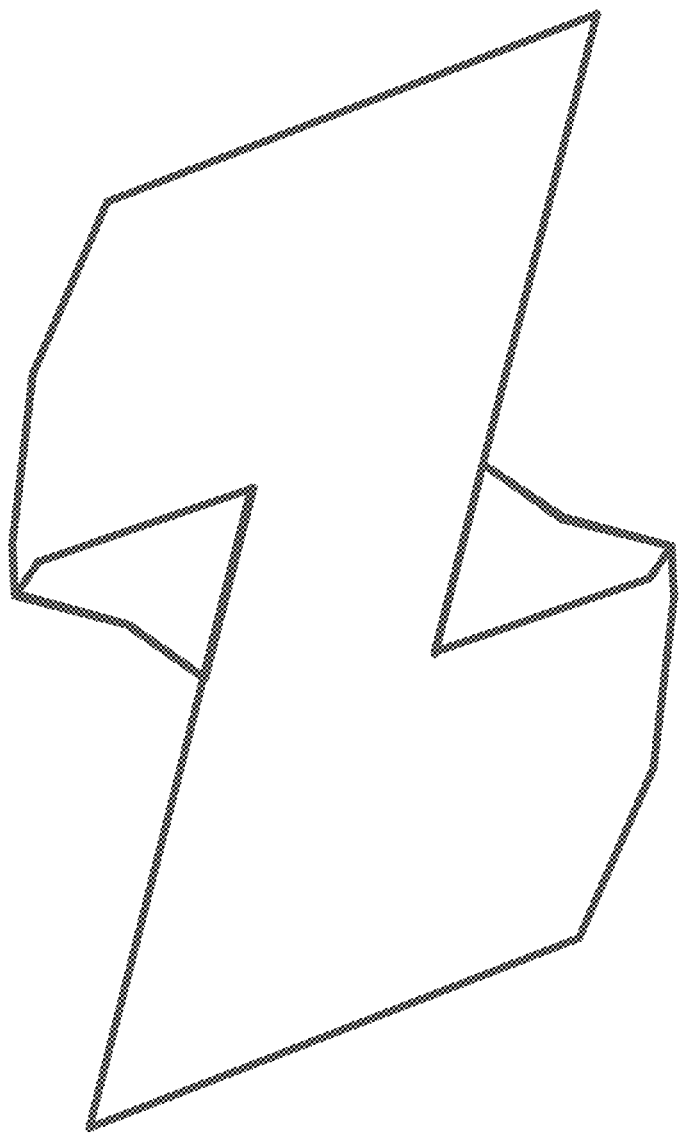

As seen in FIG. 19a and FIG. 19b, it is possible to have multiple regions of continuous projection-line intersections for any curve segment. In FIG. 19a and FIG. 19b, there are two such regions. The first region is formed from a point 1950 to a point 1152, and the second region is formed from point 1158 to point 1960.

The main polygon shown in FIG. 19b excludes the non-end cap point 1905 while a second non-end cap at 1910 is also excluded from the main polygon. In this situation it is possible to see that at least one non-end cap point is excluded from the main polygon and that the excluded non-end cap point belongs to a normal that intersects with an adjacent normal.

For each of the regions, a new extension polygon is constructed and the main polygon is trimmed to reflect the projection line intersection. This example demonstrates how multiple extension polygons may be generated when stroking a curve segment or path.

Figure 19D:
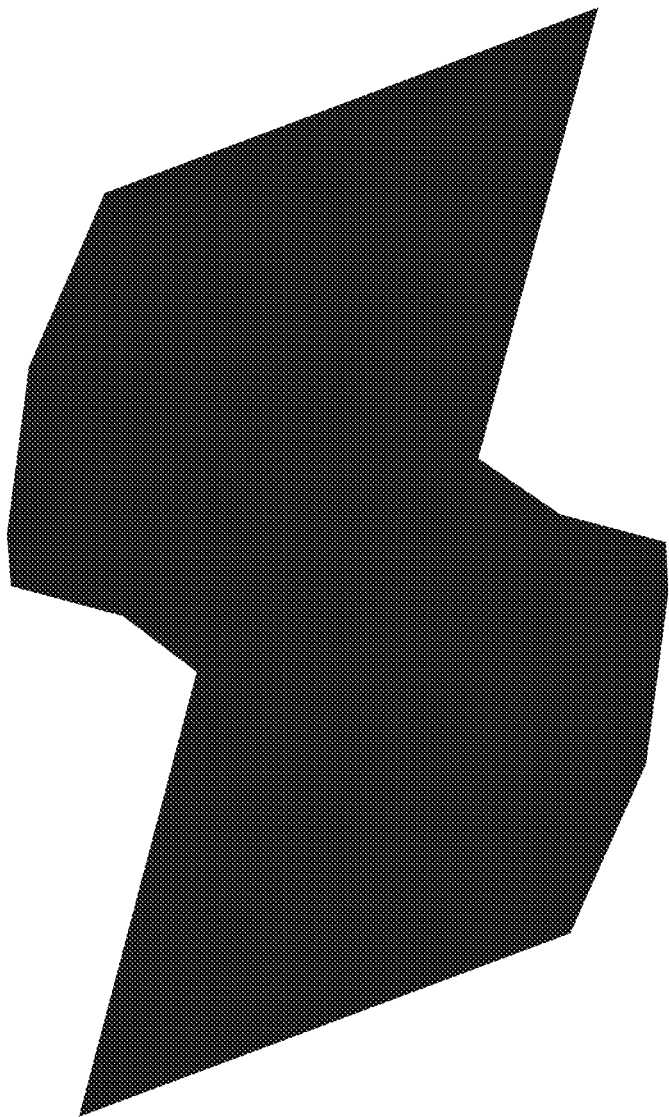

In this example, the processing from points 1950 to 1152 proceeds exactly as described above for the example in FIGS. 24a and 24b. At a point 1153, there is no intersection between the current projection line and the previous projection line. Therefore close-off edges are added to the current extension polygon and the main polygon. At a point 1159 the current projection line and the previous projection line (through 1158 intersect. Therefore a new extension polygon is created, and start-up edges are added to the extension and main polygons. The method then proceeds (until the last point 1960) as described above for the example in FIGS. 24a and 24b. In the example shown in FIG. 19a, in order to stroke the entire curve, one main polygon and two extension polygons are created. The two extension polygons are shown in FIG. 19a, and the main polygon is shown in FIG. 19b. The combined result of filling the three polygons is shown in FIG. 19d, which shows the expected result of stroking the original curve.

Second Implementation of the Two Polygon Embodiment

A second implementation of the two-polygon embodiment of the current VFS arrangement will now be described. This second implementation of the two polygon embodiment of the current VFS arrangement differs from the first implementation of the two polygon arrangement previously described in the calculation of projection lines used in the method. In the first implementation, the projection lines used are normal lines to the curve at each point on the curve. In the second implementation angular bisectors are used to represent normal to the path.

For example: let p1, p2 and p3 be three consecutive points on the curve. (p1, p2) is the line segment from point p1 to point p2, and (p2, p3) is the line segment from point p2 to point p3. According to implementation 1, the projection line used at p2 is the line through p2 which is normal (perpendicular) to the curve at p2. According to implementation 2, the projection line used at p2 is the line through p2 which bisects the angle between line (p1,p2) and line (p2, p3).

For the first and last points on a curve, normal lines to the curve are used for the projection lines.

Second Implementation of the Two Polygon Embodiment

Example

Figure 21A:
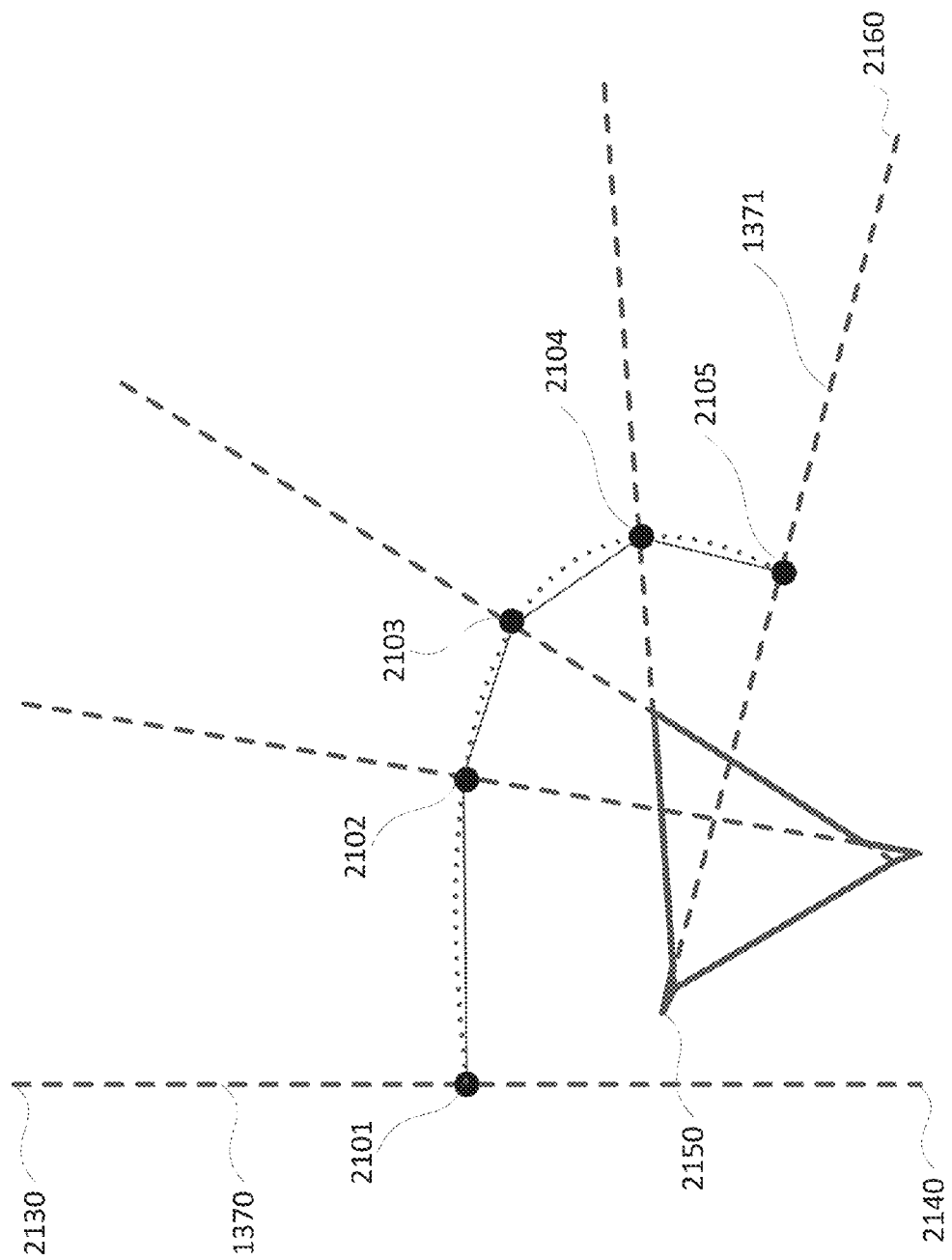
FIGS. 21a, 21b, 21c and 21d illustrate an example of stroking a curve segment in accordance with an exemplary implementation of the two polygon embodiment of the present invention.
Figure 21B:
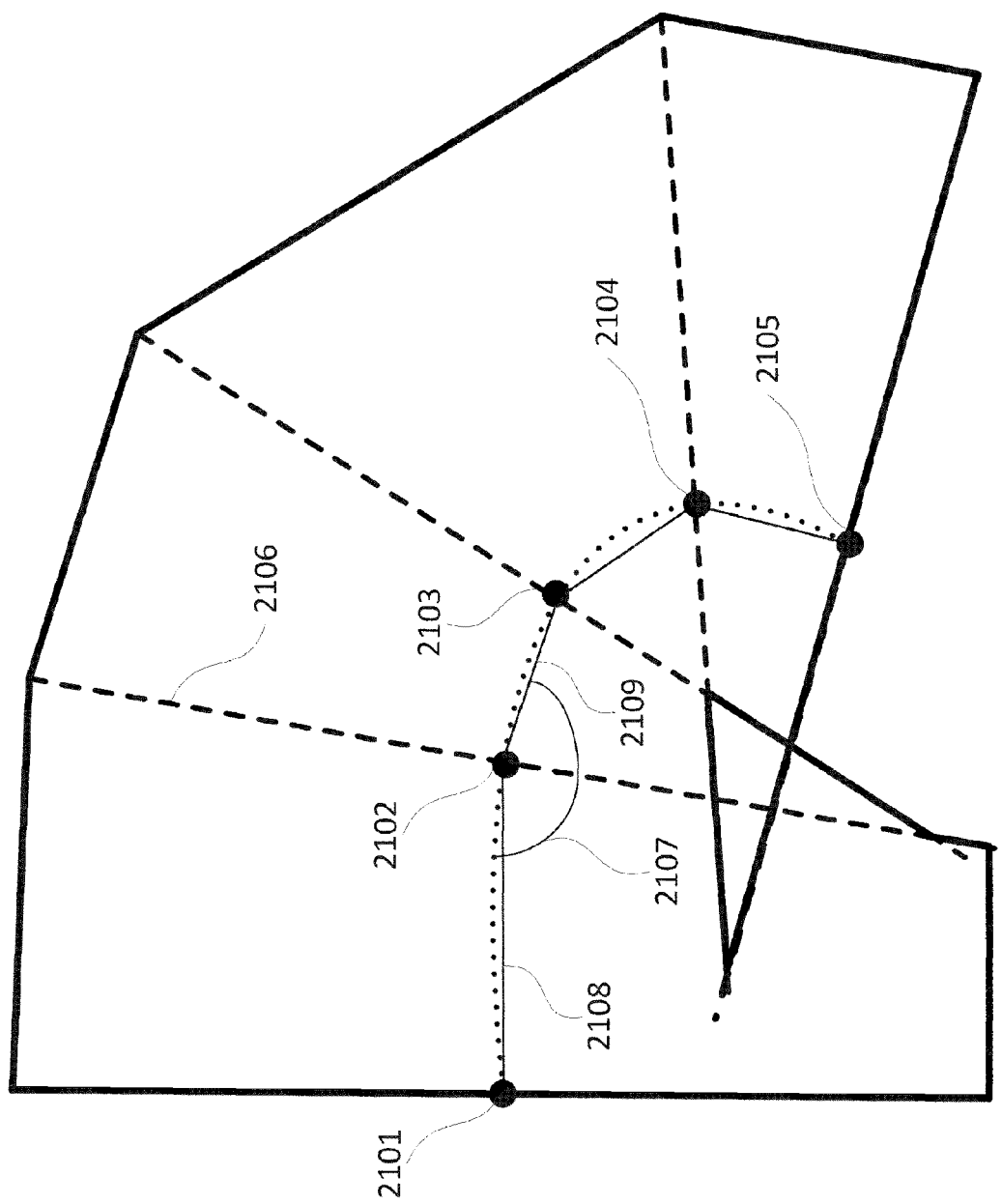
Figure 21C:
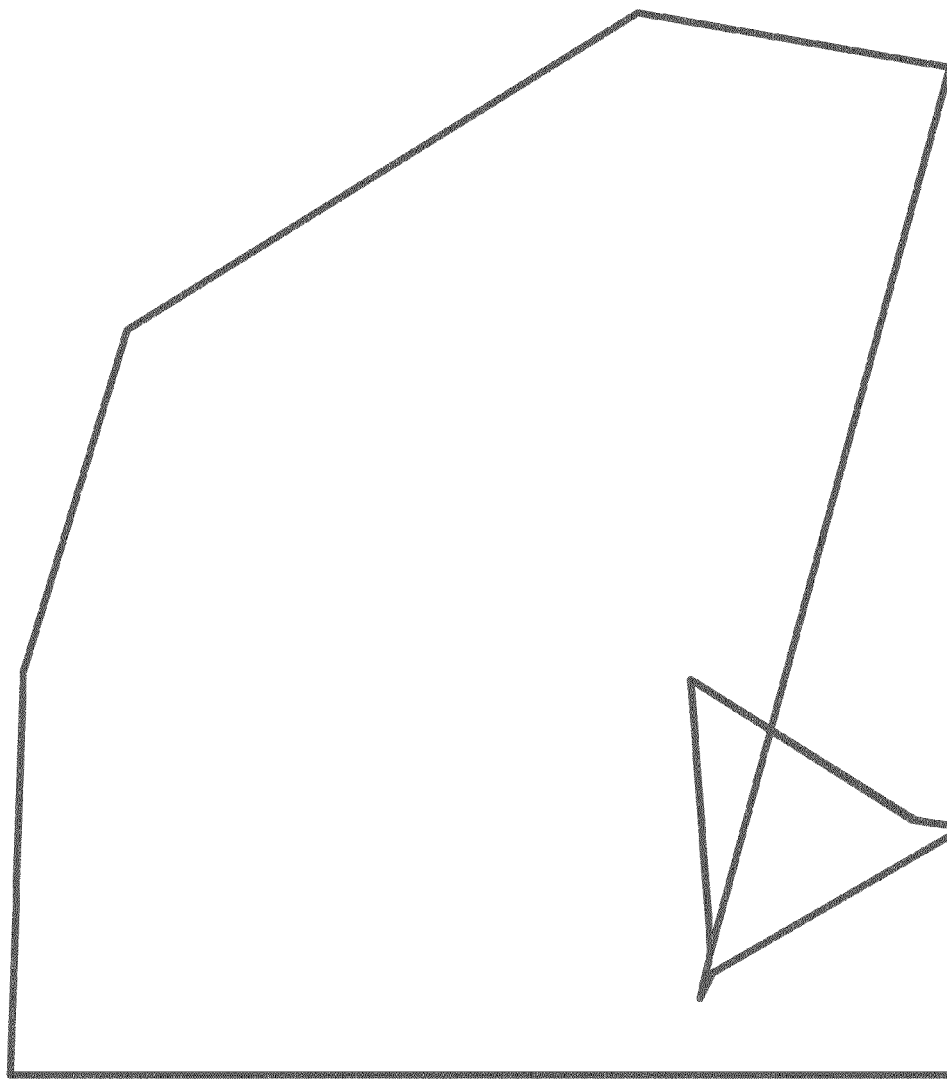
Figure 21D:
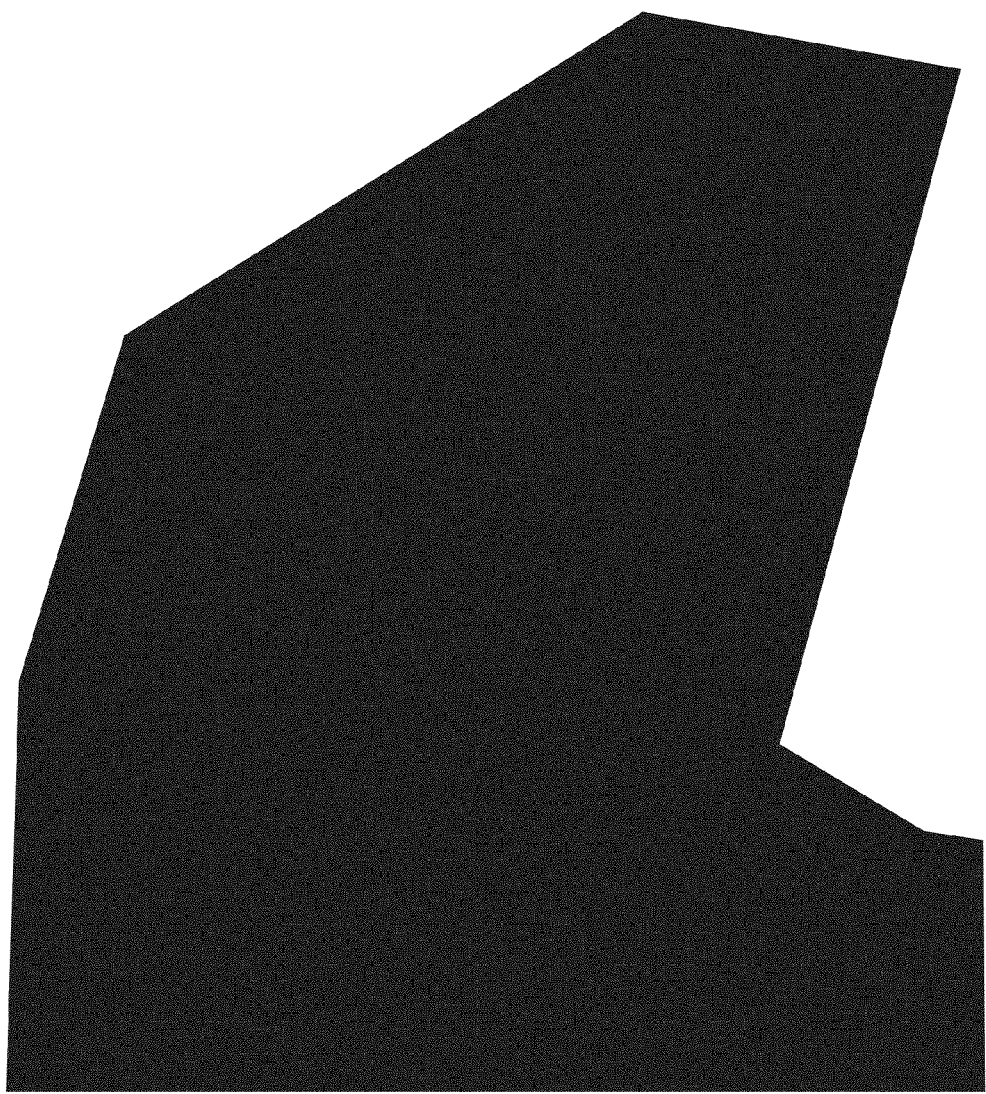

FIG. 21a and FIG. 21b illustrate an example of stroking a curve segment in accordance with a second implementation of the present two-polygon VFS arrangement. FIG. 21a depicts the extension polygon, FIG. 21b depicts the main polygon, FIG. 21c depicts the combination of the main and extension polygons (superimposed). FIG. 21d depicts the result of filling the combined polygons, which is the final desired result of stroking the original curve segment. The construction of an extension polygon and a main polygon in the second implementation is identical to the first implementation, except that the projection line of each generated point between the start and end points on the curve segment is an angular bisector. For example, the projection line of point 2102 (represented by the dashed line) bisects the angle (2101, 2102, 2103). In other words, the projection lines (2106) are angular bisectors of angles (2107) described by line segments (2108, 2109) between successive points (2101, 2102, 2103) on the curve. The projection lines, 1370 and 1371, for the start and end points are normal lines of the curve segment as before.

Third Implementation of the Two Polygon Embodiment

A third implementation of the current VFS arrangement will now be described. In this implementation of the current VFS arrangement, the method proceeds according to the method described in FIGS. 18a and 18b. The curve is broken down into a series of line segments by generating a number of points along the curve segment, and grouping each neighbouring pair of points to form a line segment. The projection line at the start of each line segment is the normal line calculated from the segment's start point and perpendicular to the segment. The projection line at the end of the line segment is the line through the end point and perpendicular to the next line segment. Each projection line extends on either side of the curve by half of the stroke width.

When successive projection lines do not intersect, the addition of edges to the outer (convex side) offset curve in the step 1835 proceeds as follows. If the orientation of the curve is clockwise, then add an edge parallel to, and with the same direction as, the current curve line segment, on the convex side of the curve, at a distance from the line segment equal to half the stroke width. In addition add an edge joining the end of the previous parallel edge (added for the previous curve line segment) to the start of the parallel edge just added. If, on the other hand, the orientation of the curve is anticlockwise, then the same edges are added but with directions reversed. With reference to FIG. 20b, the added parallel edge is edge 1271 between points [2034,1206]. Then, the additional edge is edge 1275 between points [1206, 2033].

The construction of the inner (concave side) offset curve in the step 1830 proceeds as follows. If the orientation of the curve is anti-clockwise, then add an edge parallel to, and with the same direction as, the current curve line segment, on the concave side of the curve, at a distance from the curve equal to half the stroke width. In addition add an edge joining the end of the previous parallel edge (added for the previous line segment) to the start of the parallel edge just added. If on the other hand the orientation of the curve is clockwise, then the same edges are added but with directions reversed. In the same way, with reference to FIG. 20b, for the clockwise case, the parallel edge is edge 2018 between points [2022,2021]. The additional edge is labeled 1277 between points [2018, 2022].

Figure 20A:
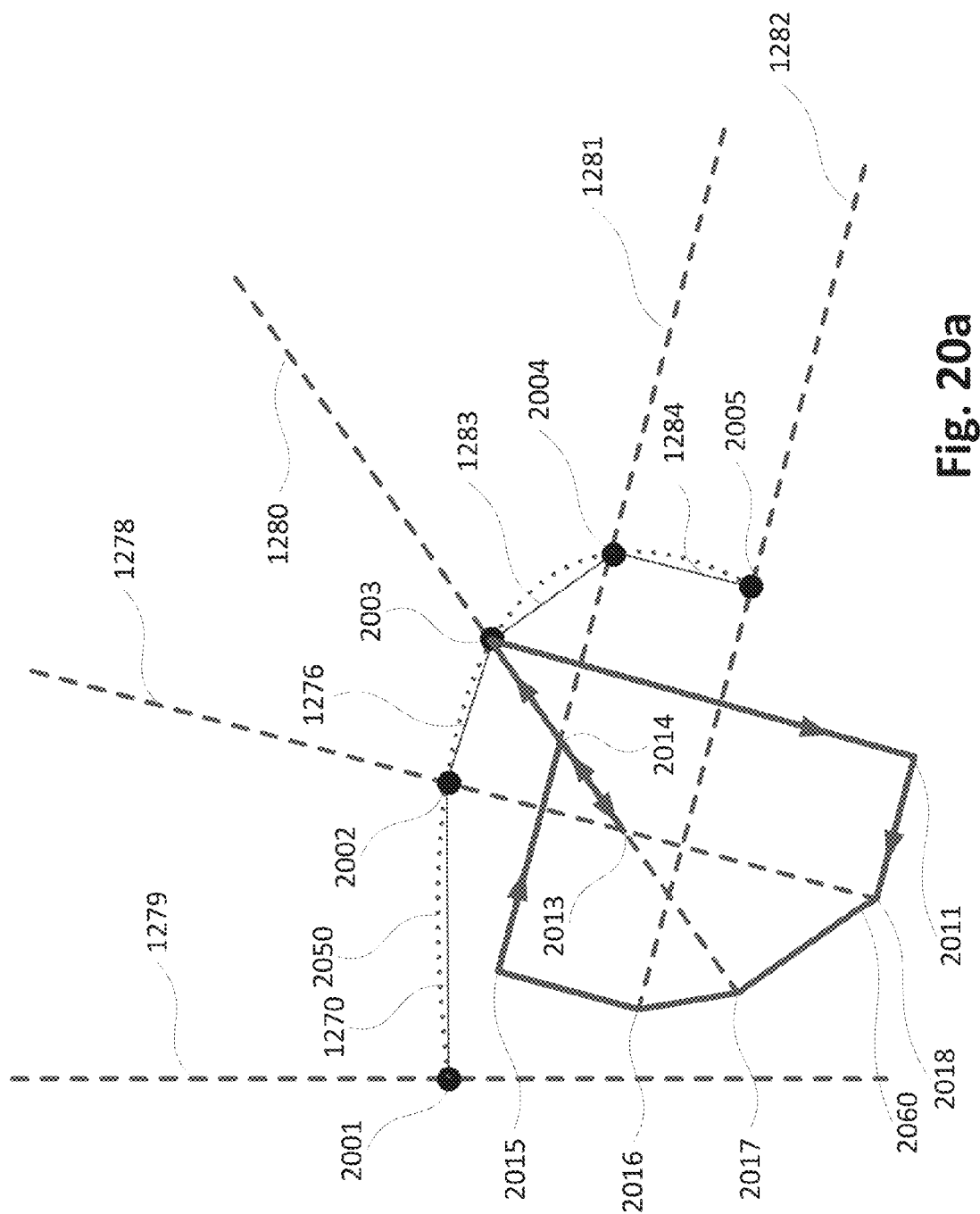
Figure 20B:
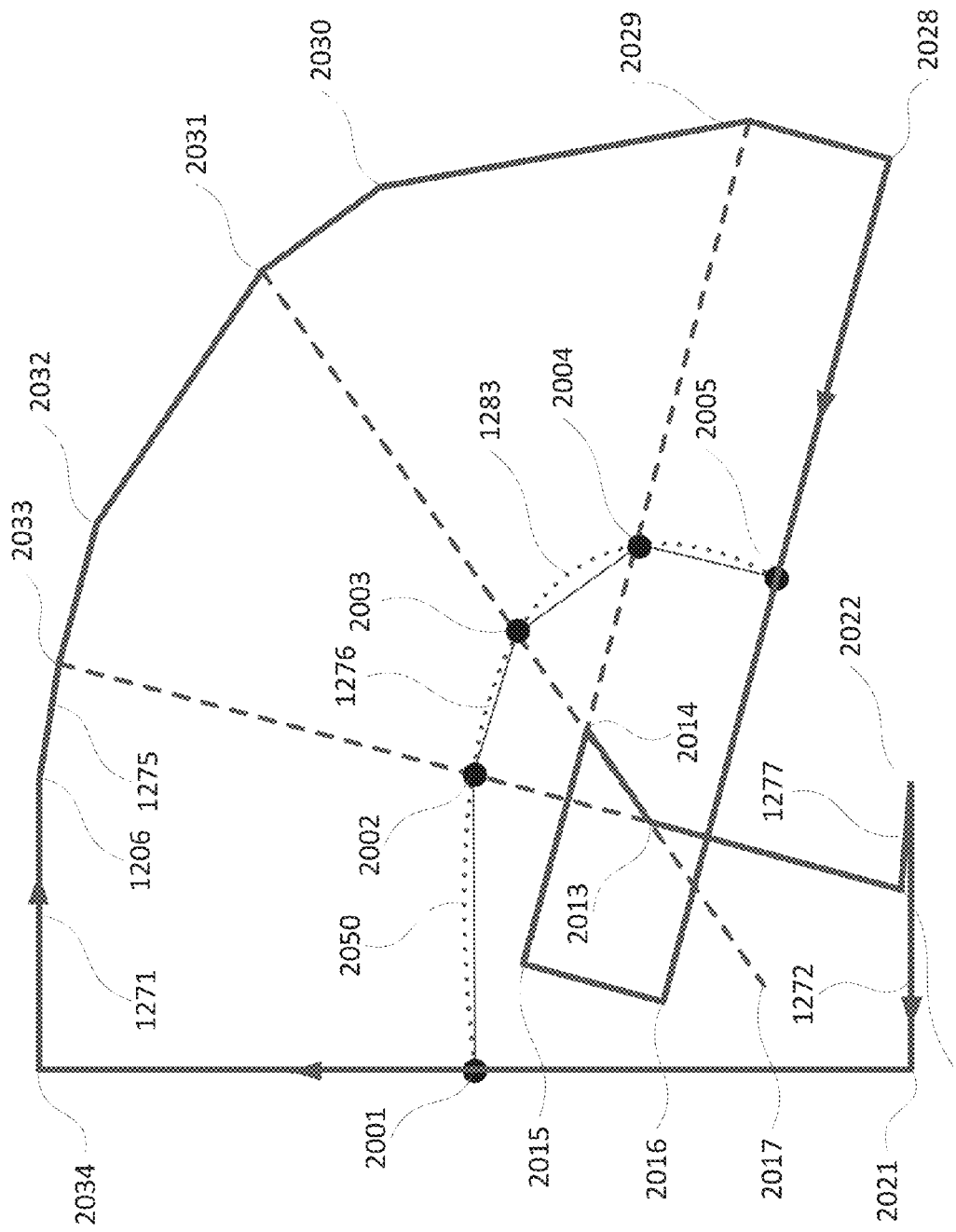

When projection lines intersect for the first time, or when the intersection side switches from one side of the curve to the other, or when processing enters a new region where projection lines begin to intersect, setup edges are added to create a new extension polygon in the step 1860. In the following explanations, a 'current' line segment is being processed. There is a projection line at the start of the line segment (the 'start projection line') and a projection line at the end of the line segment (the 'end projection line'). These two projection lines intersect. The edges that are added to create the new extension polygon are as follows:

If the orientation of the curve is clockwise, then the following three edges are added:
    a set up edge from the intersection of the start projection line and the end projection line to the end of the current line segment (eg (2013,2003) of FIG. 20a)
    a set up edge from the end of the current line segment, running parallel to the start projection line, and of length equal to half the stroke width (eg (2003, 2011) of FIG. 20a)
    an edge parallel to the current line segment, on the concave side of the curve, at distance from the curve equal to the half the stroke width, with direction opposite to the direction of the current line segment (eg (2011,2018) of FIG. 20a)

If on the other hand the orientation of the curve is anti-clockwise, then the same edges are added but with their directions reversed.

In the step 1860 edges are also added to the main polygon as follows:

If the orientation of the curve is clockwise, then an edge is added from the intersection of the start projection line and end projection line to the inner end of the previous projection line, and a join edge is added from the inner end of the projection line to the start of the parallel edge added for the previous line segment (eg (2013,2018) of FIGS. 20a and (2018, 2022) of FIG. 20a). If on the other hand the orientation of the curve is anti-clockwise, then the same edge is added but with the direction reversed.

In the step 1865 edges are added to the main and extension polygons in a region of the curve where consecutive projection lines intersect. In the third implementation the edges added to the main polygon in the step 1865 are as follows:
    edges on the outer offset curve (but not the inner offset curve) are added as described for step 1835 (eg (1206, 2033) of FIG. 20b and (2033,2032) of FIG. 20b).
    if the curve has clockwise orientation, then an edge is added from the intersection of the start and end projection lines to the intersection of the start and end projection lines for the previous line segment (eg see (2014, 2013) of FIG. 20b). If on the other hand the curve has clockwise orientation, then the same edge is added but with direction reversed.

In the third implementation the edges added to the extension polygon in the step 1865 are as follows:

If the curve has clockwise orientation, then add the inner offset parallel edge which will be parallel to the current line segment but with opposite direction, located at distance half the stroke width from the current line segment (eg (2011, 2018) of FIG. 20a). Then add a join edge from end of the previous inner offset parallel edge (added for the previous line segment) to the start of the parallel edge just added. (eg see (2017, 2016) of FIG. 20a). If on the other hand the curve has anti-clockwise orientation, then the same edges are added but with directions reversed.

If the curve has clockwise orientation, then add an edge from the intersection of the start and end projection lines to the intersection of the start and end projection lines for the previous line segment (eg see (2014, 2013) of FIG. 20a). If on the other hand the curve has anti-clockwise orientation, then the same edge is added but with direction reversed.

When the end of a region of intersecting projection lines is reached (start and edge projection lines do not intersect for the current line segment), or when the end of the curve is reached, or when the side of the intersection of projection lines switches from one side of the curve to the other, close-off edges are added to the main and extension polygons in the steps 1815 and 1855 as follows:

In the main polygon, if the orientation of the curve is clockwise, add inner parallel edge (parallel to the current line segment, but with opposite direction), and then add an edge from the end of the inner parallel edge to intersection of the start and end projection lines for the previous line segment (eg (2016, 2015) and (2015, 2014) of FIG. 20b). If on the other hand the orientation of the curve is anti-clockwise, add these same two edges but with their directions reversed. In addition, add edges to the outer offset curve as described in the step 1835 (eg (2029, 2028) of FIG. 20b)

In the extension polygon, if the orientation of the curve is clockwise, add an edge from the end of the last inner parallel edge added in the step 1865 to the intersection of the start and end projection lines for the previous line segment (eg (2013, 2014) of FIG. 20a) If on the other hand the orientation of the curve is anti-clockwise, then add the same edge but with its direction reversed.

Third Implementation of the Two Polygon Embodiment

Example

FIGS. 20a and FIG. 20b illustrate an example of stroking a curve segment 2050 in accordance with the third implementation of the present VFS arrangement. Firstly, the curve segment 2050 is broken down into a series of line segments by generating a number of points (2001 to 2005) along the curve segment 2050 and grouping each neighbouring pair of points to form a line segment. For example, a point 2001 and a point 2002 form a line segment 1270. When stroking the curve segment 2050, the curve segment 2050 is treated as a series of inter-connected line segments. The offset curve of each line segment is generated by projecting the line segment to the left and to the right for half of the stroke and adding parallel edges. For example in FIG. 20b, parallel edges of the line segment 1270 are the line segment 1271 from a point 2034 to point 1206 and a line segment 1272 from a point 2022 to point 2021. The end points of the parallel edges of each line segment are connected by edges to the corresponding parallel edges of the succeeding line segment. For example, for line segments 1270 and 1276, edges are added from a point 1206 to a point 2033 and from a point 2018 to point 2022.

The projection line at the start of each line segment is the normal line through the segment's start point and perpendicular to the segment. The projection line at the end of the line segment is the line through the end point and perpendicular to the next line segment. For example, for a line segment 1276, the start projection line is 1278 and an end projection line is 1280.

The process of stroking the curve segment 2050 starts from a line segment 1270. The start projection line for this segment is 1279 and the end projection line is 1278. These projection lines do not intersect. Outer parallel edge 1271 and inner parallel edge 1272 are added to the main polygon as shown in FIG. 20b. Since this is the first line segment, no join edges are added from previous parallel edges as there are no previous parallel edges.

The next line segment is 1276. The start projection line is 1278 and end projection line is 1280. These two projection lines intersect at 2013, signalling the start of a region of intersecting projection lines. Setup edges are added to construct an extension polygon in FIG. 20a:
from point 2013 to point 2003
from point 2003 to point 2011
and an interior parallel edge (parallel to line segment 1276 but with opposite direction) is added from point 2011 to point 2018.

A setup edge from point 2013 to point 2018 is added to the main polygon, as shown in FIG. 20b, to make a transition from the region with no projection-line intersection to the region with projection-line intersection.

Edges are added to the outer offset curve in the main polygon:
a join edge from point 1206 to point 2033
a parallel edge from point 2033 to point 2032
The next curve line segment is 1283. The start projection line is 1280 and end projection line is 1281. These two lines intersect at 2014.

An edge from this intersection point 2014 to the previous intersection point 2013 is added to both the extension and the main polygon.

Edges are added to the inner offset curve in the extension polygon:
a parallel edge from 2060 to 2017
a join edge from end of the previous parallel edge 2018 to start of the current parallel edge 2060
Edges are added to the outer offset curve in the main polygon:
an outer parallel edge from 2031 to 2030
a join edge from end of previous outer parallel edge 2032 to start of current parallel edge 2031
The next curve line segment is 1284. The start projection line is 1281 and the end projection line is 1282. These two projection lines do not intersect, meaning the end of the region of intersecting projection lines has been reached.

Edges are added to the inner offset curve in the extension polygon:
a parallel edge from 2016 to 2015
a join edge from end of previous parallel edge 2017 to start of the current parallel edge 2016
Close-off edges are added to the extension polygon:
an edge from 2015 to the intersection of the projection lines for the previous line segment at point 2014
In the main polygon the following edges are added:
for the outer offset curve, the parallel edge is added from 2029 to 2028
a join edge is added from 2030 to 2029
an inner parallel edge is added from 2016 to 2015
a close-off edge is added from 2015 to the intersection of the projection lines for the previous line segment at point 2014

Since line segment is 1284 is the last segment on the curve, endcap edges for the curve are added to the main polygon, from point 2021 to point 2034 and from point 2028 to point 2016.

Figure 20D:
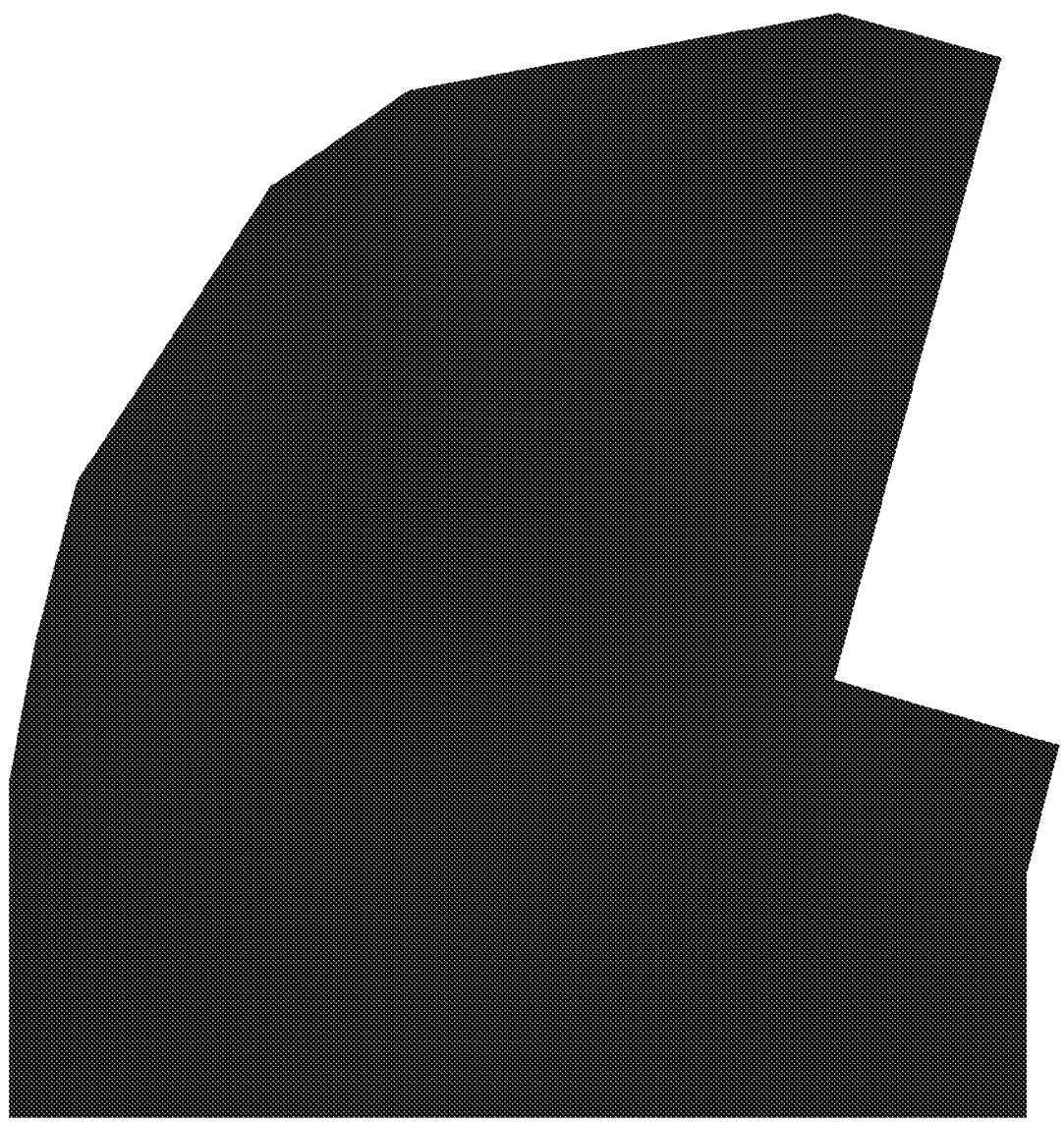

When the main and extension polygons are combined, as illustrated in FIG. 20c, the zero winding count regions are removed. FIG. 20d shows the correct output when the two polygons are filled.

In summary, with reference to FIG. 22, which shows a flowchart of the process of stroking a curve segment in accordance with the embodiment of the present VFS arrangement. The processor 105 receives a curve segment, and creates normal vectors to the path from the centre points of the path in the forming step 2210, performed by the processor 105 executing the VFS software program 133. Then, the processor 105 determines if there are any intersection points between successive pairs of normal vectors as explained with reference to FIGS. 18a and 18b in the determining step 2220, performed by the processor 105 executing the VFS software program 133. The process in FIG. 22 then proceeds to the constructing step 2230, performed by the processor 105 executing the VFS software program 133, wherein the processor 2230 construct a polygon that fills the void in the stroked path as determined in the method described with reference to FIGS. 19a to 19d as well as FIGS. 20a to 20d. Finally, in the step 2250, the stroked path is rendered by the renderer 1113 using the constructed polygon by the processor 105.

FIG. 23 shows a more detailed flowchart of a process 2300 for stroking the curve segment in accordance with the two-polygon embodiment of the present VFS arrangement. The processor 105 receives a curve segment, and creates projection lines perpendicular to the curve segments from the centre of the curve segments in a forming step 2310, performed by the processor 105 executing the VFS software program 133. Then, the intersection points between successive pairs of projection lines are determined as explained with reference to FIGS. 18a and 18b in a determining step 2320, performed by the processor 105 executing the VFS software program 133. Then, the processor 105 forms an extension polygon using intersection points and end points of intersection projections in a constructing step 2330, performed by the processor 105 executing the VFS software program 133, and another main polygon using endpoints of remaining projections and intersection points in a forming step 2340, performed by the processor 105 executing the VFS software program 133. These two steps are described in further detail with reference to FIGS. 19a to 19d as well as FIGS. 20a to 20d. Finally, in a step 2350, performed by the processor 105 executing the VFS software program 133, the stroked path is rendered by the renderer 1113 using the constructed polygon by processor 105.

INDUSTRIAL APPLICABILITY

The arrangements described are applicable to the computer and data processing industries and particularly for industry segments utilising image rendering, either to printed media or display devices.

The foregoing describes only some embodiments of the present invention, and modifications and/or changes can be made thereto without departing from the scope and spirit of the invention, the embodiments being illustrative and not restrictive.

The invention claimed is:

1. A method, performed by a computer, of rendering a stroked curved path having a fill thickness, the method comprising:
   forming, by the computer, a plurality of projection lines projecting from each side of the curved path, each of the projection lines having a length based on the fill thickness;
   determining, by the computer, intersection points for a plurality of intersecting consecutive projection lines located on a concave side of the curve;
   forming, by the computer, at least one extension polygon based on the intersection points and end points of the plurality of intersecting consecutive projection lines;
   forming, by the computer, a main polygon based on end points of the plurality of projection lines, and the intersection points, excluding at least one of the end points of a non-end cap projection line of the intersecting consecutive projection lines; and
   rendering, by the computer, the curved path using the at least one extension polygon and the main polygon.

2. A method according to claim 1, wherein the projection lines are lines normal to the curved path, and extend on either side of the curved path by half of the fill thickness.

3. A method according to claim 1, wherein the projection lines are angular bisectors of angles described by line segments between successive points on the curve.

4. A method according to claim 1, wherein the projection lines are lines positioned at ends of line segments between successive points on the curve the projection lines being normal to said line segments.

5. A method, performed by a computer, of stroking a path comprising two straight adjacent segments, said path having a fill thickness and each of the segments having a start point and an end point, said method comprising the steps of:
   forming, by the computer, a normal projection line to the straight segments at each start and end point of the segments, each of the normal projection lines having a length based on the fill thickness;
   detecting, by the computer, a presence of an intersection point between a first and a second of the normal projection lines, the first of the normal projection lines passing through the start point of a first of the segments and the second of the normal projection lines passing through the end point of a second of the segments, the first and the second of the segments being adjacently located;
   in response to said detecting step, constructing, by the computer, a polygon comprising an area bounded by the intersection point and at least two of the normal vectors of the first and second segments, said area located on the same side of a vector path as the intersection point in an event that the intersection point is detected; and
   stroking, by the computer, the path using the constructed polygon.

6. A method according to claim 5, wherein said detecting step detects a presence of an intersection point of one of the normal projection lines and one of the straight adjacent segments.

7. An apparatus for rendering a stroked curved path having a fill thickness, said apparatus comprising
   a processor; and
   a memory storing a software executable program for directing the processor to perform a method comprising the steps of:
   forming a plurality of projection lines projecting from each side of the curved path, each of the projection lines having a length based on the fill thickness;

determining intersection points for a plurality of intersecting consecutive projection lines located on a concave side of the curve;

forming at least one extension polygon based on the intersection points and end points of the plurality of consecutive projection lines;

forming a main polygon based on end points of the plurality of intersecting projection lines, and the intersection points, excluding at least one of the end points of a non-end cap projection line of the intersecting consecutive projection lines; and rendering the curved path using the at least one extension polygon and the main polygon.

8. An apparatus for stroking a path comprising two straight adjacent segments, said path having a fill thickness and each of the segments having a start point and an end point, said apparatus comprising:

a processor; and a memory storing a software executable program for directing the processor to perform a method comprising the steps of:

forming a normal projection line to the straight segments at each start and end point of the segments, each of the normal projection lines having a length based on the fill thickness;

detecting a presence of an intersection point between a first and a second of the normal projection lines, the first of the normal projection lines passing through the start point of a first of the segments and the second of the normal projection lines passing through the end point of a second of the segments, the first and the second of the segments being adjacently located;

in response to said detecting step, constructing a polygon comprising an area bounded by the intersection point and at least two of the normal vectors, said area located on the same side of a vector path as the intersection point in an event that the intersection point is detected; and stroking the path using the constructed polygon.

9. A computer readable non-transitory storage medium storing a software executable program for directing a processor to perform a method for rendering a stroked curved path having a fill thickness, said program comprising:

software executable code for forming a plurality of projection lines projecting from each side of the curved path, each of the projection lines having a length based on the fill thickness;

software executable code for determining intersection points for a plurality of intersecting consecutive projection lines located on a concave side of the curve;

software executable code for forming at least one extension polygon based on the intersection points and end points of the plurality of intersecting consecutive projection lines;

software executable code for forming a main polygon based on end points of the plurality of projection lines, and the intersection points, excluding at least one of the end points of a non-end cap projection line of the intersecting consecutive projection lines; and software executable code for rendering the curved path using the at least one extension polygon and the main polygon.

10. A computer readable non-transitory storage medium storing a software executable program for directing a processor to perform a method for stroking a path comprising two straight adjacent segments, said path having a fill thickness and each of the segments having a start point and an end point, said program comprising:

software executable code for forming a normal projection line to the straight segments at each start and end point of the segments, each of the normal projection lines having a length based on the fill thickness;

software executable code for detecting a presence of an intersection point between a first and a second of the normal projection lines, the first of the normal projection lines passing through the start point of a first of the segments and the second of the normal projection lines passing through the end point of a second of the segments, the first and the second of the segments being adjacently located;

software executable code for, in response to said detecting step, constructing a polygon comprising an area bounded by the intersection point and at least two of the normal vectors of the first and second segments, said area located on the same side of a vector path as the intersection point in an event that the intersection point is detected; and software executable code for stroking the path using the constructed polygon.

* * * * *